US012613734B2

(12) United States Patent
Zhou et al.

(10) Patent No.: US 12,613,734 B2
(45) Date of Patent: Apr. 28, 2026

(54) APPLICATION KEEP-ALIVE METHOD AND ELECTRONIC DEVICE

(71) Applicant: Honor Device Co., Ltd., Shenzhen (CN)

(72) Inventors: Wenyu Zhou, Shenzhen (CN); Yongfa Tan, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 401 days.

(21) Appl. No.: 18/038,345

(22) PCT Filed: Sep. 14, 2022

(86) PCT No.: PCT/CN2022/118833
§ 371 (c)(1),
(2) Date: May 23, 2023

(87) PCT Pub. No.: WO2023/071582
PCT Pub. Date: May 4, 2023

(65) Prior Publication Data
US 2024/0004699 A1      Jan. 4, 2024

(30) Foreign Application Priority Data

Oct. 29, 2021      (CN) .......................... 202111277639.0

(51) Int. Cl.
| | |
|---|---|
| *G06F 9/46* | (2006.01) |
| *G06F 9/48* | (2006.01) |
| *G06F 9/52* | (2006.01) |

(52) U.S. Cl.
CPC .............. *G06F 9/485* (2013.01); *G06F 9/526* (2013.01)

(58) Field of Classification Search
CPC ................................. G06F 9/485; G06F 9/526
See application file for complete search history.

(56) References Cited

U.S. PATENT DOCUMENTS

| | | | |
|---|---|---|---|
| 7,739,385 B1 | 6/2010 | Vinjamuri et al. | |
| 8,775,631 B2 | 7/2014 | Luna | |
| | (Continued) | | |

FOREIGN PATENT DOCUMENTS

| | | |
|---|---|---|
| CN | 105446582 A | 3/2016 |
| CN | 105637919 A | 6/2016 |
| | (Continued) | |

OTHER PUBLICATIONS

Anonymous, "iOS Background Execution Limits," Apple Developer Forums, Aug. 12, 2021; 2 pages, Retrieved from the internet: URL:https://developer.apple.com/forums/thread/685525.
(Continued)

*Primary Examiner* — Gregory A Kessler
(74) *Attorney, Agent, or Firm* — Slater Matsil, LLP

(57)      ABSTRACT

This application provides an application keep-alive method and an electronic device. The method includes: An electronic device automatically performs a first locking operation on a first application running in the background, where the first application is an application that a user needs to continue to use. The electronic device displays a multi-task interface, where the multi-task interface includes a first preview interface corresponding to a first application and a second preview interface corresponding to a second application. The electronic device displays a first identifier on the first preview interface of the multi-task interface to indicate that an application lock of a first type is added to the first application. The electronic device performs a second locking operation on the second application, and displays a second identifier on the second preview interface, so as to indicate that an application lock of a second type is added to the second application.

20 Claims, 74 Drawing Sheets

(56)        References Cited

U.S. PATENT DOCUMENTS

| | | | |
|---|---|---|---|
| 10,182,466 B2 | 1/2019 | Nirantar et al. |
| 2013/0007299 A1 | 1/2013 | German et al. |
| 2013/0067060 A1 | 3/2013 | Thaler et al. |

FOREIGN PATENT DOCUMENTS

| | | | |
|---|---|---|---|
| CN | 106156561 A | 11/2016 |
| CN | 109086599 A | 12/2018 |
| CN | 109992310 A | 7/2019 |
| CN | 112084488 A | 12/2020 |
| CN | 112099757 A | 12/2020 |
| CN | 112162783 A | 1/2021 |
| CN | 112988282 A | 6/2021 |
| CN | 112988282 B | 8/2021 |
| CN | 113220258 A | 8/2021 |
| CN | 113325988 A | 8/2021 |
| CN | 114168355 A | 3/2022 |
| WO | 2014011216 A1 | 1/2014 |
| WO | 2014200631 A1 | 12/2014 |
| WO | 2021175272 A1 | 9/2021 |

OTHER PUBLICATIONS

Anonymous, "UIApplication Background Task Notes," Apple Developer Forums, Feb. 27, 2021; 3 pages, Retrieved from the internet: URL:https://developer.apple.com/forums/thread/85066.

Yan, Hong-Bing et al., "Collection and Detection of Soundless Audio in Android Applications", School of Computer Science and Technology, University of Science and Technology of China, Jul. 31, 2019, 6 pages.

Tu, Xuezhen, "Client-side key technology research for distributed caching systems", School of Computer and Information Engineering, Henan University, Apr. 18, 2019, 7pages.

810

811

Honor video is a video-type application. Currently, the system selects the video-type application keep-alive policy for the application (determined according to your habit of using the video-type application):

812

Keep-alive policy of Honor Video:

Time            Monday to Friday 20:00-21:00

Place                      Home

Motion status              Still

☑          Automatically associate video-type applications

813

☐  Video-type application keep-alive policy

Time            Monday to Friday 19:00-21:00

Place                      Home

Motion status              Still

☐  Game-type application keep-alive policy

Time            Monday to Friday 12:30-12:50

Place                     Company

Motion status              Still

☐  No automatic keep-alive

Cancel                    Save

Cleaned three locked applications:
Gallery, Train Travel, and
Calculator

No running applications recently

1601

APPLICATION KEEP-ALIVE METHOD AND ELECTRONIC DEVICE

CROSS-REFERENCE TO RELATED APPLICATIONS

This application is a national stage of International Application No. PCT/CN2022/118833, filed on Sep. 14, 2022, which claims priority to Chinese Patent Application No. 202111277639.0, filed on Oct. 29, 2021. The disclosures of both of the aforementioned applications are hereby incorporated by reference in their entireties.

TECHNICAL FIELD

This application relates to the field of terminal technologies, and in particular, to an application keep-alive method and an electronic device.

BACKGROUND

A plurality of applications are generally installed in an electronic device such as a mobile phone, and these applications can provide a user with rich application services. For example, the mobile phone may install a video application, a music application, and a shopping application. In a daily use scenario, the user may enable a plurality of applications, for example, use the video application to cache a video, use the music application in the background to play music, and use a read application to read.

In the conventional technology, when running memory is insufficient or remaining power is insufficient, the mobile phone may automatically clean an application that occupies relatively large memory or consumes relatively high power. For example, in a cache process, the video application consumes power and also occupies relatively large memory. When the mobile phone automatically cleans a background application, a background process of the video application is likely to be killed, causing cache suspension.

Apparently, in the foregoing background application cleaning process, the mobile phone may determine, based on power consumption, memory occupation, and the like of each application without considering an actual user requirement, whether to kill the process. Consequently, the mobile phone is likely to close an application that the user still needs to use, and user experience is affected.

SUMMARY

This application provides an application keep-alive method and an electronic device.

According to a first aspect, an embodiment of this application provides an application keep-alive method, and the method includes: An electronic device automatically performs a first locking operation on a first application running in the background, to add an application lock of a first type to the first application, where the first application is an application that the electronic device predicts that a user needs to continue to use, and the first locking operation is used to enable the first application to be in a keep-alive state. In response to a first operation of the user, the electronic device displays a multi-task interface, where the multi-task interface includes preview interfaces of a plurality of recently used applications, the plurality of recently used applications include the first application and a second application, the preview interfaces of the plurality of applications include a first preview interface and a second preview interface, the first preview interface is a preview interface of the first application, and the second preview interface is a preview interface of the second application. The mobile phone displays a first identifier on the first preview interface of the multi-task interface, where the first identifier is used to indicate that the application lock of the first type is added to the first application. In response to a second operation performed by the user on the second preview interface, the electronic device performs a second locking operation on the second application to add an application lock of a second type to the second application, and displays a second identifier on the second preview interface, where the second identifier is used to indicate that the application lock of the second type is added to the second application, and the second locking operation is used to enable the second application to be in a keep-alive state.

According to the method provided in the foregoing embodiment, the electronic device (for example, a mobile phone) may predict an application (that is, the first application) that the user still needs to use, and automatically add the application lock of the first type (that is, an intelligent lock) to the first application, so that the first application can be in a keep-alive state. This prevents the first application from being automatically killed by the electronic device. In addition, the electronic device may further receive a user operation and add the application lock of the second type (that is, a manual lock) to an application (for example, the second application). This can meet a personalized user requirement.

In an implementation, an appearance of the first identifier is different from that of the second identifier. Different identifiers are added to the first application and the second application (for example, the first identifier is added to the first application, and the second identifier is added to the second application) for ease of distinguishing by the user.

In an implementation, default application keep-alive duration corresponding to the application lock of the first type is shorter than default application keep-alive duration corresponding to the application lock of the second type. Default keep-alive duration of an application to which the manual lock is added (that is, the application corresponding to the application lock of the second type) may be permanent, that is, the application to which the manual lock is added (in a case in which the user has not changed) remains in a keep-alive state. Default keep-alive duration of an application to which an intelligent lock is added (that is, the application corresponding to the application lock of the first type) is a fixed value (for example, a first value or a second value).

In an implementation, first keep-alive duration related to the first identifier is further displayed on the first preview interface, and the first keep-alive duration is remaining keep-alive duration of the first application. It may be understood that the first keep-alive duration may change in real time, and the first keep-alive duration may be displayed to prompt the user with the remaining keep-alive duration of the first application. This helps the user perform management.

In an implementation, a maximum value of the first keep-alive duration is a first value or a second value, the first value is a preset value, the second value is a value determined based on a habitual running time of the first application and a current time, and the habitual running time of the first application is a time period in which the user habitually uses the first application. In other words, a plurality of applications to which an intelligent lock is added may have same initial keep-alive duration (that is, the maximum value of the first keep-alive duration), for example, the preset first value; or a plurality of applications to which an intelligent lock is added may have different initial keep-alive duration (that is, the second value), and the second value of each of the applications is a value determined based on a habitual running time of the application and a current time.

In an implementation, in response to a pull-down operation performed by the user on the first preview interface, the electronic device restores the remaining keep-alive duration of the first application to the first value. In other words, the user may pull down a preview interface of an application to which an intelligent lock is added, to refresh remaining keep-alive duration (which is also referred to as the first keep-alive duration) of the application.

In an implementation, the method further includes: In response to a first operation performed by the user on the first identifier on the first preview interface, the electronic device displays a setting box, where the setting box includes a plurality of setting options, and the plurality of setting options are used by the user to set the first keep-alive duration or a keep-alive policy of the first application. In response to an operation that the user selects a first option from the plurality of setting options, the electronic device updates the first keep-alive duration to a preset value corresponding to the first option; or in response to an operation that the user selects a second option from the plurality of setting options, the electronic device displays an input box, and in response to an operation that the user enters a third value into the input box, the electronic device updates the first keep-alive duration to the third value; or in response to an operation that the user selects a third option from the plurality of setting options, the electronic device displays a setting page of the keep-alive policy corresponding to the first application.

According to the method provided in the foregoing embodiment, the electronic device may set remaining keep-alive duration of an intelligently locked application according to a user requirement. In addition, the user may set the remaining keep-alive duration of the intelligently locked application by selecting an option (for example, a first option) from a plurality of time options provided by the electronic device, or by individually entering any value (for example, the third value) into the input box, or by modifying the keep-alive policy corresponding to the first application (the keep-alive policy may be related to a factor such as a time, a place, or a motion status) in the setting page, displayed by the electronic device, of the keep-alive policy corresponding to the first application.

In an implementation, the method further includes: In response to the operation that the user selects the first option or the second option from the plurality of setting options, the electronic device updates the first identifier to the second identifier. It can be learned that, when the electronic device receives an operation that the user changes keep-alive duration of the first application, an application lock type of the application changes (from the application lock of the first type to the application lock of the second type).

In an implementation, the method further includes: In response to a first operation performed by the user on the second identifier on the second preview interface, the electronic device displays a setting box, where the setting box includes a plurality of setting options, the plurality of setting options are used by the user to set second keep-alive duration, and the second keep-alive duration is remaining keep-alive duration of the second application. In response to an operation that the user selects a first option from the plurality of setting options, the electronic device displays the second keep-alive duration on the second preview interface, where the second keep-alive duration is a preset value corresponding to the first option; or in response to an operation that the user selects a second option from the plurality of setting options, the electronic device displays an input box. In response to an operation that the user enters the third value into the input box, the electronic device displays the second keep-alive duration on the second preview interface, where the second keep-alive duration is the third value.

According to the method provided in the foregoing embodiment, the electronic device may set remaining keep-alive duration of a manually locked application according to a user requirement. In addition, the user may set the remaining keep-alive duration of the manually locked application by selecting an option (for example, a first option) from a plurality of time options provided by the electronic device, or by individually entering any value (for example, the third value) into the input box.

In an implementation, the method further includes at least one of the following steps: In response to a second operation performed by the user on the first identifier on the first preview interface, the electronic device unlocks the first application, and does not display the first identifier on the first preview interface; or in response to a second operation performed by the user on the second identifier on the second preview interface, the electronic device unlocks the second application, and does not display the second identifier on the second preview interface. In other words, the user may unlock the first application by tapping the first identifier or performing another operation, or may unlock the second application by tapping the second identifier or performing another operation. After unlocking the first application, the electronic device may hide the first identifier, so as to indicate that the first application is not in a keep-alive state. After unlocking the second application, the electronic device may hide the second identifier, so as to indicate that the second application is not in a keep-alive state.

In an implementation, that an electronic device automatically performs a first locking operation on a first application running in the background includes: In response to an operation of determining that the first application is executing a preset task in the background, the electronic device performs the first locking operation on the first application, where the preset task is a task executed in response to a user requirement. It can be learned that an application that executes a task that meets the user requirement may be considered as an application that the user needs to continue to use, and the electronic device may automatically lock the application, to prevent the application from being killed by the electronic device.

In an implementation, the method further includes: In response to an operation of determining that the first application completes execution of the preset task, the electronic device unlocks the first application, and does not display the first identifier on the first preview interface. It can be learned that, after the first application completes execution of the preset task (which may be understood as that the user requirement is met), it is considered that the application is not an application that the user needs to continue to use, and the electronic device automatically unlocks the application.

In an implementation, the preset task is a download task.

In an implementation, that an electronic device automatically performs a first locking operation on a first application running in the background includes: In response to an operation of determining that the current time is within the habitual running time of the first application, the electronic device performs the first locking operation on the first application, where the habitual running time of the first application is a time period in which the user habitually uses the first application. It can be learned that, when the first application runs in the background, if the current time is within the habit use time of the first application, it may be considered that the application is an application that the user needs to continue to use, and the electronic device may automatically lock the application.

In an implementation, that an electronic device automatically performs a first locking operation on a first application running in the background includes: In response to an operation of determining that the current time is within the habitual running time of the first application and the fact that a running environment requirement of the first application matches status information of the electronic device, the electronic device performs the first locking operation on the first application, where the running environment requirement of the first application is used to indicate a requirement of the first application for the status information of the electronic device, and the status information includes at least one of a Bluetooth connection status, a network connection status, location information, and remaining power. It can be learned that, when the first application runs in the background, if the current time is within the habit use time of the first application and the running environment requirement of the first application matches the status information of the electronic device, it may be considered that the application is an application that the user needs to continue to use, and the electronic device may lock the application.

In an implementation, the multi-task interface further includes a cleaning option, and the method further includes: In response to an operation performed by the user on the cleaning option for the first time, the electronic device closes an unlocked application in the plurality of applications and a preview interface of the application. In response to an operation performed by the user on the cleaning option for the second time, the electronic device closes an application that includes the first application and to which the application lock of the first type is added in the plurality of applications and a preview interface of the application. In response to an operation performed by the user on the cleaning option for the third time, the electronic device closes an application that includes the second application and to which the application lock of the second type is added in the plurality of applications and a preview interface of the application.

It may be understood that an unlocked application is probably an application that the user does not need to continue to use, an application to which the application lock of the first type is added may be an application that the user needs to continue to use, and an application to which the application lock of the second type is added is probably an application that the user needs to continue to use. Therefore, the electronic device may clean the plurality of recently running applications in batches: When the user taps the cleaning option for the first time, the electronic device cleans only the unlocked application. When the user taps the cleaning option for the second time, the electronic device may clean the application to which the intelligent lock is added (for example, the first application). When the user taps the cleaning option for the third time, the electronic device may clean the application to which the manual lock is added (for example, the second application). This can implement application cleaning, and can also keep an application that the user is most likely to continue to use alive as far as possible.

In an implementation, the multi-task interface further includes a cleaning option, and the method further includes: In response to an operation performed by the user on the cleaning option for the first time, the electronic device closes an unlocked application in the plurality of applications and a preview interface of the application. In response to an operation performed by the user on the cleaning option for the second time, the electronic device closes at least a preview interface currently visible to the user on the multi-task interface and a corresponding application, or the electronic device closes at least a preview interface with a largest display area in a preview interface currently visible to the user on the multi-task interface and a corresponding application. It can be learned that the electronic device may clean the plurality of recently running applications in batches: When the user taps the cleaning option for the first time, the electronic device cleans only the unlocked application. When the user taps the cleaning option again, the electronic device may clean all preview interfaces displayed on the multi-task interface and corresponding applications, or clean only the preview interface with the largest display area on the multi-task interface and the corresponding application. In this manner, the electronic device can clearly display applications cleaned by the electronic device. This is more intuitive for the user.

In an implementation, the method further includes: In response to an operation performed by the user on the cleaning option, the electronic device displays cleaning information, where the cleaning information is used to indicate a quantity of applications cleaned by the electronic device, and types and names of the applications. In other words, the electronic device can clearly display the quantity of applications cleaned by the electronic device, the types and the names of the applications, and the like. This is more intuitive for the user.

In an implementation, the first preview interface and the second preview interface are adjacent. In a first case, the first preview interface is completely displayed and the second preview interface is partially displayed. In a second case, the first preview interface is partially or completely displayed and the second preview interface is displayed in more parts than the first case. It can be learned that the preview interfaces of the plurality of recently used applications may be displayed on the multi-task interface in different forms. For example, the first case may be that the plurality of preview interfaces are horizontally arranged in a column and there is no overlapping area between any two adjacent preview interfaces (for example, the first preview interface may be completely displayed and the second preview interface may be partially displayed); and the second case may be that the plurality of preview interfaces may be horizontally arranged in a column and there is an overlapping area between any two adjacent preview interfaces (for example, the first preview interface may be partially or completely displayed and the second preview interface may be displayed in more parts than the first case).

According to a second aspect, this application provides an electronic device, including a processor, a memory, a communications module, and one or more computer programs. The processor is coupled to both the communications module and the memory. The one or more computer programs are stored in the memory. When a server runs, the processor executes the one or more computer programs stored in the memory, so that the server performs the application keep-alive method in any one of the foregoing descriptions.

According to a third aspect, this application provides a computer storage medium, including computer instructions.

When the computer instructions are run on a server, the server is enabled to perform the application keep-alive method according to any one of the implementations of the first aspect.

According to a fourth aspect, this application provides a chip system, and the chip system includes one or more interface circuits and one or more processors. The interface circuit and the processor are connected through a line. The chip system may be applied to an electronic device including a communications module and a memory. The interface circuit may read instructions stored in the memory of the electronic device, and send the instructions to the processor. When the instructions are executed by the processor, the electronic device may be enabled to perform the application keep-alive method according to any one of the implementations of the first aspect.

According to a fifth aspect, this application provides a computer program product. When the computer program product runs on a server, the server is enabled to perform the application keep-alive method according to any one of the implementations of the first aspect.

It may be understood that the electronic device according to the second aspect, the computer storage medium according to the third aspect, and the computer program product according to the fifth aspect are all used to perform the foregoing corresponding method. Therefore, for beneficial effects that can be achieved, refer to beneficial effects in the foregoing corresponding methods. Details are not described herein again.

BRIEF DESCRIPTION OF THE DRAWINGS

FIG. 1C is an interface diagram according to this application;

DETAILED DESCRIPTION OF ILLUSTRATIVE EMBODIMENTS

Figure 1A:
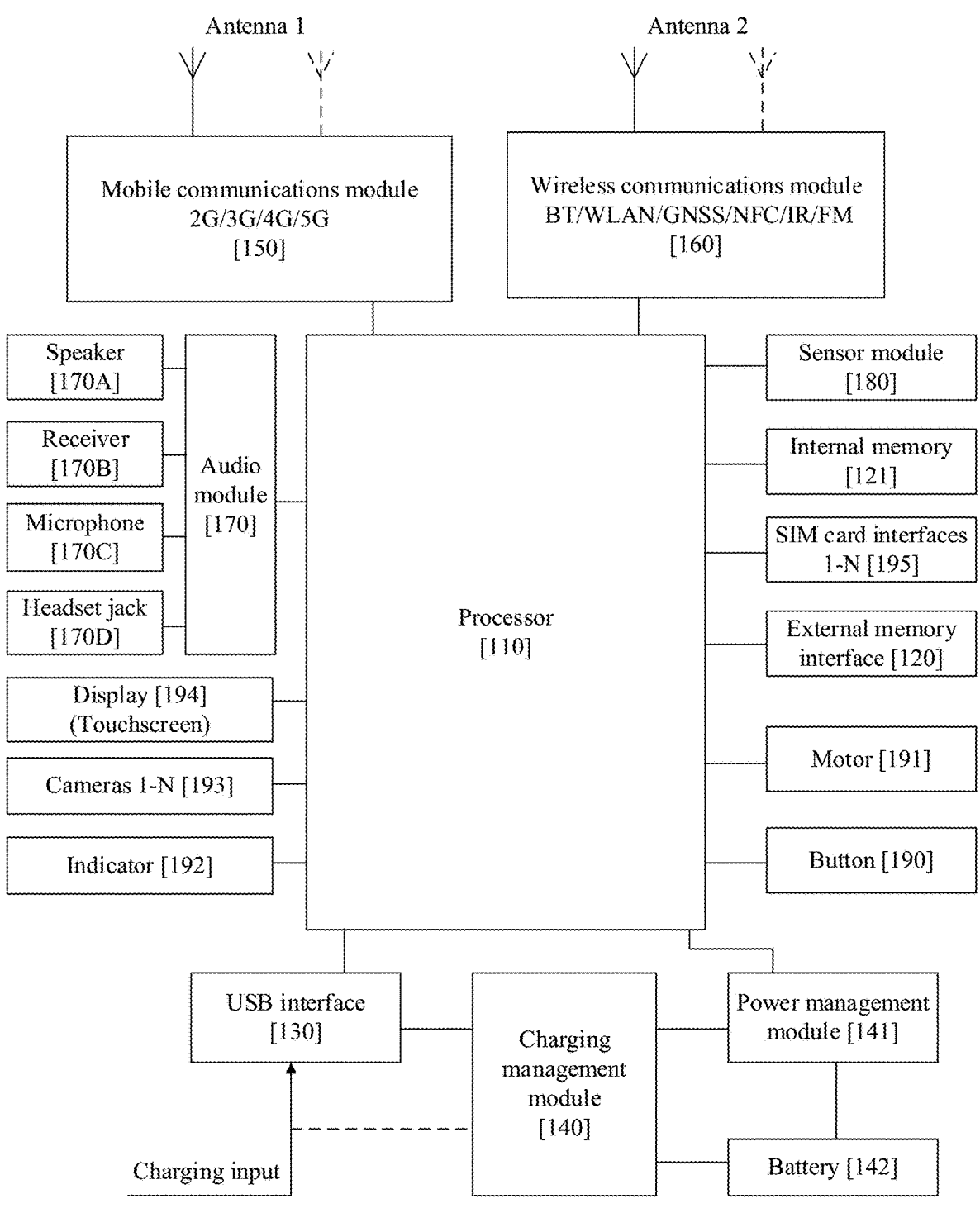
FIG. 1A is a schematic diagram of a structure of an electronic device according to this application.

Terms "first" and "second" are merely used for description below, and cannot be understood as indication or relative importance implication or implicit indication of a quantity of indicated technical features. Therefore, a feature defined as "first" or "second" may explicitly or implicitly include one or more of the features. In descriptions of embodiments, unless otherwise stated, "a plurality of" means two or more.

Currently, an electronic device (such as a mobile phone) may automatically kill the background. The background killing may be behavior that the mobile phone closes an application that occupies relatively large running memory or consumes relatively high power in a recent task list when the mobile phone has insufficient running memory or insufficient remaining power. This behavior can ensure that the electronic device has sufficient running memory to smoothly run, and can also save power to prolong a standby time of the electronic device. For example, in a cache process, a video app consumes power and also occupies relatively large running memory. When the mobile phone automatically kills the background, a process related to the video app may be killed. Consequently, the video app is closed, causing cache suspension.

The foregoing solution has the following features: When automatically killing the background, the mobile phone determines information such as power consumption and memory occupation of each application in the recent task list, and determines, based on the power consumption and the memory occupation of each application, whether the application needs to be closed. Therefore, if an application occupies relatively large memory or consumes relatively high power, regardless of whether the application is an application that a user needs to continue to use, the application is very likely to be closed. In other words, a current mechanism that the mobile phone automatically kills the background is likely to cause the mobile phone to mistakenly close some applications that the user needs to continue to use subsequently. Consequently, user experience is affected.

To resolve the foregoing problem, this application provides an application keep-alive method and an electronic device. The electronic device may automatically perform a first locking operation on a first application running in the background, to add an application lock of a first type (which may be understood as an intelligent lock) to the first application. The first application is an application that the electronic device predicts that a user needs to continue to use. For example, the first application may be an application that is executing a preset task (for example, a download task) in response to a user requirement, or may be an application that meets a user's usage habit. In the following embodiments, a specific example is used to describe an application (that is, the first application) that the user still needs to use. Therefore, details are not described herein. Locking the first application may enable the first application to be in a keep-alive state, so that the first application is prevented from being closed when the electronic device automatically kills the background, and therefore continues to serve the user.

In addition, the electronic device may further display a multi-task interface. The multi-task interface includes preview interfaces of a plurality of applications recently used by the user, the plurality of recently used applications may include the first application and a second application, and the second application is an application that the electronic device predicts that the user may continue to use. The preview interfaces of the plurality of applications include a first preview interface and a second preview interface, the first preview interface is a preview interface of the first application, and the second preview interface is a preview interface of the second application. The electronic device may display a first identifier on the first preview interface, where the first identifier is used to indicate that the application lock of the first type is added to the first application. The electronic device may further receive a second operation performed by the user on the second preview interface. In response to the second operation, the electronic device performs a second locking operation on the second application to add an application lock of a second type (which may be understood as a manual lock) to the second application, and displays a second identifier on the second preview interface, where the second identifier is used to indicate that the application lock of the second type is added to the second application.

The application keep-alive method provided in embodiments of this application may be applied to the electronic device. The electronic device may be specifically a mobile phone, a tablet computer, a television (which may also be referred to as a smart screen, a large-screen device, or the like), a notebook computer, a ultra-mobile personal computer (Ultra-mobile Personal Computer, UMPC), a handheld computer, a netbook, a personal digital assistant (Personal Digital Assistant, PDA), a wearable electronic device, a vehicle-mounted device (which may also be referred to as a vehicle), a virtual reality device, or the like. This is not limited in embodiments of this application.

As shown in FIG. 1A, an electronic device 100 (such as a mobile phone) may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) interface 195, and the like.

It may be understood that a structure shown in this embodiment does not constitute a specific limitation on the electronic device 100. In some other embodiments, the electronic device 100 may include more or fewer components than those shown in the figure, or may combine some components, or may split some components, or may have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

Figure 1B:
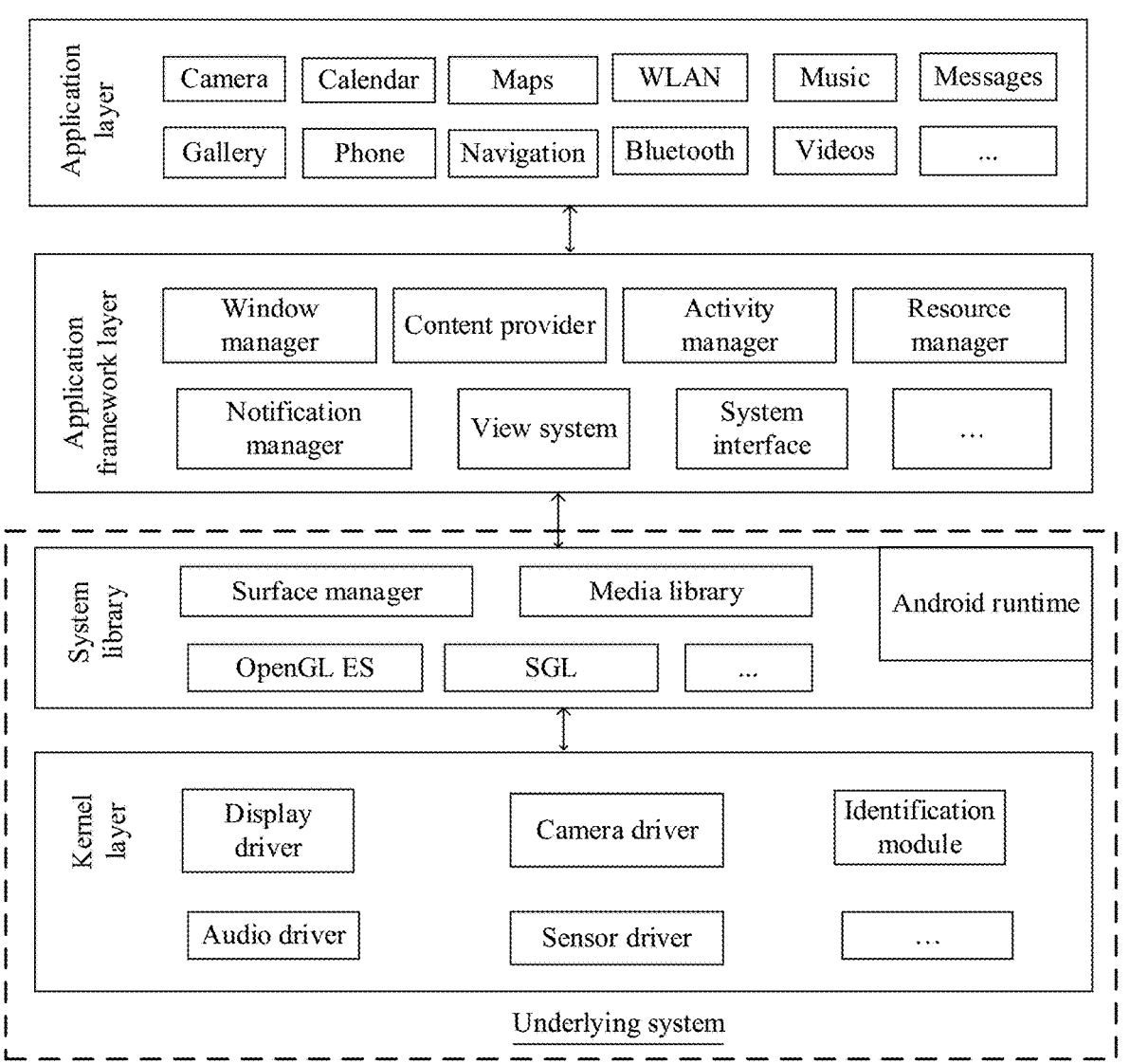
FIG. 1B is a diagram of a software architecture of an electronic device according to this application.

A software system of the electronic device 100 may use a layered architecture, an event-driven architecture, a micro-kernel architecture, a micro service architecture, or a cloud architecture. In this embodiment of the present invention, an Android system of a layered architecture is used as an example to describe a software structure of the electronic device 200. FIG. 1B is a block diagram of the software structure of the electronic device 200 according to an embodiment of this application.

In the layered architecture, software is divided into several layers, and each layer has a clear role and task. The layers communicate with each other through an interface. In some embodiments, the Android system is divided into four layers: an application layer, an application framework layer, an Android runtime (Android runtime) and system library, and a kernel layer from top to bottom.

The application layer may include a series of application packages.

As shown in FIG. 1B, the application packages may include applications (application, APP) such as Camera, Gallery, Calendar, Phone, Maps, Navigation, WLAN, Bluetooth, Music, Videos, and Messages.

The application framework layer provides an application programming interface (application programming interface, API) and a programming framework for an application on the application layer. The application framework layer includes some predefined functions.

As shown in FIG. 1B, the application framework layer may include an activity manager (activity manager), a window manager (window manager service), a content provider, a view system, a resource manager, a notification manager, a system interface (system UI), and the like. This is not limited in this embodiment of this application.

The activity manager is configured to manage a lifecycle of each application. An application generally runs in a form of an activity in the electronic device 200. For each activity, there is a corresponding application record (Activity Record) in the activity manager, and the activity record records a status of the activity of the application. The activity manager may use this activity record as an identifier to schedule an activity process of the application.

The window manager is configured to manage a graphical user interface (graphical user interface, GUI) resource used on a screen, and may be specifically configured to: obtain a display size, create and destroy a window, display and hide a window, perform window layout, perform focus management, perform input method management, perform wallpaper management, and the like.

The content provider is configured to store and obtain data, and enable the data to be accessed by an application. The data may include a video, an image, audio, calls that are made and received, a browsing history and bookmarks, an address book, and the like.

The view system may be configured to construct a display interface of an application. Each display interface may include one or more controls. Generally, the control may include an interface element such as an icon, a button, a menu, a tab, a text box, a dialog box, a status bar, a navigation bar, or a widget (widget).

The notification manager enables an application to display notification information in a status bar, and may be configured to convey a notification-type message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application running in the background, or may be a notification that appears on the screen in a form of a dialog window. For example, text information is prompted in the status bar, an alert sound is played, the electronic device vibrates, or the indicator light blinks.

The system UI is a core application of the Android system, and is responsible for feeding back a system and an application status, and keeping interaction with the user. The system UI includes a status bar (status bar), a navigation bar (navigation bar), a notification panel (notification panel), a recent task interface (recents).

The system library, the kernel layer, and the like below the application framework layer may be referred to as an underlying system. The underlying system includes an underlying display system configured to provide a display service. For example, the underlying display system includes a display driver in the kernel layer and a surface manager (surface manager) in the system library.

As shown in FIG. 1B, the Android runtime includes a kernel library and a virtual machine. The Android runtime is responsible for scheduling and management of the Android system. The kernel library includes two parts: a function that needs to be invoked in Java language, and a kernel library of Android. The application layer and the application framework layer run in the virtual machine. The virtual machine executes Java files at the application layer and the application framework layer as binary files. The virtual machine is configured to implement functions such as object lifecycle management, stack management, thread management, security and exception management, and garbage collection.

As shown in FIG. 1B, the system library may include a plurality of function modules, for example, a surface manager, a media library (Media Library), OpenGL ES, and SGL. The surface manager is configured to manage a display subsystem and provide fusion of 2D and 3D layers for a plurality of applications. The media library supports play-back and recording in a plurality of commonly used audio and video formats, and static image files. The media library may support a plurality of audio and video coding formats, such as MPEG-4, H.164, MP3, AAC, AMR, JPG, and PNG. OpenGL ES is configured to implement three-dimensional graphics drawing, image rendering, composition, layer processing, and the like. SGL is a drawing engine for 2D drawing.

The kernel layer is a layer between hardware and software. The kernel layer includes at least a display driver, a camera driver, an audio driver, a sensor driver, and the like. This is not limited in this embodiment of this application.

The following uses an example in which the electronic device 100 is a mobile phone to specifically describe the application keep-alive method provided in embodiments of this application.

The mobile phone includes a recent task list (or referred to as a multi-task list), and the recent task list includes a plurality of applications that are recently run by the mobile phone (or may be understood as a plurality of applications that are recently used by a user). The plurality of recently running applications may include an application that has been killed by the mobile phone (that is, an application that has been closed), an application running in the foreground, and an application running in the background. The application running in the foreground is visible, and can run in a current window (currently displayed window) of the mobile phone, and the user can directly interact with the application running in the foreground. The application running in the background is invisible, and generally can run in a resource manager, and the user cannot directly interact with the app running in the background.

The mobile phone may automatically perform a first locking operation on a first application in the plurality of recently running applications. The first locking operation may be an operation that the mobile phone adds an intelligent lock to the first application, and the first locking operation may enable the first application to be in a keep-alive state (which may be understood as a state in which the first application is not automatically killed by the mobile phone), so as to prevent the first application from being automatically killed by the mobile phone and then closed. It may be understood that, when the mobile phone automatically kills the background, an application to which an intelligent lock is added (that is, in a keep-alive state) may not be closed, so that the application to which the intelligent lock is added can remain in a running state.

The first application is an application that the electronic device predicts that the user needs to continue to use. Specifically, the first application may include two types: The first type is an application that runs in the background and that meets a user's usage habit. The second type is an application that runs in the background and that is executing a preset task in response to a user requirement. The following specifically describes a manner in which the mobile phone determines the first application from the recent task list.

For the first type, the mobile phone may obtain habit use data, and determine, based on the habit use data, whether the plurality of recently running applications include the first application. The habit use data may be used to reflect a habit use time, a habit use place, a habit use status, and the like of the user for each application.

Figure 2A:
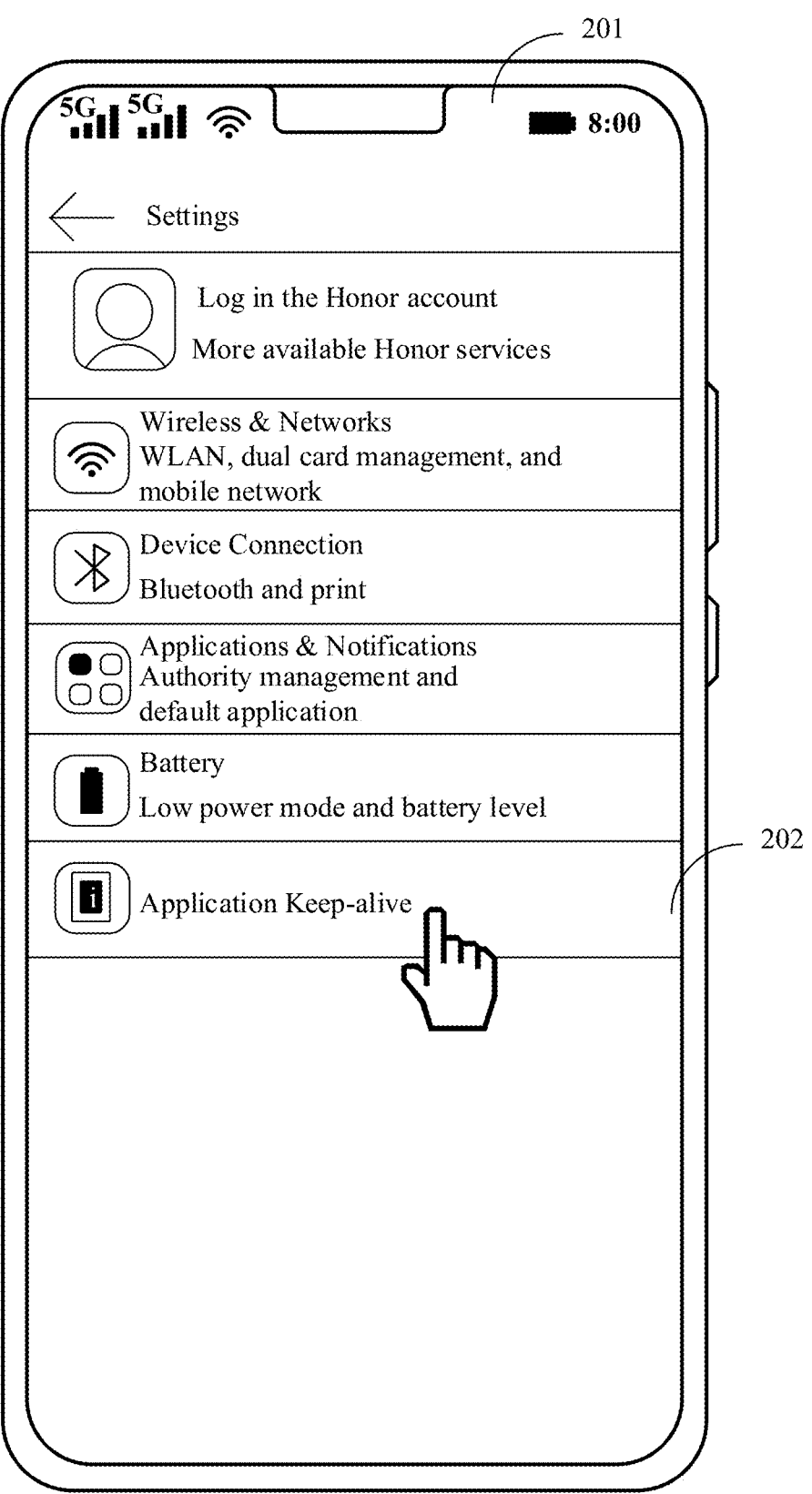
FIG. 2A(a) to FIG. 2A(c) are an interface diagram according to this application.
Figure 2A:
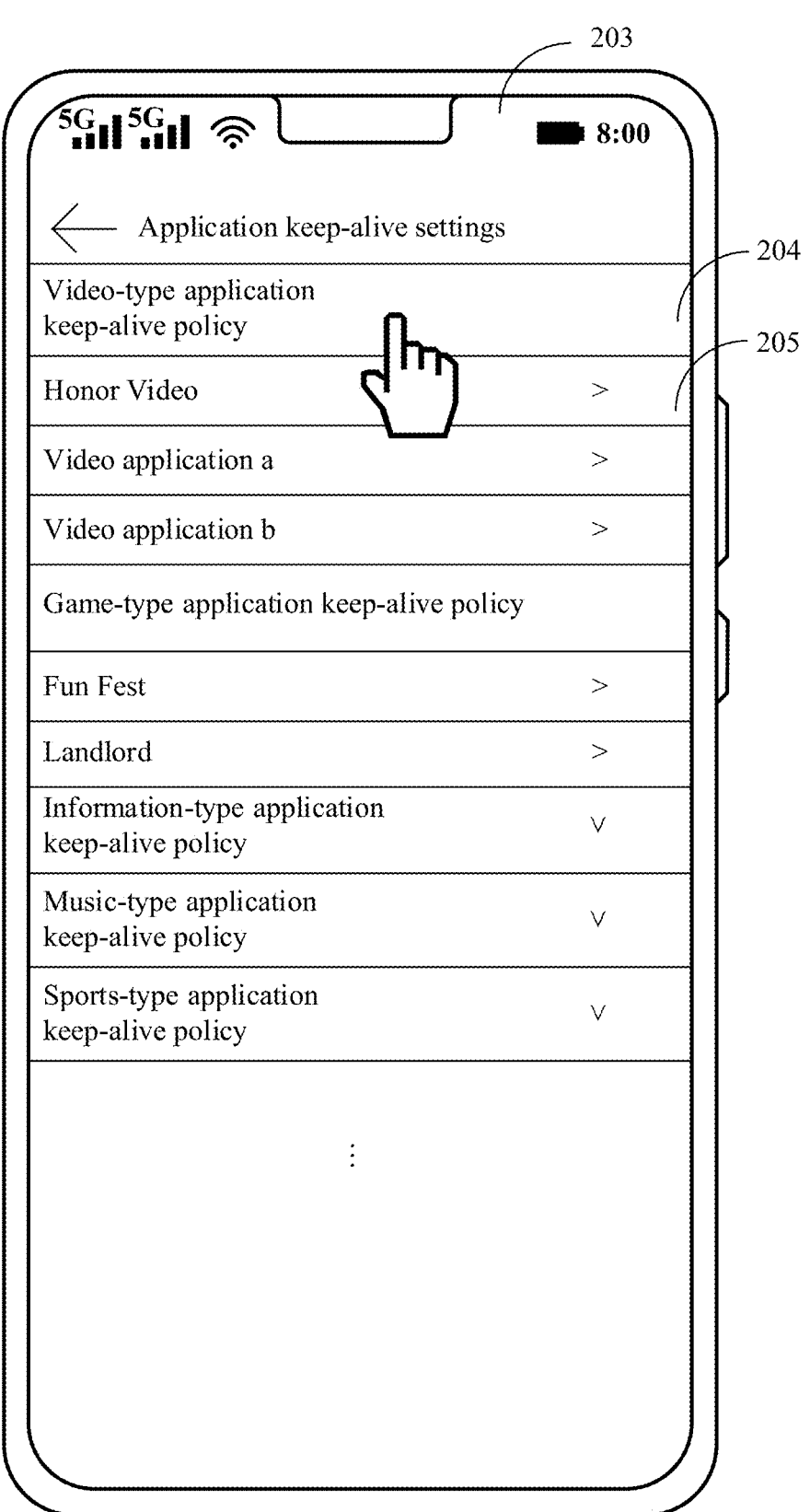
Figure 2A:
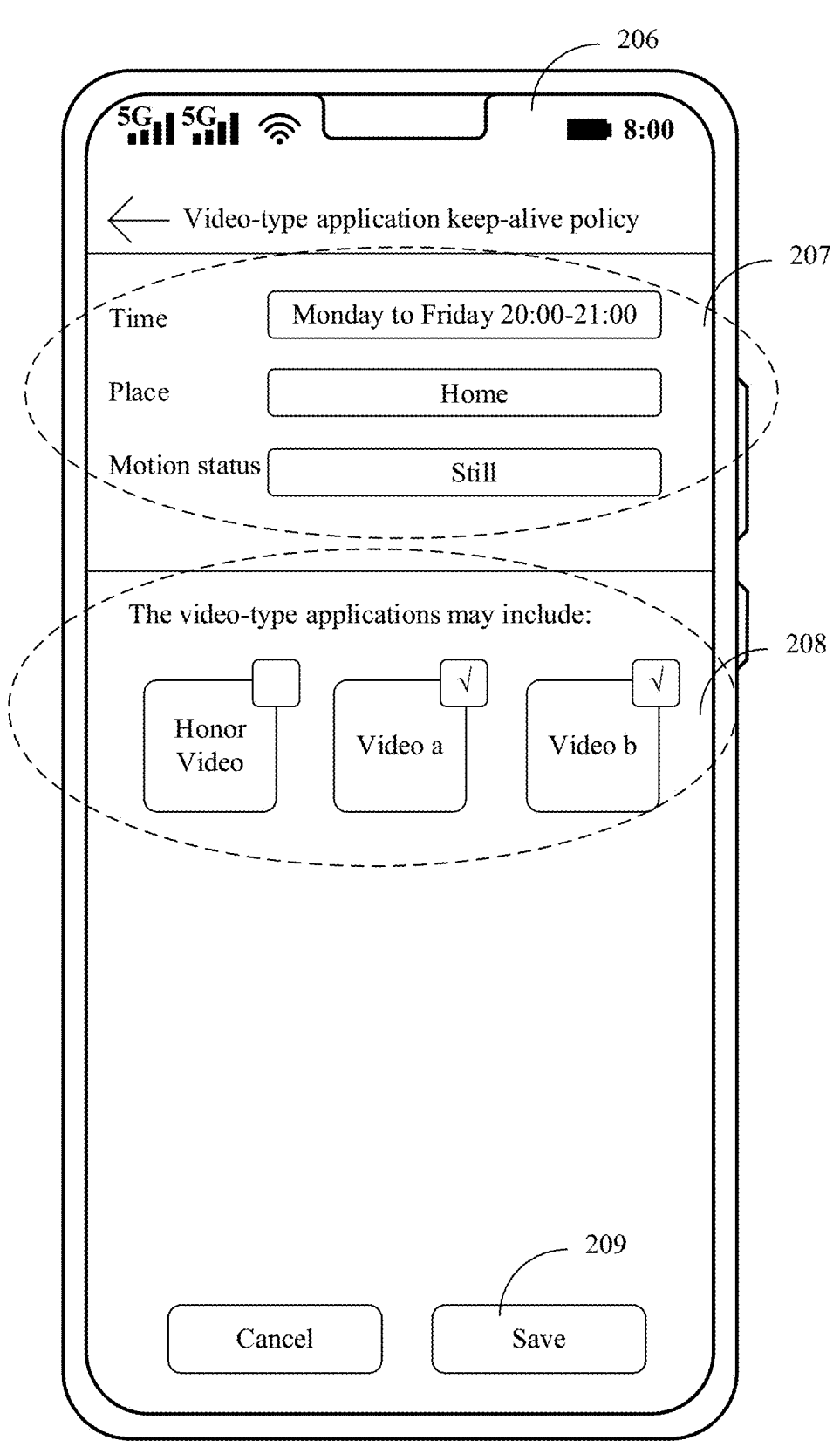

The mobile phone may obtain the habit use data in two manners: One manner is that the mobile phone may collect a habit of using each application by the user, and extract the habit use data from the habit. The other manner is that the mobile phone may provide the user with a way of setting a keep-alive policy (which may be understood as setting the habit use data), and obtain the habit use data in response to the setting operation of the user. For example, as shown in FIG. 2A(a), the mobile phone may display a setting interface 201. The setting interface 201 may include a plurality of setting options, for example, "Wireless & Networks", "Device Connection", "Battery", and "Application Keep-alive" 202. When the user wants to set a keep-alive policy, the user may tap "Application Keep-alive" 202. In response to the operation, the mobile phone may display an application keep-alive setting interface 203 shown in FIG. 2A(b). The application keep-alive setting interface 203 may provide the user with a same-type application keep-alive policy option (for example, "Video-type application keep-alive policy" 204 and "Game-type application keep-alive policy") and an option for independently setting a keep-alive policy of an application (for example, Honor Video 205 and Fun Fest). All applications may be arranged in a centralized manner based on an application type to which the applications belong. This facilitates user management and view. For example, Honor Video 205, a video application a, and a video application b are all video-type applications and may be arranged in a centralized manner, and Fun Fest and Landlord are all game-type applications and may be arranged in a centralized manner.

For example, the mobile phone may receive an operation that the user taps "Video-type application keep-alive policy" 204. In response to the operation, the mobile phone may display an interface 206 shown in FIG. 2A(c). The interface 206 may include an input bar 207 and an application selection bar 208. The input bar 207 may be used by the user to set a habit use time (that is, "Time" on the interface 206), a habit use place (that is, "Place" on the interface 206), a habit use status (that is, "Motion status" on the interface 206), and the like of a video-type application. The application selection bar 208 includes all applications that are pre-classified by the mobile phone into video-type applications (for example, Honor Video 205, the video application a, and the video application b). The application selection bar 208 may be used by the user to manually select an application that needs to be classified into the video-type applications. This meets a personalized user requirement. For example, in the input bar 207, the user may enter or select "Monday to Friday 20:00-21:00" in "Time", enter or select "Home" in "Place", and enter or select "Still" in "Status". In addition, after selecting a video-type application other than Honor Video 205 in the application selection bar 208, the user taps an "Save" option 209. In response to the operation, the mobile phone may set a habit use time of the video-type application other than Honor Video 205 to "Monday to Friday 20:00-21:00", set a habit use place to "Home", and set a habit use status to "Still". It can be learned that the mobile phone can set habit use data of applications of a same type in batches. This facilitates unified user management.

Figure 2B:
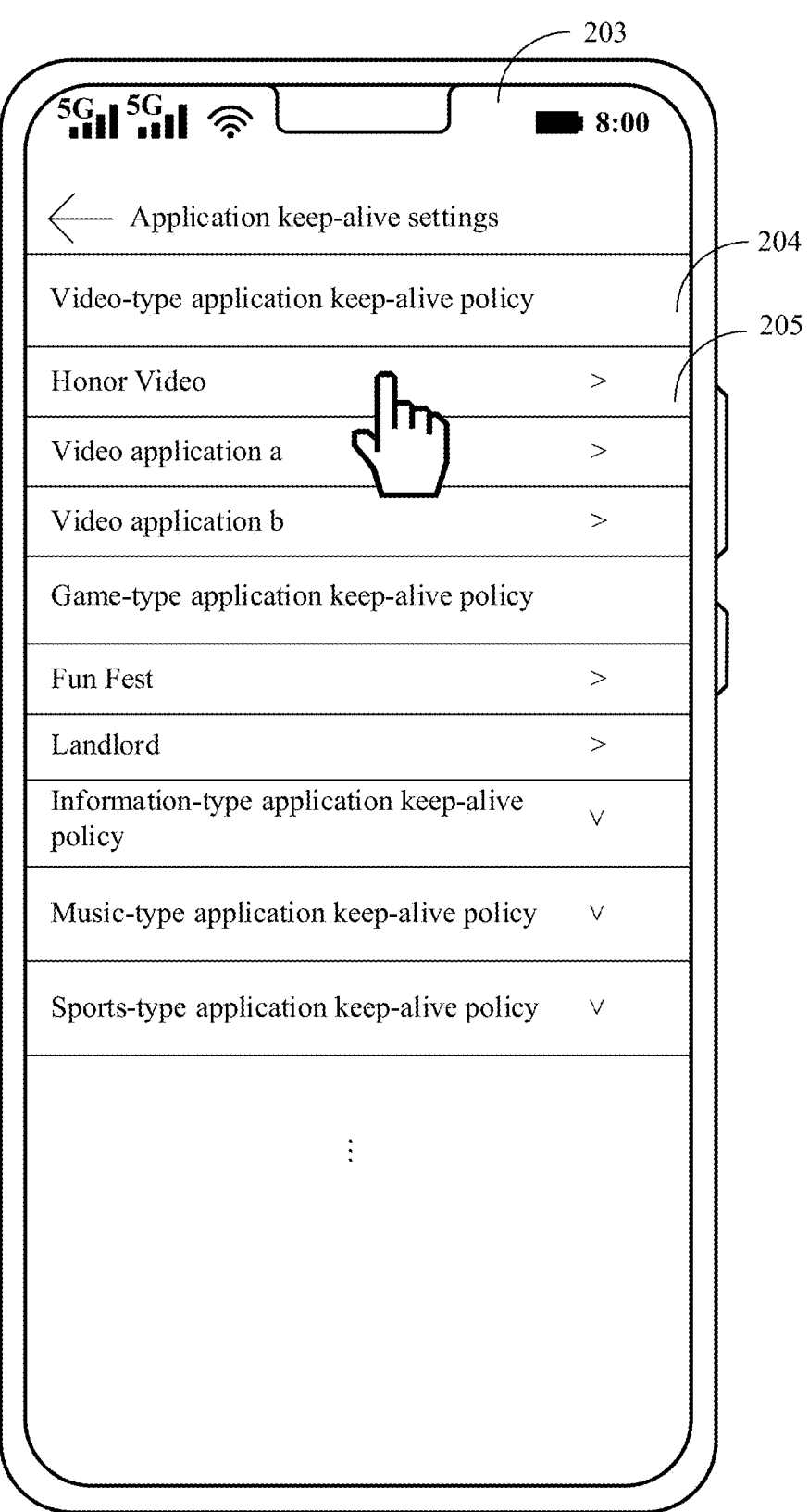
FIG. 2B(a) to FIG. 2B(c) are an interface diagram according to this application.
Figure 2B:
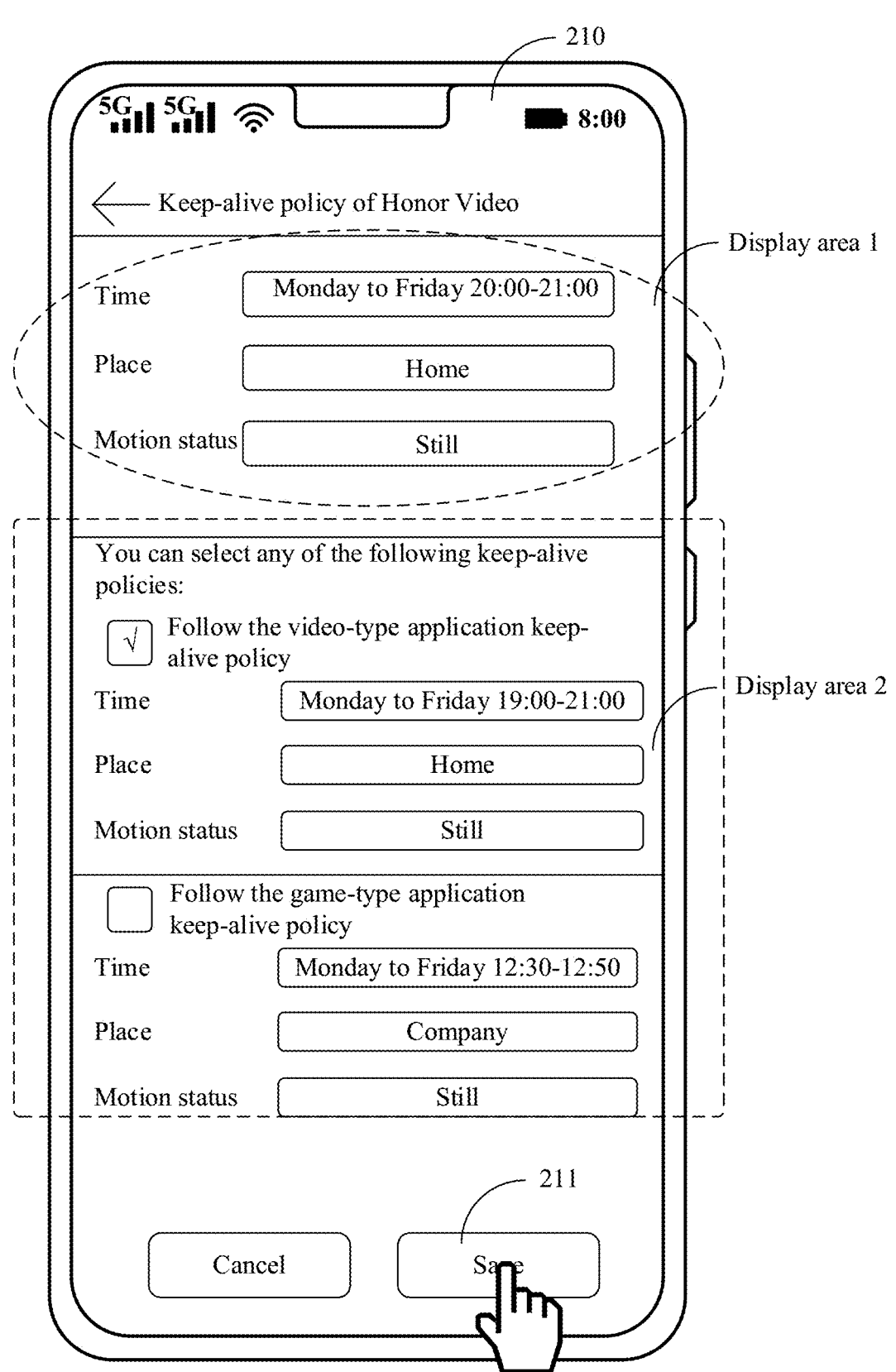
Figure 2B:
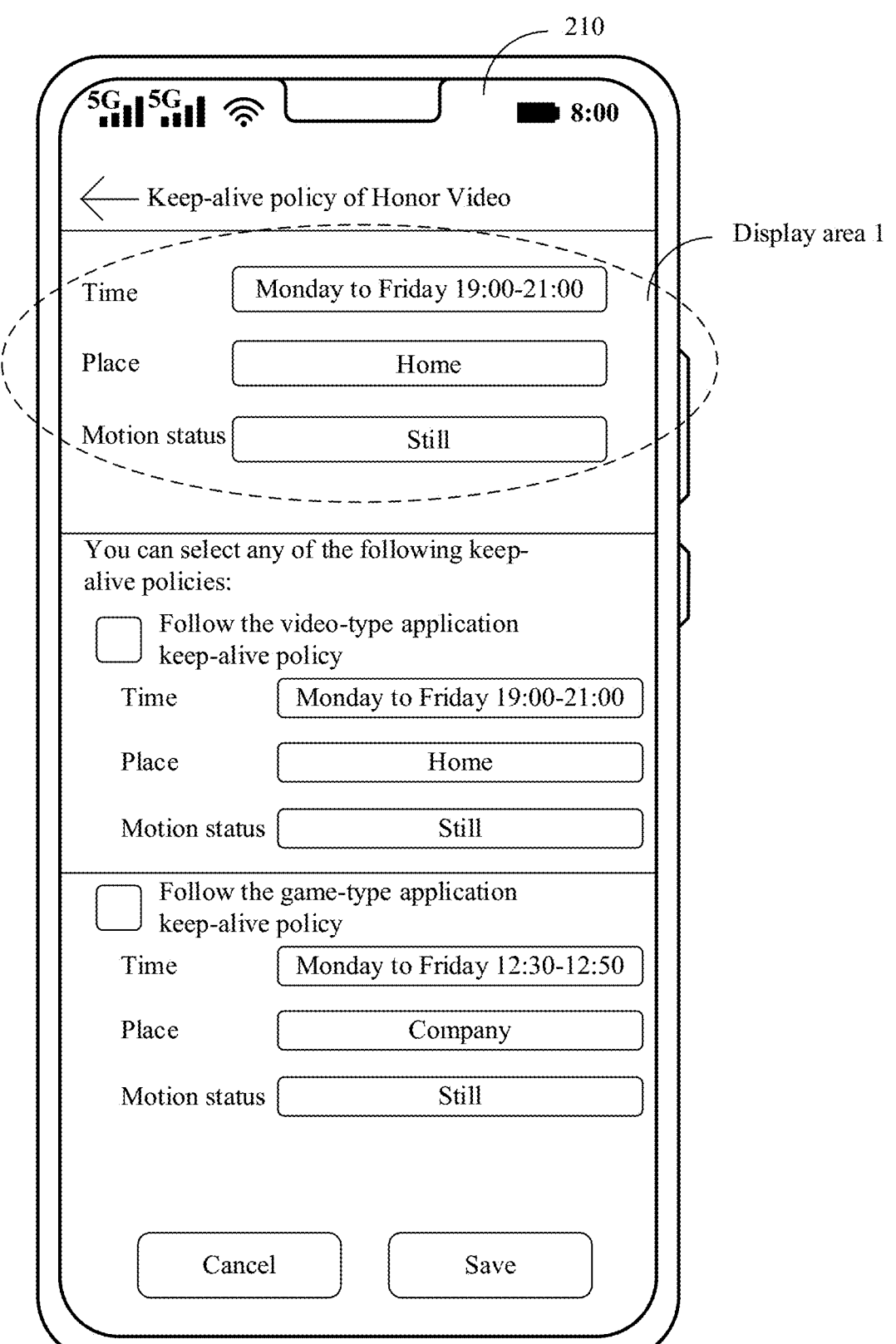

For example, as shown in FIG. 2B(a), the mobile phone may receive an operation that the user taps Honor Video 205. In response to the operation, the mobile phone may display an interface 210 shown in FIG. 2B(b). The interface 210 includes a display area 1 and a display area 2. The display area 1 may indicate a current keep-alive policy of Honor Video 205 (for example, "Time" is "Monday to Friday 20:00-21:00", "Place" is "Home", and "Status" is "Still"). The display area 2 may include a keep-alive policy of each application (for example, a video-type application, a game-type application, and a communication-type application) (for example, the video-type application keep-alive policy is: "Time" is "Monday to Friday 20:00-21:00", "Place" is "Home", and "Status" is "Still"). If the user wants to quickly change the keep-alive policy of Honor Video 205, the user may directly select a keep-alive policy of any type of application in the display area 2, and tap a "Save" option 211. For example, the mobile phone may receive an operation that the user selects "Follow the video-type application keep-alive policy" in the display area 2 and tap the "Save" option 211, to change the keep-alive policy of Honor Video 205 to the video-type application keep-alive policy. If the user wants to set the keep-alive policy of Honor Video 205, the user may enter or select a time, a place, and a status in the display area 1. The mobile phone may receive an operation that the user sets the keep-alive policy in the display area 1 and then taps the "Save" option 211, to change the keep-alive policy of Honor Video 205 to a value that is set by the user. It should be noted that, as shown in FIG. 2B(c), after the mobile phone completes the setting, the mobile phone may automatically refresh the keep-alive policy of Honor Video 205 in the display area 1.

In an optional design, if the user does not manually set the keep-alive policy, each parameter in the keep-alive policy may be set by default to a corresponding parameter value in the habit use data collected and extracted by the mobile phone.

In an optional design, the mobile phone may separately determine, based on any one of parameters such as the habit use place, the habit use status, or another parameter included in the habit use data of the user, whether the application running in the background is an application that the user needs to continue to use. For example, when an application a runs in the background, the mobile phone may determine whether a current time matches a habit use time corresponding to the application a. The current time may be a current system time of the mobile phone, and that a current time matches a habit use time corresponding to the application a may mean that the current time is within a range indicated by the habit use time. For example, if the system time (that is, the current time) at which the application a runs is 8:20, and the habit use time corresponding to the application a is 8:00-9:00, it may be considered that the current time matches the habit use time corresponding to the application a because 8:20 is within the time range of 8:00-9:00. If the current time matches the habit use time corresponding to the application a, the mobile phone may use the application a as an application that the user needs to continue to use (that is, the first application). For example, the habit use data of the user may be shown in Table 1.

TABLE 1

| Application name | Habit use time |
|---|---|
| Music application | 8:00-8:30 |
| Read application | 8:00-8:30 |
| Video application | 12:00-13:00 |
| Sports application | 20:30-21:00 |
| . . . | . . . |

It may be learned from Table 1 that the user habitually uses the music application and the read application during 8:00-8:30, habitually uses the video application during 12:00-13:00, and habitually uses the sports application during 20:30-21:00. Therefore, if the music application and the read application are in a background running state during 8:00-8:30, in this period, it may be considered that the music application and the read application need to keep alive, and the mobile phone may add an intelligent lock to the music application and the read application. If the video application is in a background running state during 12:00-13:00, in this period, it may be considered that the video application needs to keep alive, and the mobile phone may add an intelligent lock to the video application. If the sports application is in a background running state during 20:30-21:00, in this period, it may be considered that the sports application needs to keep alive, and the mobile phone may add an intelligent lock to the sports application.

It should be noted that the manner in which the mobile phone separately determines, based on parameters such as the habit use place and the habit use status, whether the application running in the background is an application that the user needs to continue to use is similar to the foregoing content about the habit use time, and details are not described herein again.

In another optional design, the mobile phone may alternatively perform comprehensive determining based on the habit use place, the habit use status, and another parameter in the habit running data of the user. The habit use place may be understood as a conventional place at which the user uses a corresponding application. For example, a habit use place of the music application may be in-service, and the habit use place of the video application may be home. The habit use status may be understood as a state in which the user uses a corresponding application. For example, the habit use status of the video application may be a still state, and the habit use status of the Sports application may be a motion status.

For example, when an application b runs in the background, the mobile phone may determine whether a current time matches a habit use time corresponding to the application b, determine whether a current location of the mobile phone matches a habit use place corresponding to the application b, and determine whether a current running status of the user matches a habit use status corresponding to the application b. If the current time matches the habit use time, the current location matches the habit use place, and the current motion status of the user matches the habit use status, the mobile phone may use the application b as an application that the user needs to continue to use (that is, the first application).

In a design, the mobile phone may alternatively comprehensively determine, based on the habit use data, a running environment requirement of each application, and status information of the mobile phone, whether the application running in the background is the first application. The running environment requirement of the application may indicate a requirement of the application for the status information of the mobile phone, for example, whether Bluetooth needs to be connected, whether a network is connected, or whether power is sufficient. It can be learned that the status information may include at least one of a Bluetooth connection status, a network connection status, and remaining power. For example, if the application b can run normally only in a network connected case, when determining that the current time, the location, and/or the motion status match/matches the habit use data corresponding to the application b, the mobile phone further needs to determine the network connection status. If the network connection status indicates that the mobile phone is connected to the network, the mobile phone may use the application b as an application that the user needs to continue to use. Otherwise, the mobile phone does not use the application b as an application that the user needs to continue to use.

For the second type, the mobile phone may pre-configure a keep-alive task (also referred to as a preset task) for each application. The keep-alive task may include a task that is executed by an application to meet a user requirement. In an optional implementation, the keep-alive task may be set by the mobile phone based on an application type. For example, a keep-alive task of the music-type application may be playing music, and a keep-alive task of the video application may be caching a video. In another optional implementation, the keep-alive task may alternatively be set by the user. The mobile phone may monitor whether each application running in the background is executing a corresponding keep-alive task. If it is determined that any application is executing a corresponding keep-alive task, the mobile phone uses the application as an application that the user needs to continue to use, and adds an intelligent lock to the application, so as to prevent the application from being automatically closed by the mobile phone. For example, each application and the corresponding keep-alive task may be shown in Table 2.

TABLE 2

| Application name | Keep-alive task |
| --- | --- |
| Music application | Playing music |
| Train Travel | Buying a ticket |
| Video application | Caching a video |
| Game application | Playing a game |
| . . . | . . . |

It may be learned from Table 2 that the keep-alive task of the music application is playing music, the keep-alive task of Train Travel is buying a ticket, the keep-alive task of the video application is caching a video, and the keep-alive task of the game application is playing a game. In this way, if the video application is caching a video, to prevent the mobile phone from automatically closing the video application and causing cache suspension, the mobile phone may automatically add an intelligent lock to the video application. If Train Travel is buying a ticket, to prevent the mobile phone from automatically closing Train Travel and causing a ticket buying failure, the mobile phone may automatically add an intelligent lock to Train Travel. If the music application is playing music, to prevent the mobile phone from automatically closing the music application and causing music playing interruption, the mobile phone may automatically add an intelligent lock to the music application. It should be noted that Table 2 is only an example. Actually, one application may correspond to one or more keep-alive tasks.

Figure 3A:
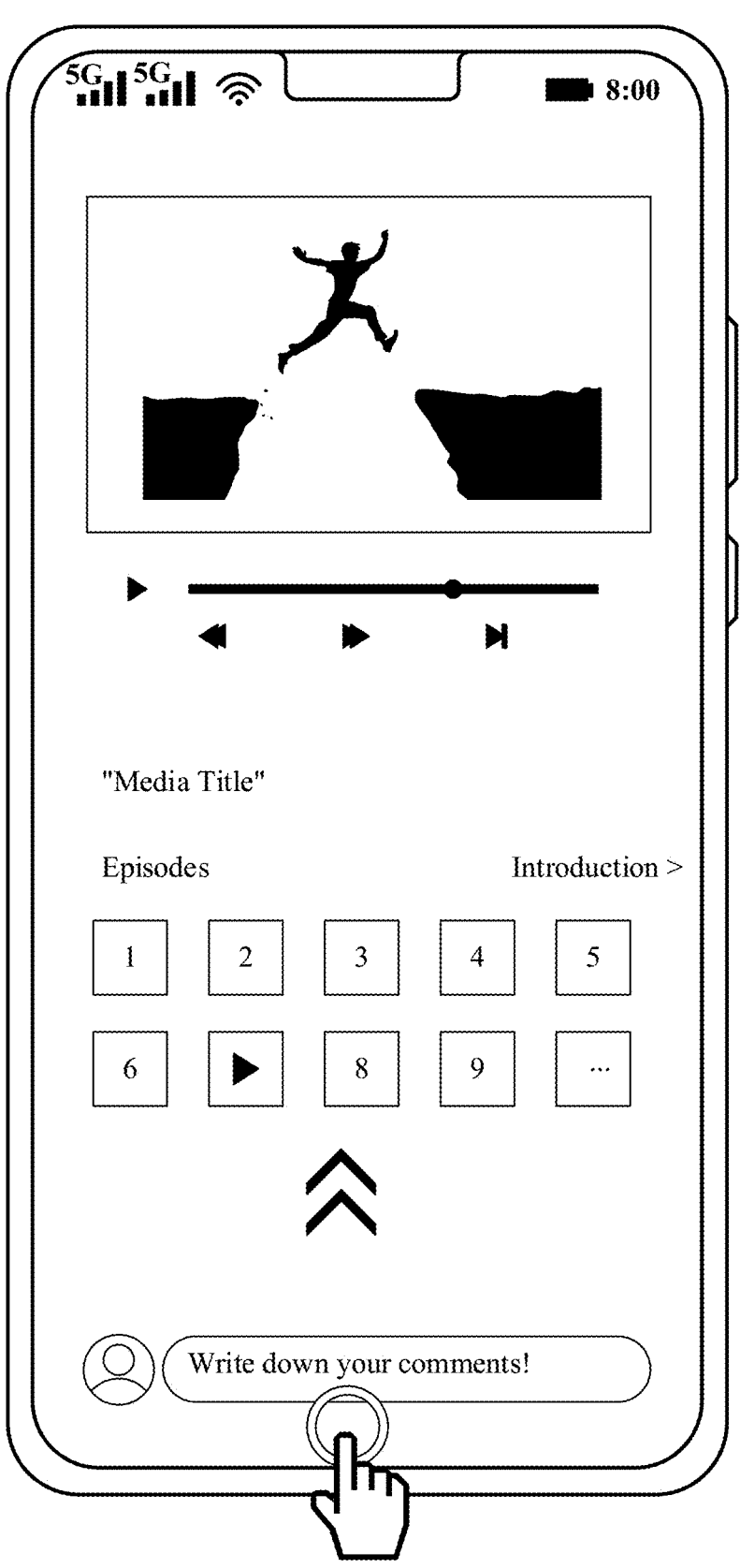
FIG. 3A(a) and FIG. 3A(b) are an interface switching diagram according to this application.
Figure 3A:
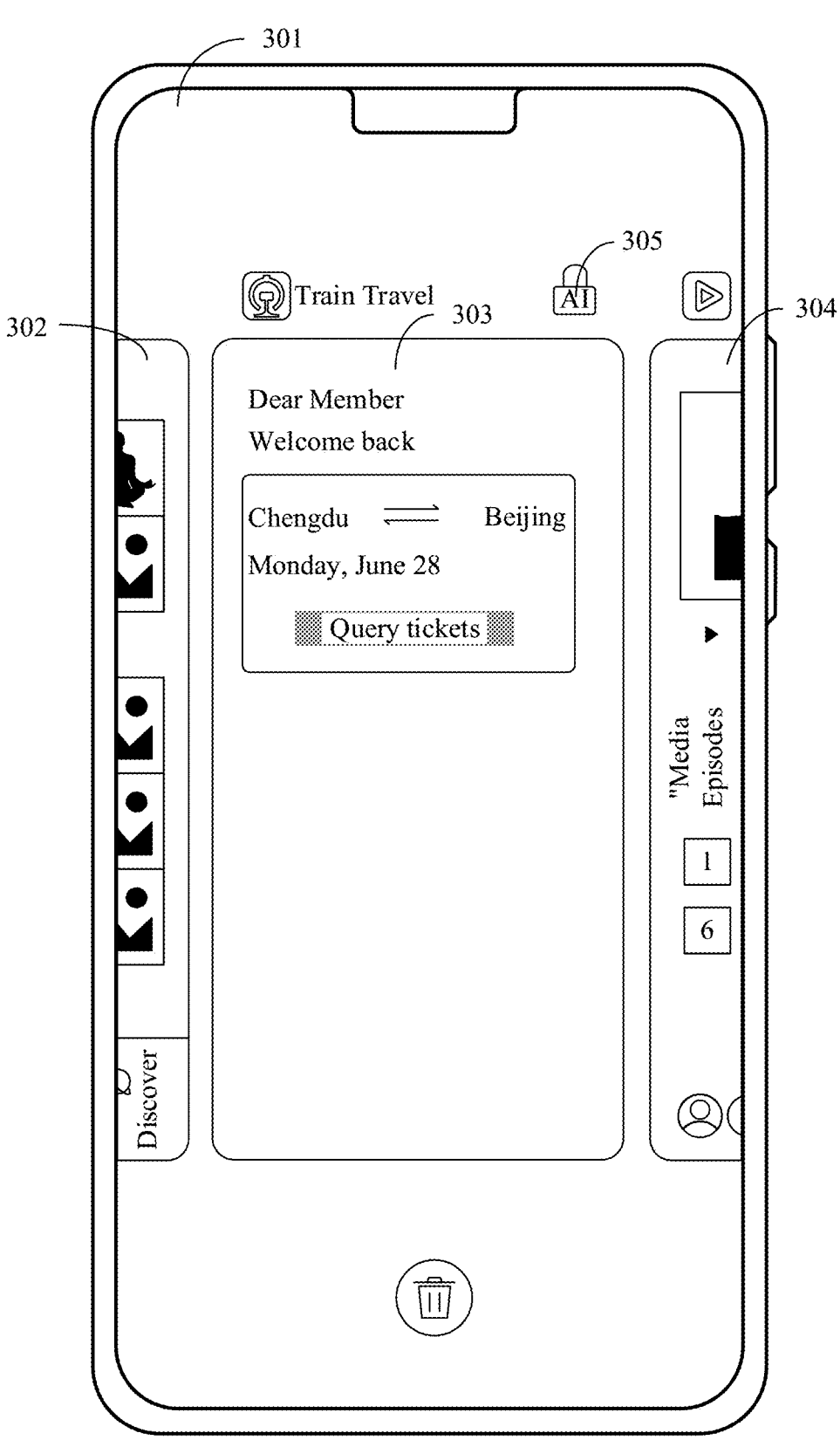

In this embodiment of this application, after adding the intelligent lock to the first application, the mobile phone may further add an intelligent lock identifier (also referred to as a first identifier) to the first application on a recent task interface (or referred to as a multi-task interface). The recent task interface is used to display preview interfaces of a plurality of recently used applications and a lock status of each application. The mobile phone may receive an operation that the user enables the recent task interface. In response to the operation, the mobile phone may display the recent task interface. There may be a plurality of operations that the user enables the recent task interface. In a design, as shown in FIG. 3A(a), the mobile phone may receive an operation that the user slides on the bottom of a screen and keeps the finger touching the screen without lifting. In response to the operation, the mobile phone may display a recent task interface 301 shown in FIG. 3A(b). The recent task interface 301 may include a preview interface 302 of Gallery, a preview interface 303 of Train Travel, and a preview interface 304 of the video application. In addition, the mobile phone further displays a first lock icon 305 on the preview interface 303 of Train Travel, where the first lock icon 305 is used to indicate that an intelligent lock is added by the mobile phone to Train Travel. It should be noted that, that the first lock icon 305 is displayed on the preview interface 303 may also be understood as that the first lock icon 305 is displayed at a preset location near the preview interface 303. For example, the first lock icon 305 is displayed at an upper corner, a lower corner, a left corner, or a right corner of the preview interface 303 or any location on the preview interface 303. This is not specifically limited herein.

Figure 3B:
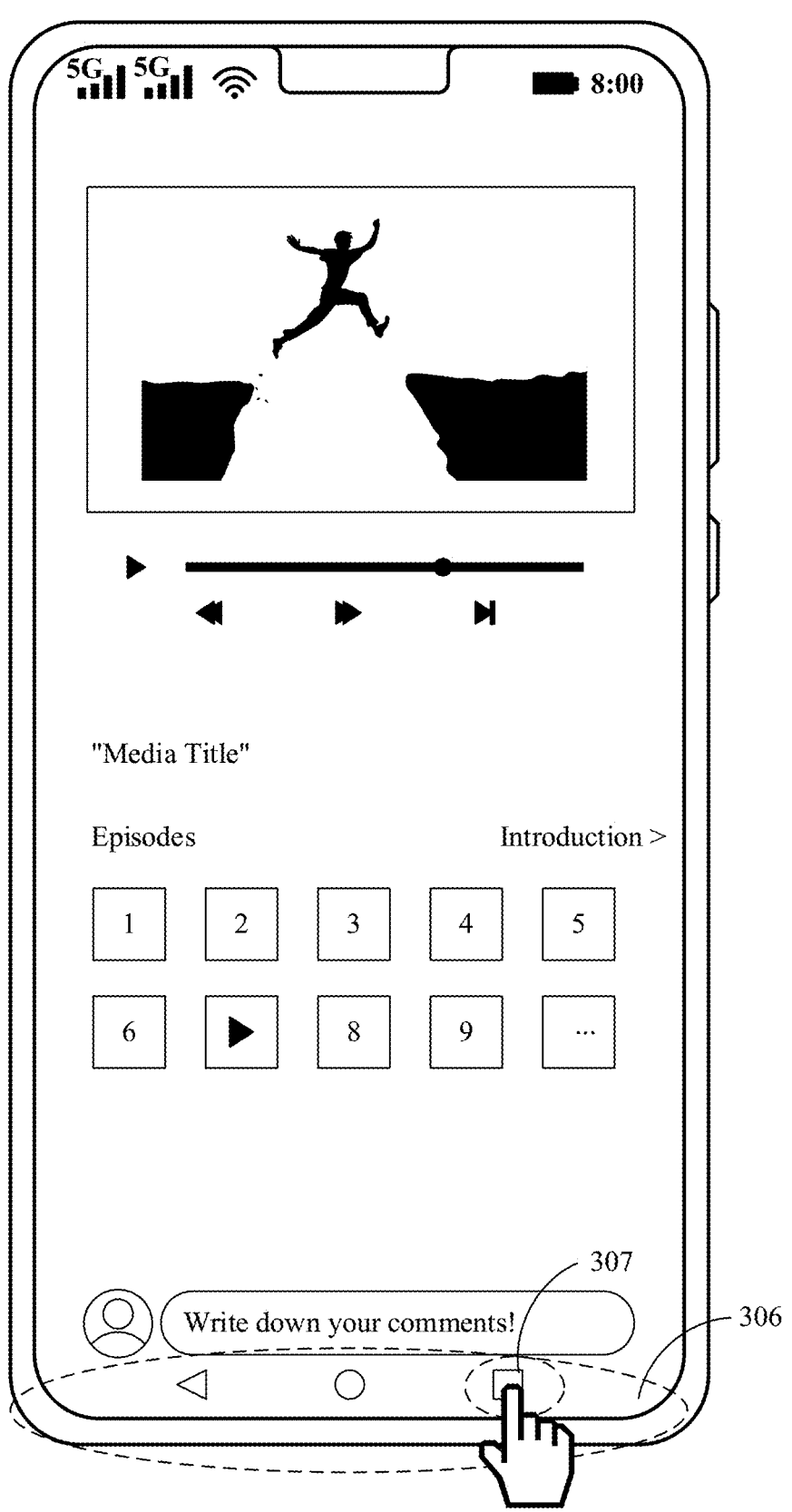
FIG. 3B(a) and FIG. 3B(b) are an interface switching diagram according to this application.
Figure 3B:
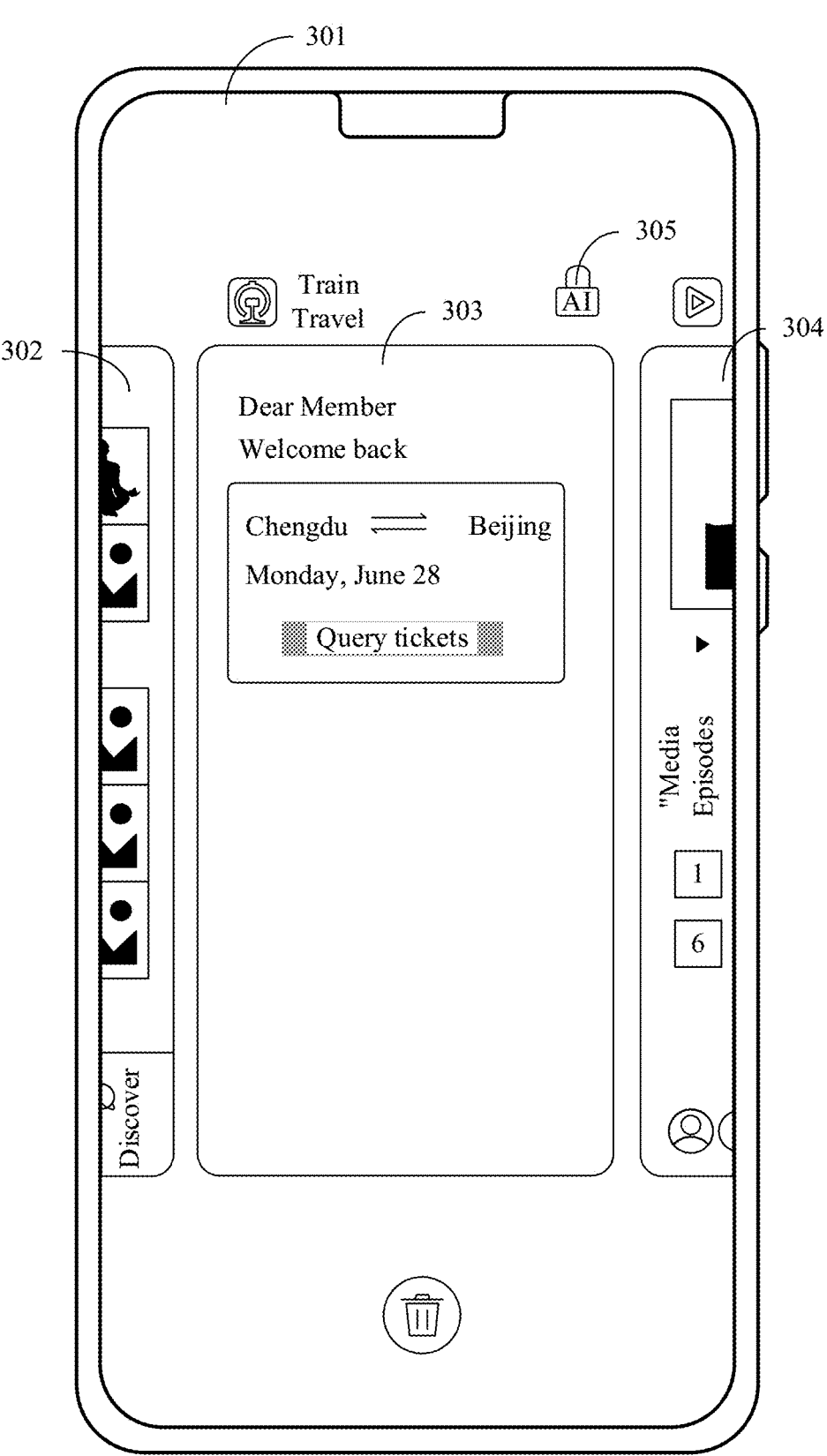

In another design, as shown in FIG. 3B(a), the mobile phone may display a virtual navigation bar 306 at the bottom of the screen. The virtual navigation bar 306 includes a plurality of virtual buttons, such as a return button, a Home button, and a function button 307. The mobile phone may receive an operation that the user taps the function button 307. In response to the operation, the mobile phone may display a recent task interface 301 shown in FIG. 3B(b).

It should be noted that a sequence of arranging the preview interfaces of the plurality of applications on the recent task interface 301 corresponds to a sequence of using the plurality of applications by the user. For example, the user sequentially uses Gallery, Train Travel, and the video application. In this case, the preview interface 302 of Gallery, the preview interface 303 of Train Travel, and the preview interface 304 of the video application are sequentially arranged on the recent task interface 301 from top to bottom or from right to left.

It should be further noted that a preview interface that may be displayed on the recent task interface is limited due to a limitation of a screen size of the mobile phone. For example, the recent task interface 301 shown in FIG. 3B(b) displays only the preview interface 302 of Gallery, the preview interface 303 of Train Travel, and the preview interface 304 of the video application. However, this does not indicate that recently used applications include only three applications: Gallery, Train Travel, and the video application. The recently used applications may further include an application other than Gallery, Train Travel, and the video application, and a preview interface of the application may be displayed on the recent task interface 301 by sliding the screen leftwards or rightwards by the user.

Figure 4:
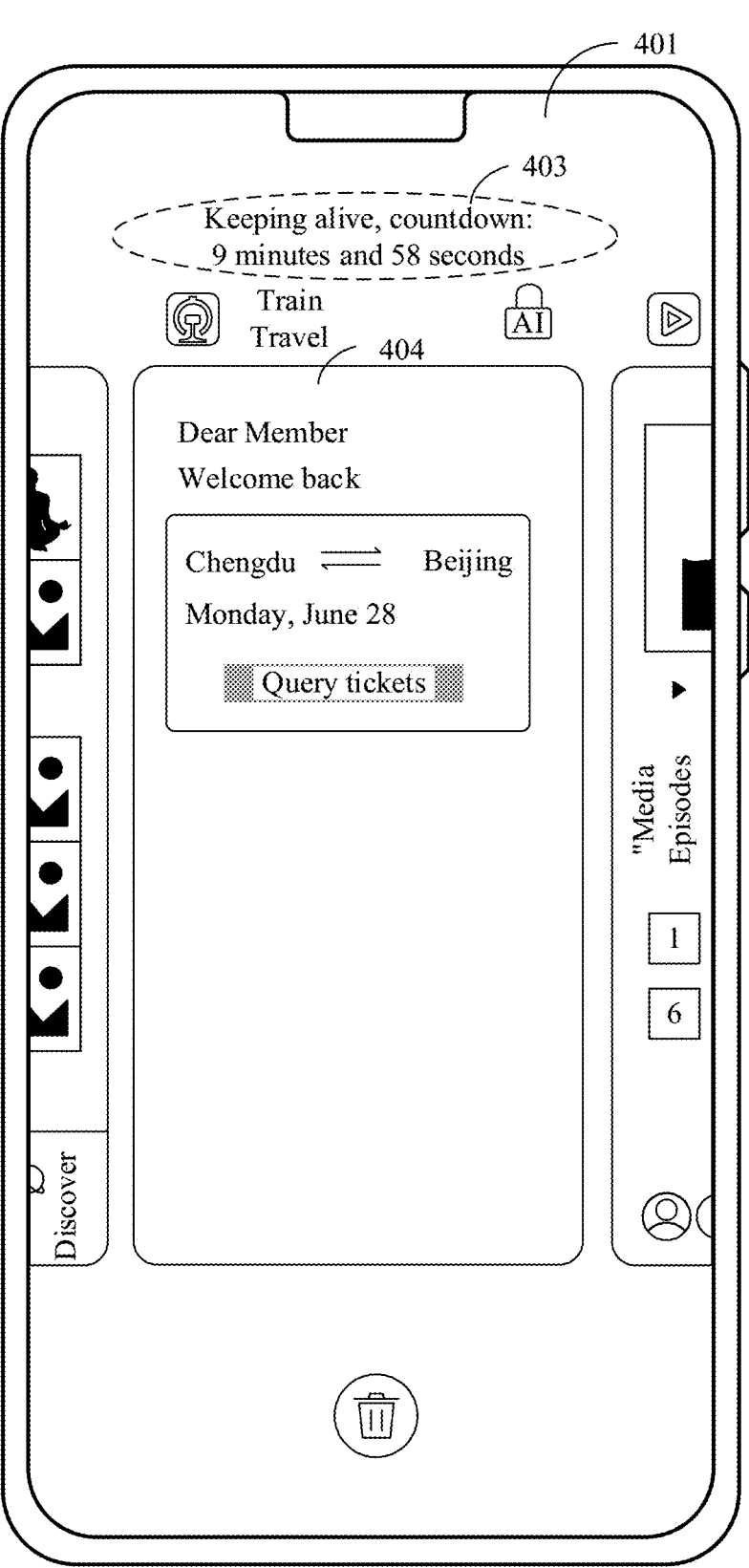
FIG. 4 is an interface diagram according to this application.

In this embodiment of this application, the mobile phone may display remaining keep-alive duration of the first application on the first preview interface (which may be understood as remaining duration in which the first application keeps alive, and may also be referred to as first keep-alive duration). For example, the first application is still Train Travel. As shown in FIG. 4, the mobile phone may display status information 403 on the preview interface 403 of Train Travel. The status information 403 may be used to indicate remaining keep-alive duration of Train Travel. For example, the status information 403 may be: "Keeping alive, countdown: 9 minutes 58 seconds".

When the mobile phone adds the intelligent lock to the first application, the remaining keep-alive duration of the first application is equal to initial keep-alive duration of the first application, where the initial keep-alive duration may be maximum keep-alive duration of the first application. Thereafter, in a case in which the user does not reset or refresh the remaining keep-alive duration of the first application, the remaining keep-alive duration of the first application continues to decrease until to 0.

In a design, initial keep-alive duration of each application may be the same, for example, may be a preset first value (which may be understood as a preset value), and the first value may be any value such as 5 minutes, 10 minutes, or 1 hour. In other words, the mobile phone may add an intelligent lock to each application that is determined as an application that the user needs to continue to use, and initial keep-alive duration of the application is the same, which is the first value. In some designs, the mobile phone may receive a pull-down operation performed by the user on the first preview interface. In response to the operation, the mobile phone restores the remaining keep-alive duration of the first application to the first value, so that the user can quickly prolong the keep-alive duration of the first application.

In a design, initial keep-alive duration of each application may be different, for example, a second value. The second value is determined by the mobile phone based on a current time and a habit running time of the application. The second value may at least keep the application alive during the habit running time of the application. For example, if a current time is 8:40, and a habit running time of an application c is 8:30-9:00, to ensure that the application c can be in a keep-alive state and not killed during 8:40-9:00, initial keep-alive duration of the application c may be at least 20 minutes. Alternatively, the second value may be a time that is estimated by the mobile phone and that is required by the application to execute a keep-alive task. The second value may at least enable the application to be in a keep-alive state during execution of the keep-alive task. For example, when the video application caches a video, the mobile phone may estimate, based on a size of a video file and a network speed, a time required for caching the video file, for example, 30 minutes, so that the mobile phone can set initial keep-alive duration of the video application to 30 minutes.

In a design, the mobile phone may not display the remaining keep-alive duration of the first application on the first preview interface. It should be noted that, that the remaining keep-alive duration of the first application is not displayed does not mean that the first application is always in a keep-alive state. The mobile phone may monitor a task process of the keep-alive task of the first application in real time. Once the mobile phone determines that the keep-alive task is completed, the intelligent lock of the first application may be automatically canceled (that is, the first application is unlocked). For example, the mobile phone may add an intelligent lock to the video application that is performing a cache task. When detecting that the cache task is completed or receiving a cache task complete notification, the mobile phone automatically cancels the intelligent lock of the video application.

Figure 5A:
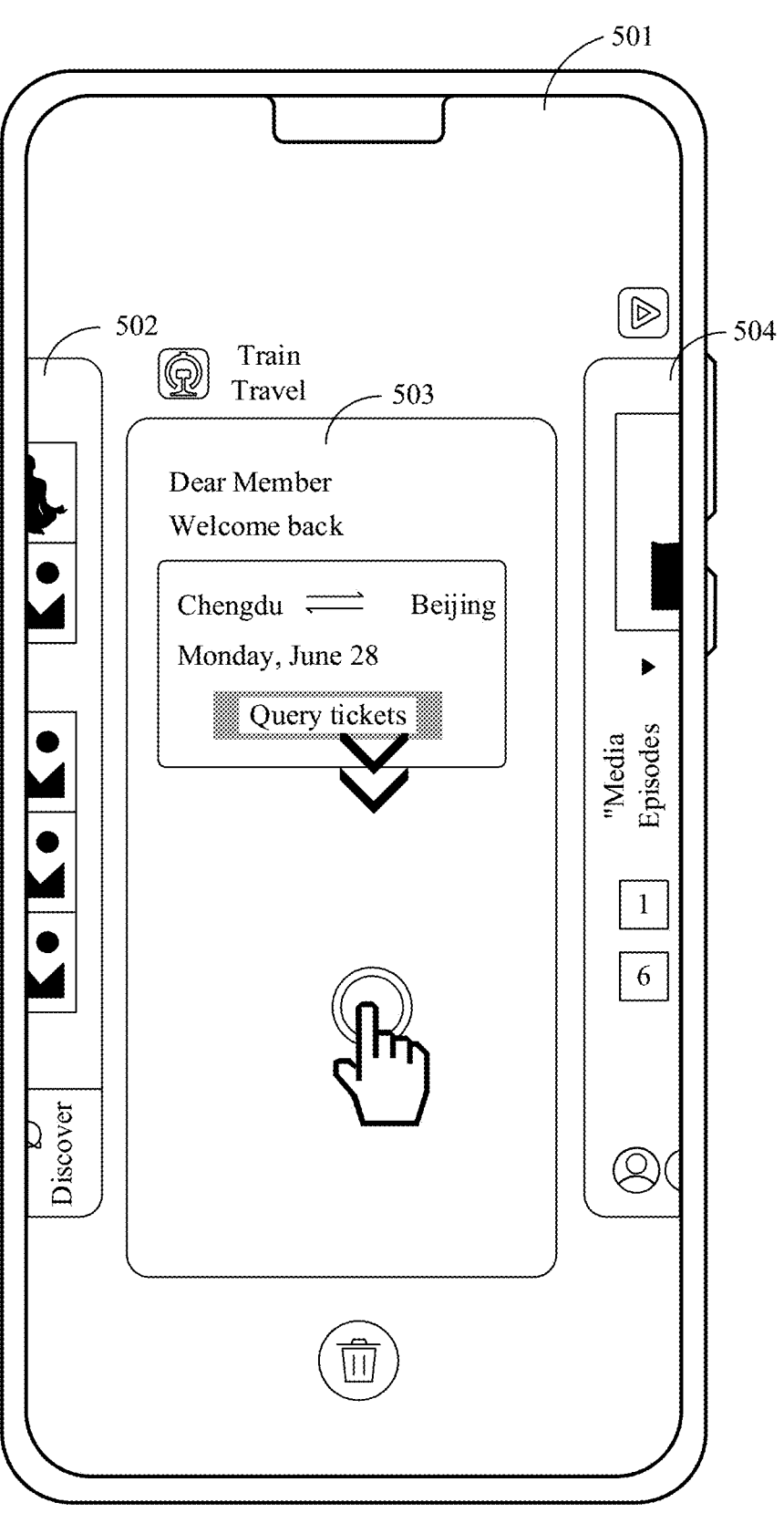
FIG. 5(A) and FIG. 5(B) are an interface switching diagram according to this application.
Figure 5B:
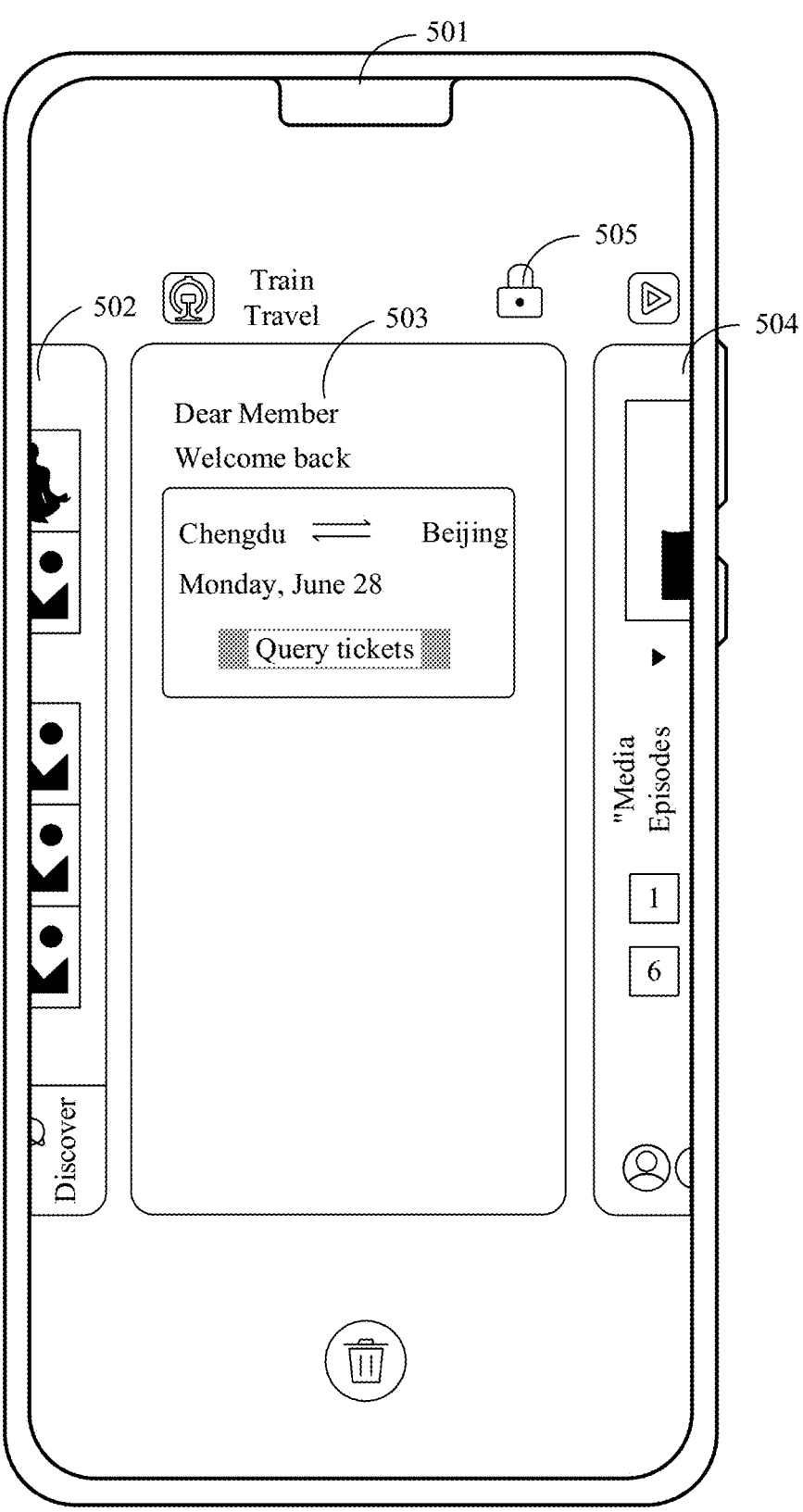

In this embodiment of this application, the mobile phone may automatically add the intelligent lock to the first application, and the user may also select an application (for example, a second application) to lock the application. For example, as shown in FIG. 5(A), the mobile phone may display a recent task interface 501, where the recent task interface 501 includes a preview interface 502 of Gallery, a preview interface 503 of Train Travel, and a preview interface 504 of the video application. If the user expects that Train Travel is not killed by the mobile phone, the preview interface 503 of Train Travel may be pulled down. The mobile phone may receive the operation that the user pulls down the preview interface 503 of Train Travel. In response to the operation, the mobile phone may add a manual lock to Train Travel (that is, perform a second locking operation on Train Travel). To help the user understand whether the mobile phone locks an application, as shown in FIG. 5(B), the mobile phone may display a second lock icon 505 on the preview interface 503 of Train Travel, where the second lock icon 505 is used to indicate that a manual lock is added to Train Travel. It should be noted that, after the manual lock is added to the second application, the second application may always be in a keep-alive state. In other words, keep-alive duration of an application to which a manual lock is added is greater than by default keep-alive duration of an application to which an intelligent lock is added.

When the mobile phone displays the recent task interface, the user may manage the plurality of recently used applications. For example, the user sets keep-alive duration of an application, sets a keep-alive policy of an application, unlocks an application, or cleans an application. The following separately describes an application keep-alive duration setting process, an application unlocking process, and an application cleaning process.

Figure 6A:
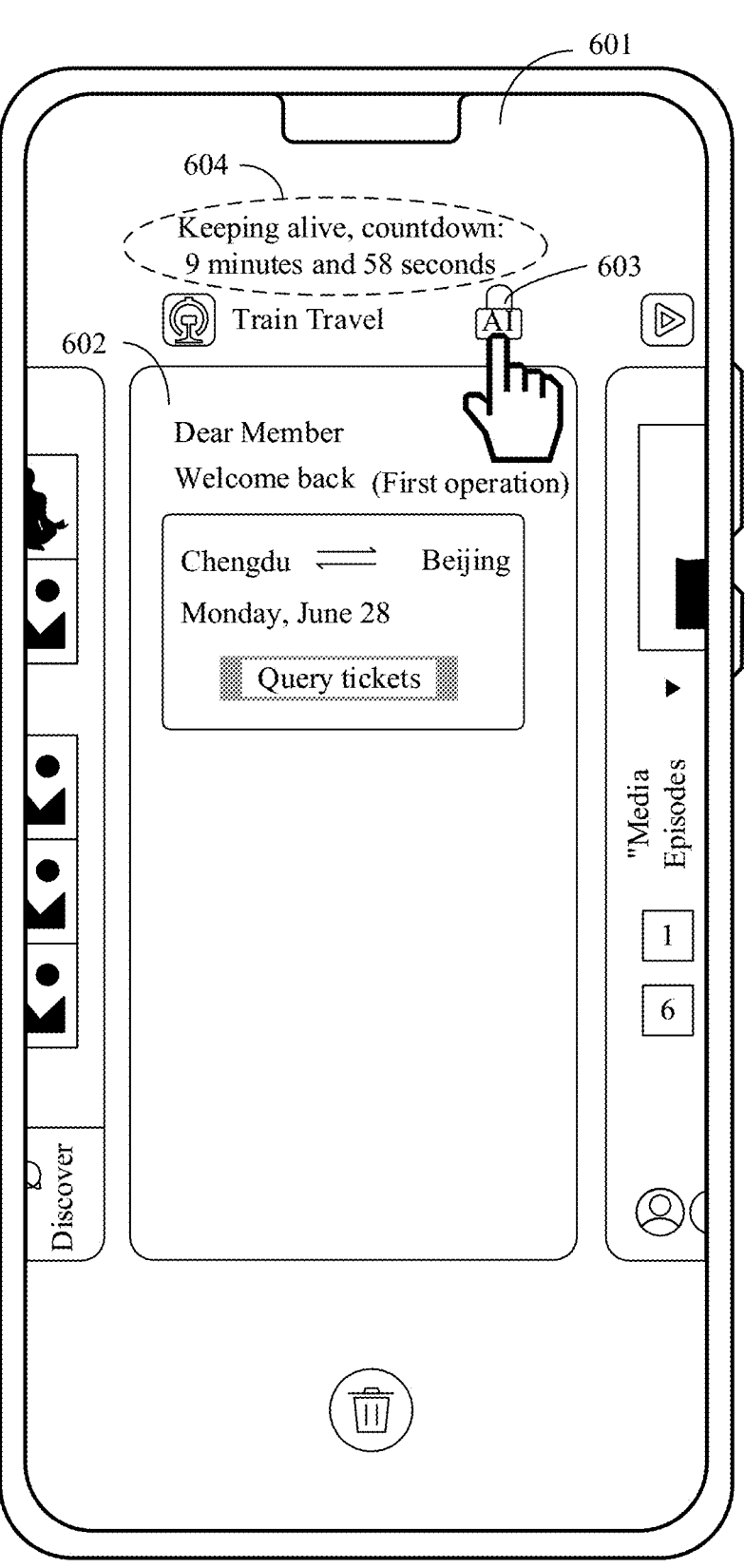
FIG. 6(A) to FIG. 6(D) are an interface switching diagram according to this application.
Figure 6B:
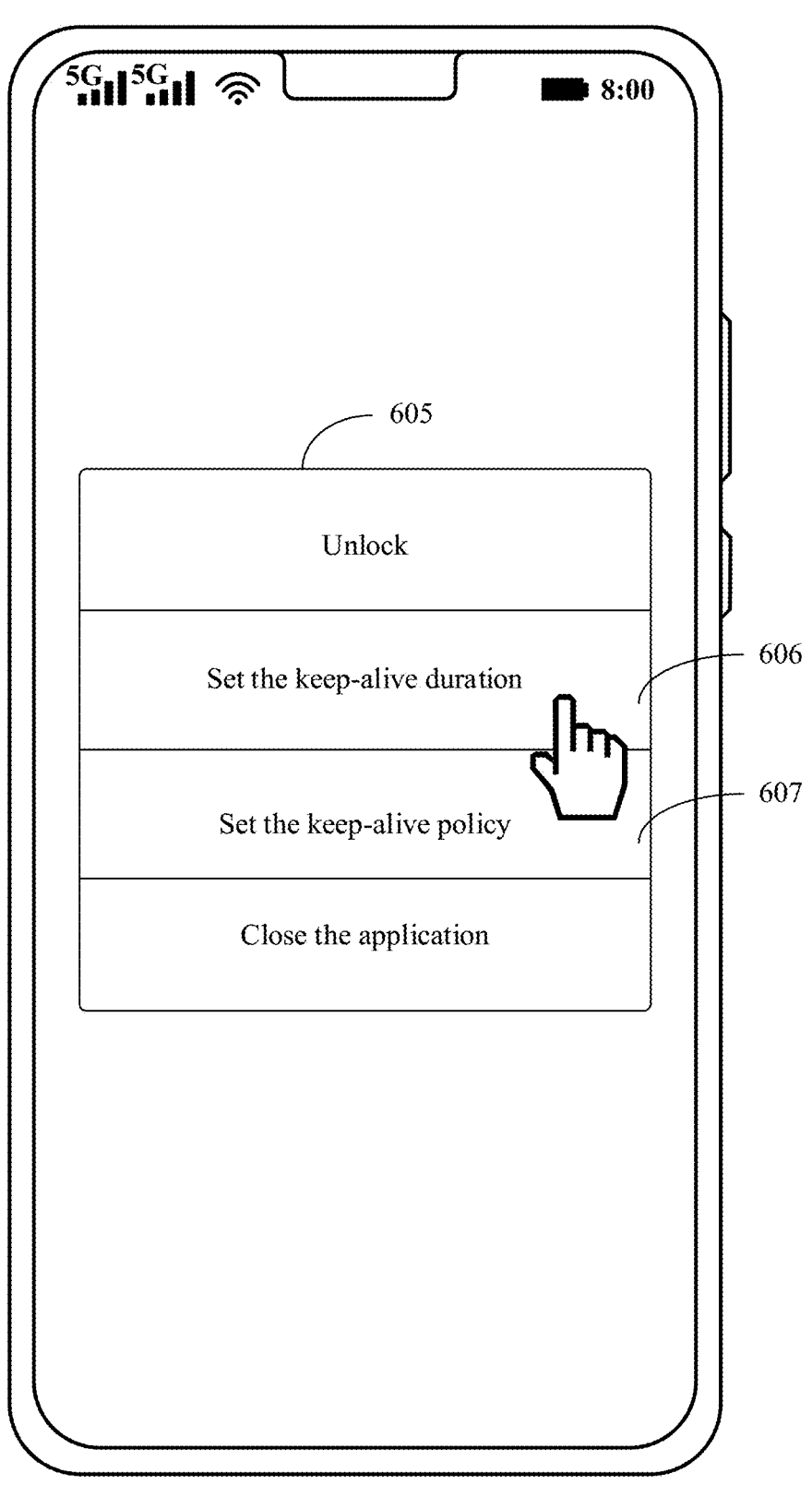
Figure 6C:
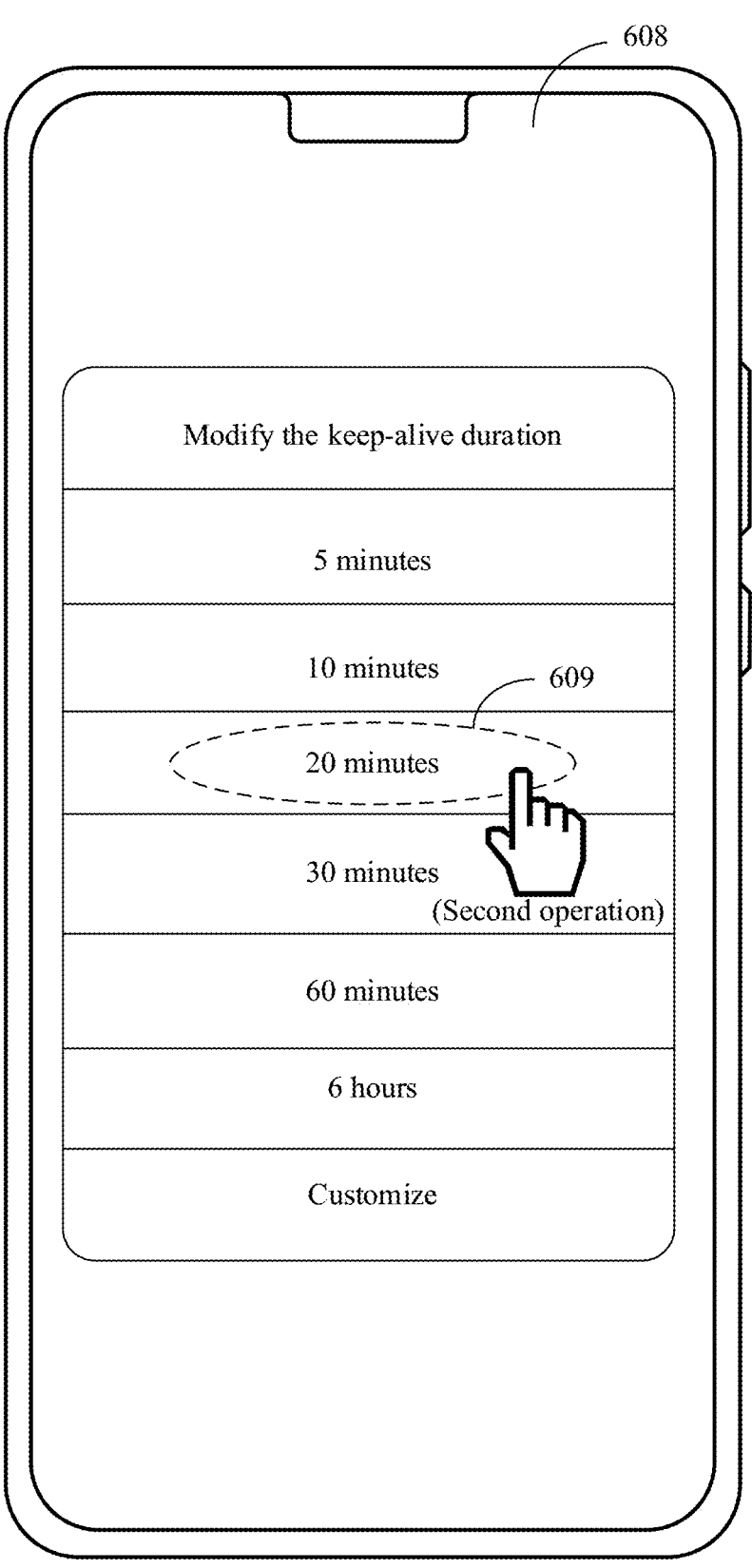
Figure 6D:
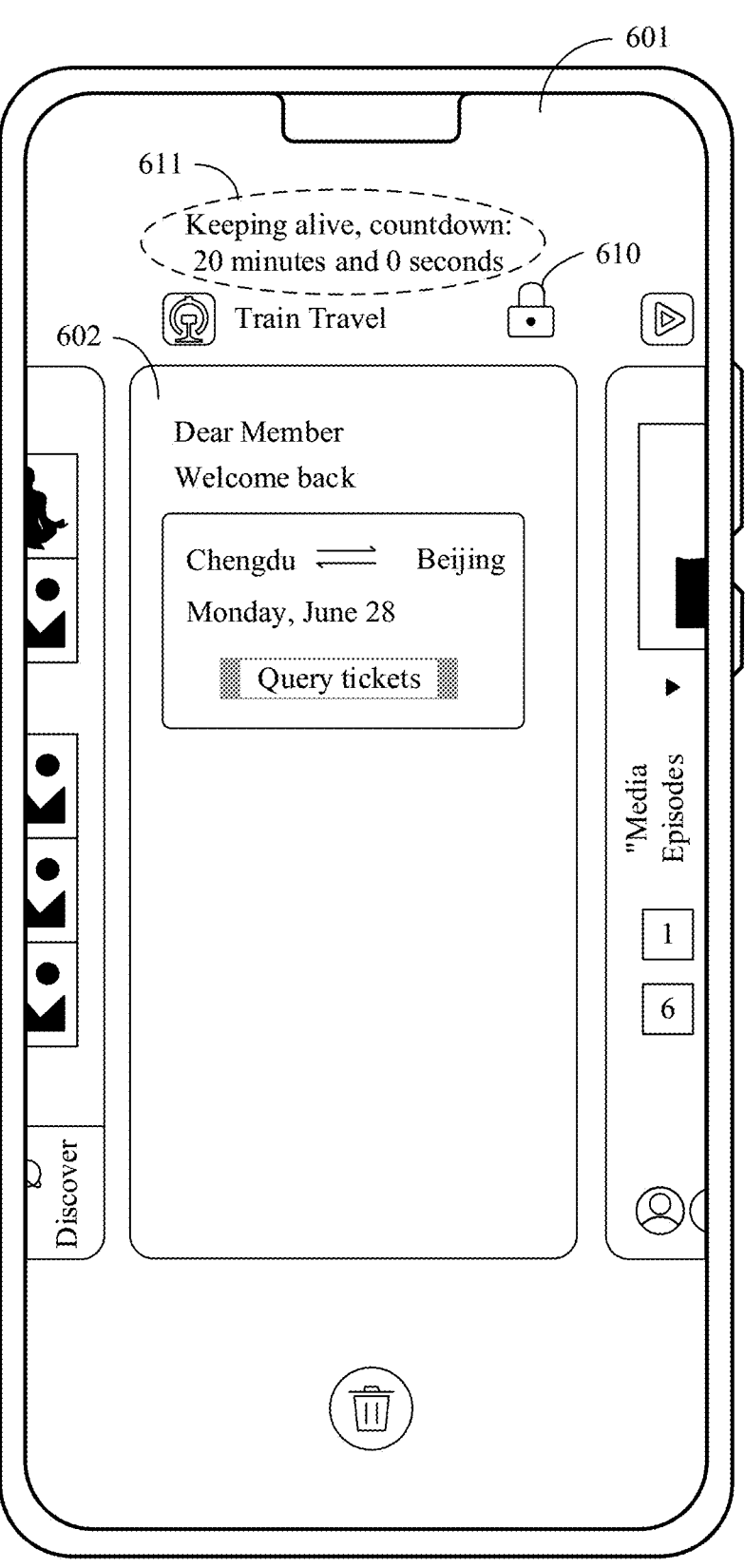

The recent task interface may provide the user with a way of setting keep-alive duration of a locked application. For example, as shown in FIG. 6(A), the mobile phone may display a recent task interface 601, where the recent task interface 601 includes a preview interface 602 of Train Travel. A first lock icon 603 and first status information 604 are displayed on the preview interface 602. The first lock icon 603 is used to indicate that an intelligent lock is added to Train Travel, and the first status information 604 is used to indicate that Train Travel is in a keep-alive state and remaining keep-alive duration is 9 minutes 58 seconds. The mobile phone may receive a first operation performed by the user on the first lock icon 603 (for example, an operation of touching and holding the first lock icon 603). In response to the operation, as shown in FIG. 6(B), the mobile phone may display a setting box 605. The setting box 605 may include an "Unlock" option, a "Set the keep-alive duration" option 606, a "Set the keep-alive policy" option 607, a "Close the application" option, and the like. The mobile phone may receive an operation that the user taps the "Set the keep-alive duration" option 606. In response to the operation, the mobile phone displays a keep-alive duration setting interface 608 shown in FIG. 6(C). The keep-alive duration setting interface 608 may provide the user with a plurality of keep-alive duration setting options, for example, "5 minutes", "10 minutes", "20 minutes" 609, and "Customize". After receiving an operation that the user selects keep-alive duration, the mobile phone may set keep-alive duration of an application to a value selected by the user. For example, if the user wants to set the keep-alive duration of Train Travel to 20 minutes, the user may tap "20 minutes" 609. The mobile phone may receive a second operation performed by the user on "20 minutes" 609 (for example, an operation of tapping "20 minutes" 609). In response to the operation, as shown in FIG. 6(D), the mobile phone changes the first lock icon 603 to a second lock icon 610, and changes the first status information 604 to second status information 611. The second lock icon 610 is used to indicate that a manual lock is added to Train Travel, and the second status information 611 is used to indicate that Train Travel is in a keep-alive state and remaining keep-alive duration is 20 minutes. It may be understood that, after the user sets keep-alive duration of an application to which an intelligent lock is originally added, the mobile phone may change a lock type of the application, that is, change from the intelligent lock to a manual lock.

In an optional design, the mobile phone may alternatively receive an operation that the user taps the first status information 604. In response to the operation, the mobile phone may directly display a keep-alive duration setting interface 609 shown in FIG. 6(C), so as to quickly set or change the keep-alive duration.

It should be noted that the foregoing content uses only an application for which keep-alive duration is set as an example to describe a process in which the user sets keep-alive duration. For an application for which no keep-alive duration is set, the user may also set keep-alive duration of the application by performing the foregoing procedure. For specific content, refer to FIG. 6(A) to FIG. 6(D) and related text content. Details are not described herein again.

Figure 7A:
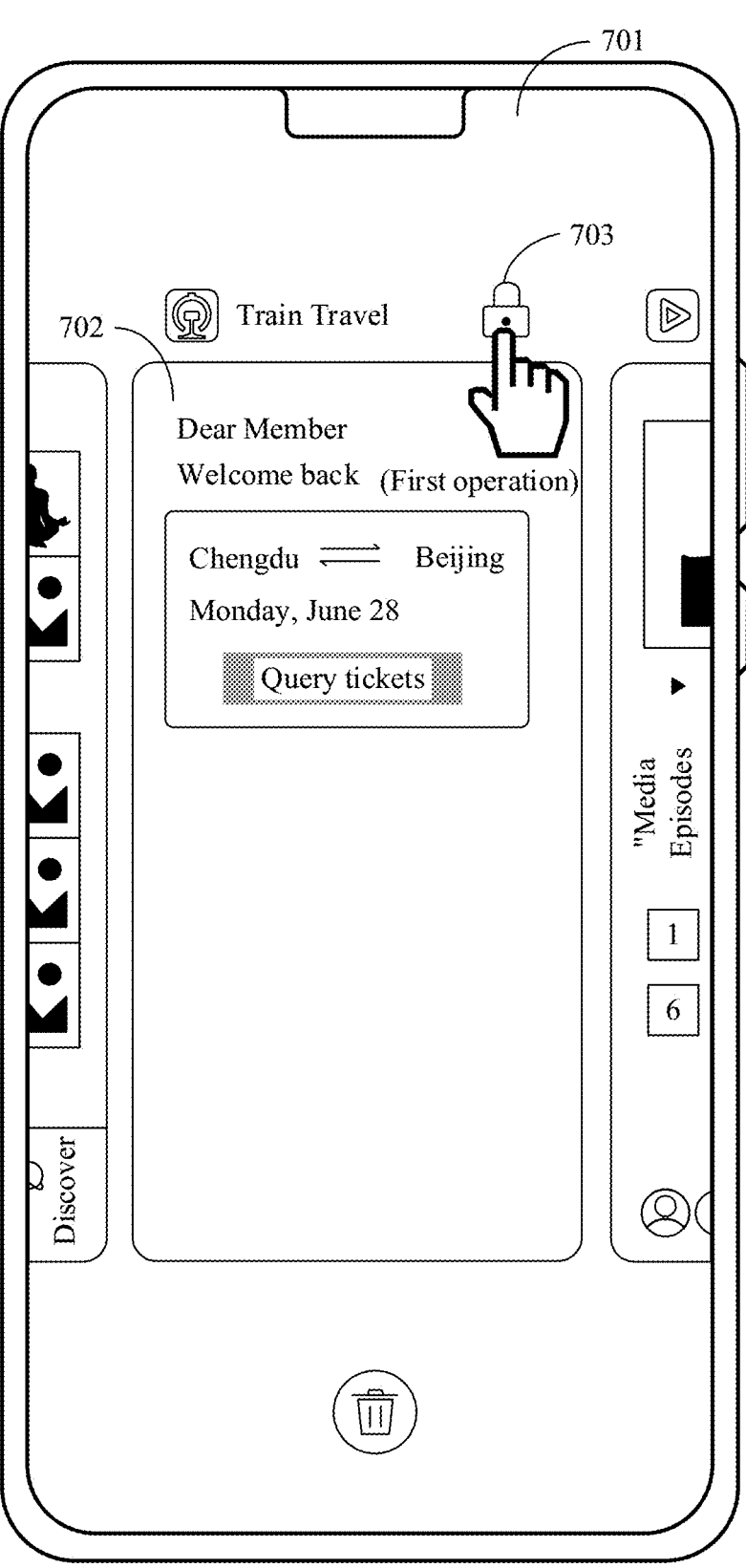
FIG. 7A(a) to FIG. 7A(d) are an interface switching diagram according to this application.
Figure 7A:
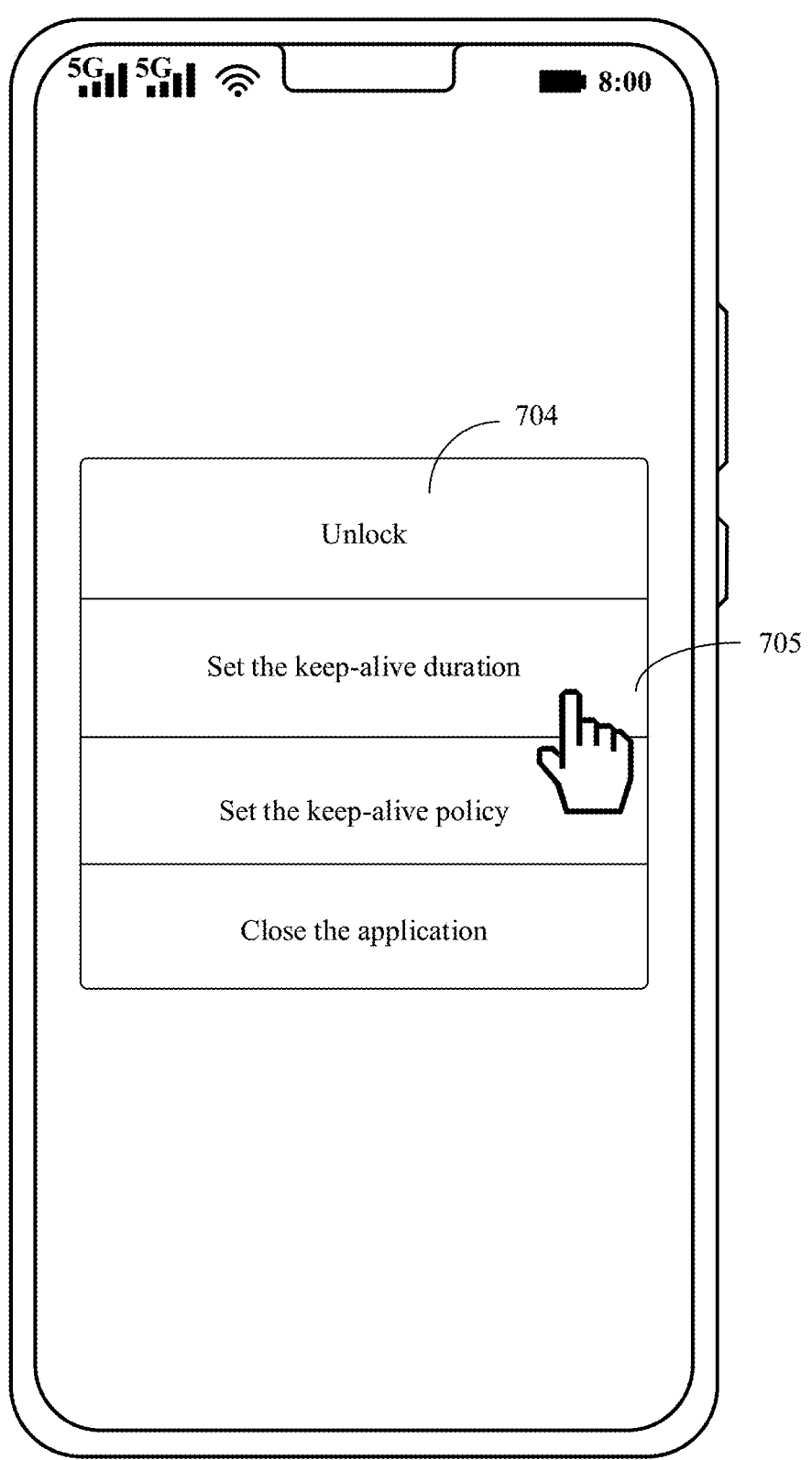
Figure 7A:
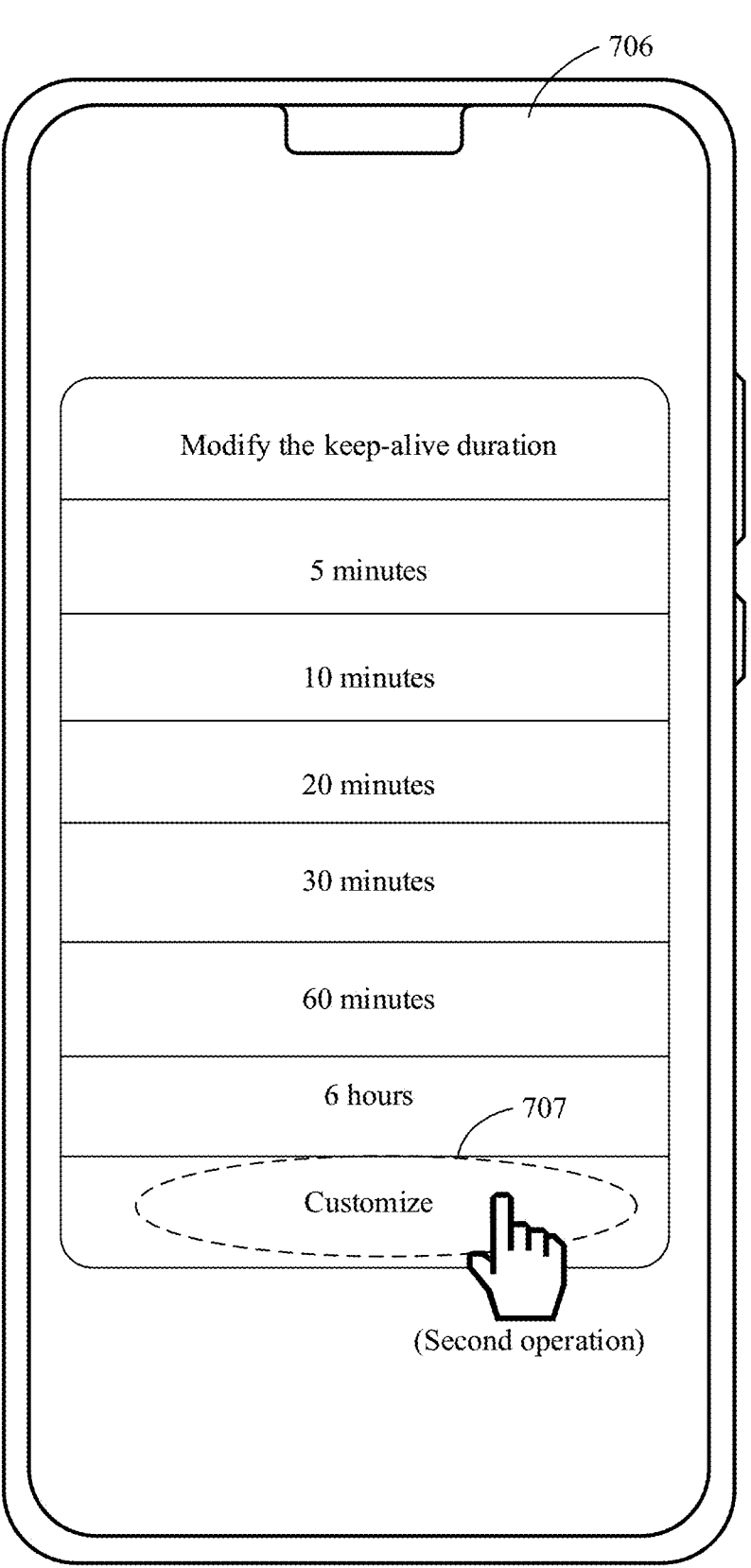
Figure 7A:
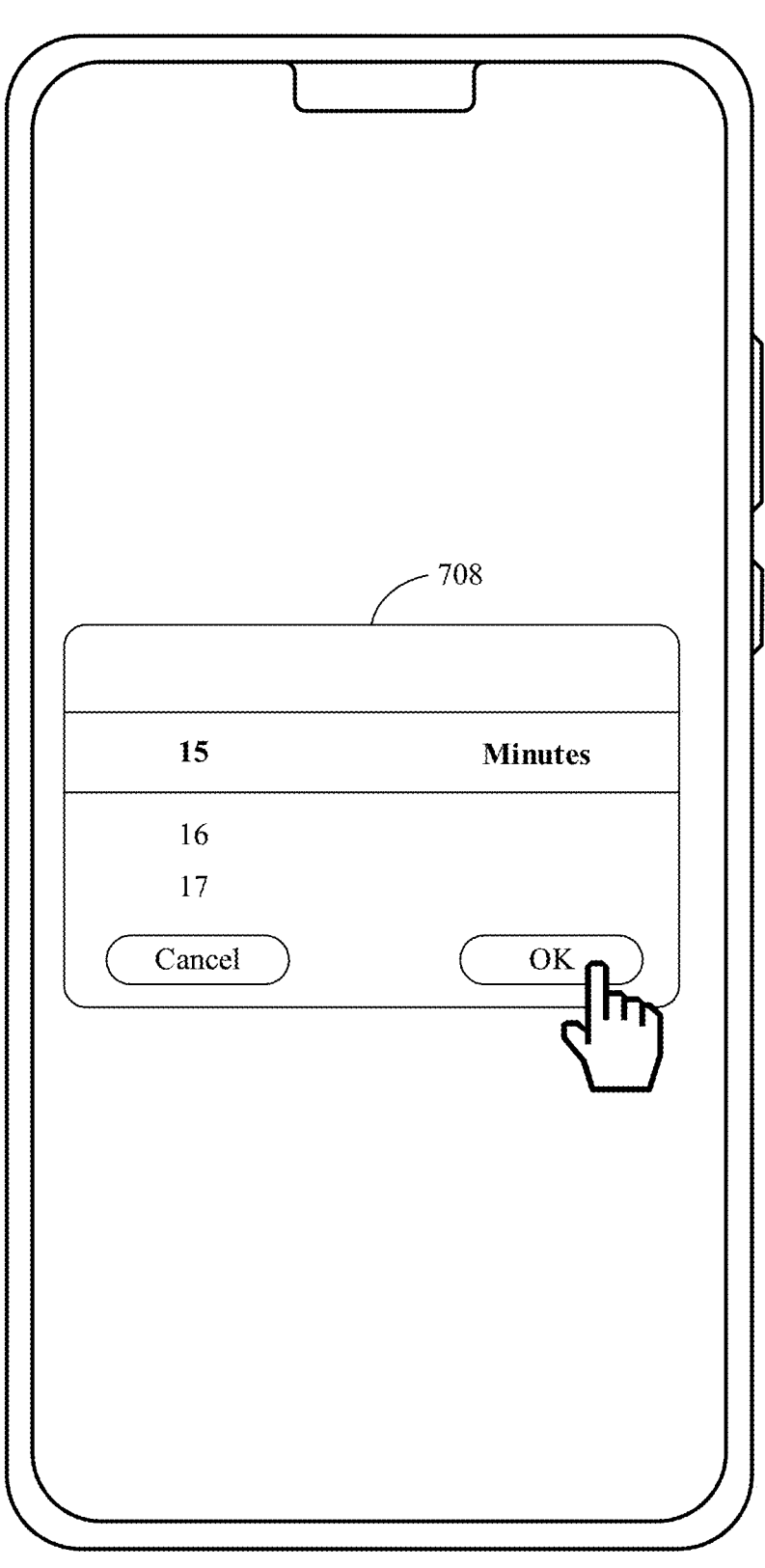
Figure 7B:
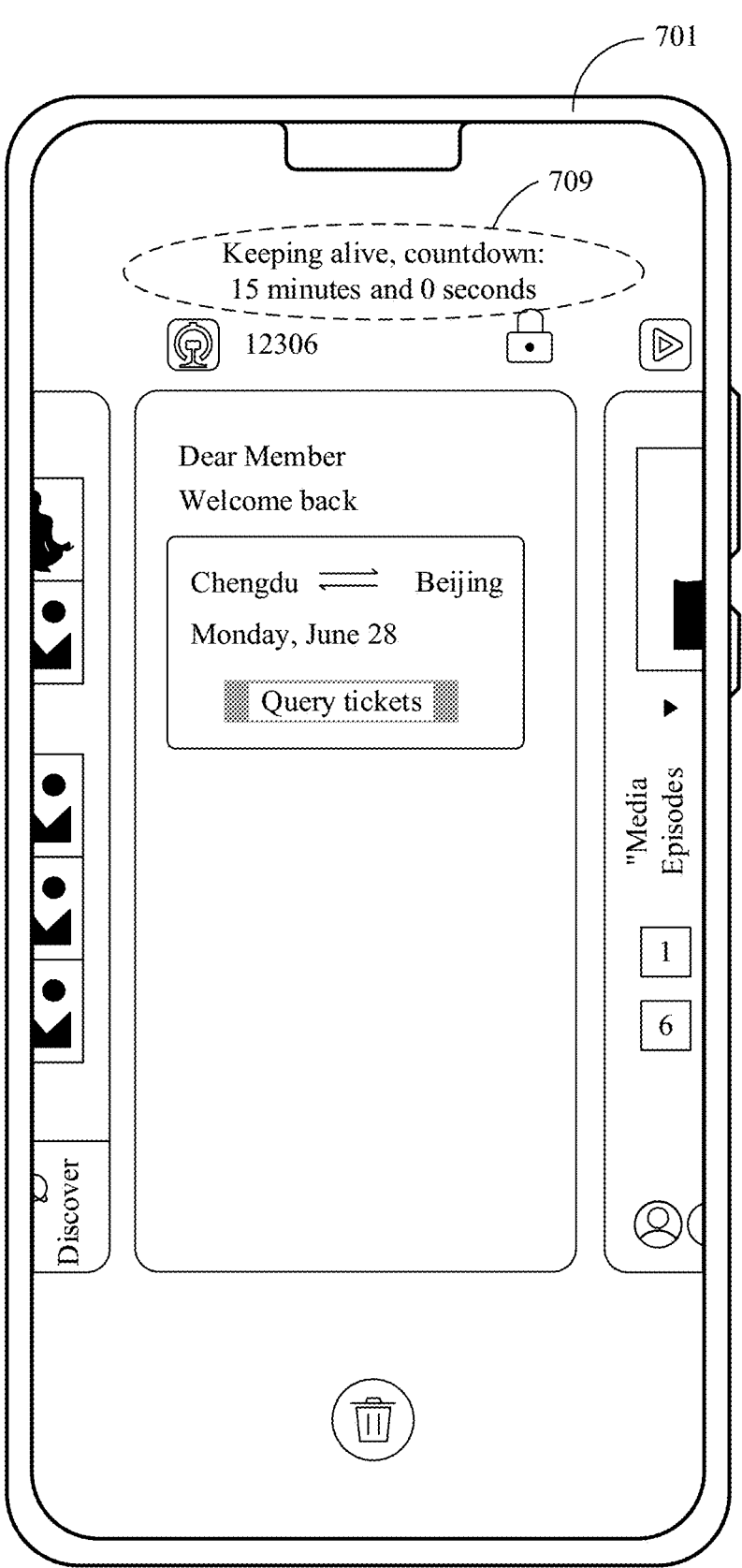
FIG. 7B is an interface diagram according to this application.

The user may also set keep-alive duration for an application to which a manual lock is added. For example, as shown in FIG. 7A(a), the mobile phone may display a recent task interface 701, where the recent task interface 701 includes a preview interface 702 of Train Travel. A second lock icon 703 is displayed on the preview interface 702 of Train Travel. The second lock icon 703 is used to indicate that a manual lock is added to Train Travel. The mobile phone may receive a first operation performed by the user on the second lock icon 703 (for example, an operation of touching and holding the second lock icon 703). In response to the operation, as shown in FIG. 7A(b), the mobile phone may display a setting box 704. The setting box 704 may include an "Unlock" option, a "Set the keep-alive duration" option 705, a "Set the keep-alive policy" option, a "Close the application" option, and the like. The mobile phone may receive an operation that the user taps the "Set the keep-alive duration" option 705. In response to the operation, the mobile phone displays a keep-alive duration setting interface 706 shown in FIG. 7A(c). The keep-alive duration setting interface 706 may provide the user with a plurality of keep-alive duration setting options, for example, "5 minutes", "10 minutes", "20 minutes", and "Customize" 707. After receiving an operation that the user selects to set keep-alive duration, the mobile phone sets keep-alive duration of an application to a value entered by the user. For example, if the user wants to set the keep-alive duration of Train Travel to 15 minutes, the user may tap "Customize" 707. The mobile phone may receive a second operation performed by the user on "Customize" 707 (for example, an operation of tapping "Customize" 707). In response to the operation, the mobile phone displays an input box 708 shown in FIG. 7A(d). The mobile phone may receive an operation that the user selects or enters 15 minutes in the input box 708 and taps an "OK" option. In response to the operation, the mobile phone may re-display the recent task interface 701, and display status information 709 on the preview interface 702 of Train Travel (as shown in FIG. 7B). The status information 709 is used to indicate that Train Travel is in a keep-alive state and remaining keep-alive duration is 20 minutes.

Figure 8A:
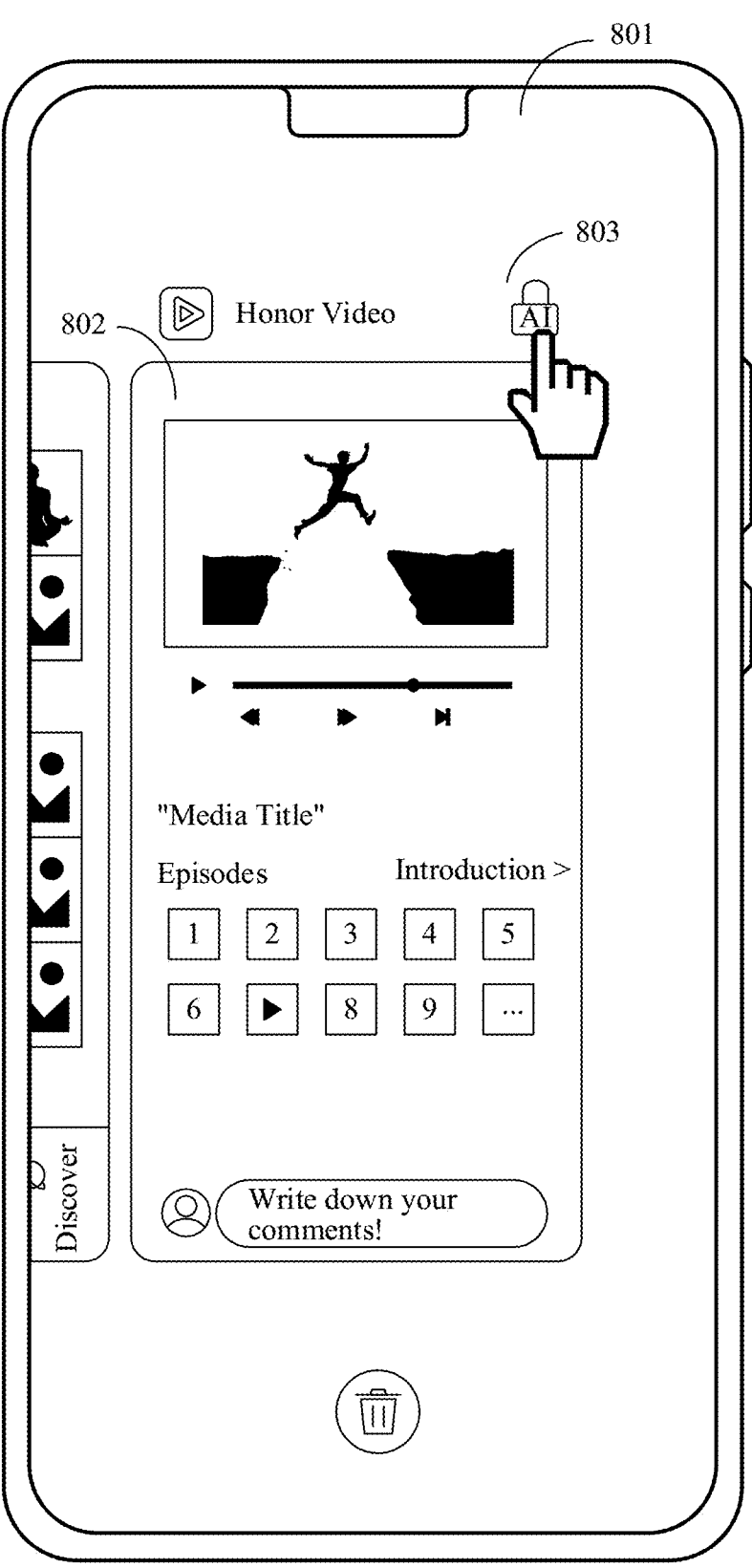
FIG. 8A(a) to FIG. 8A(c) are an interface switching diagram according to this application.
Figure 8A:
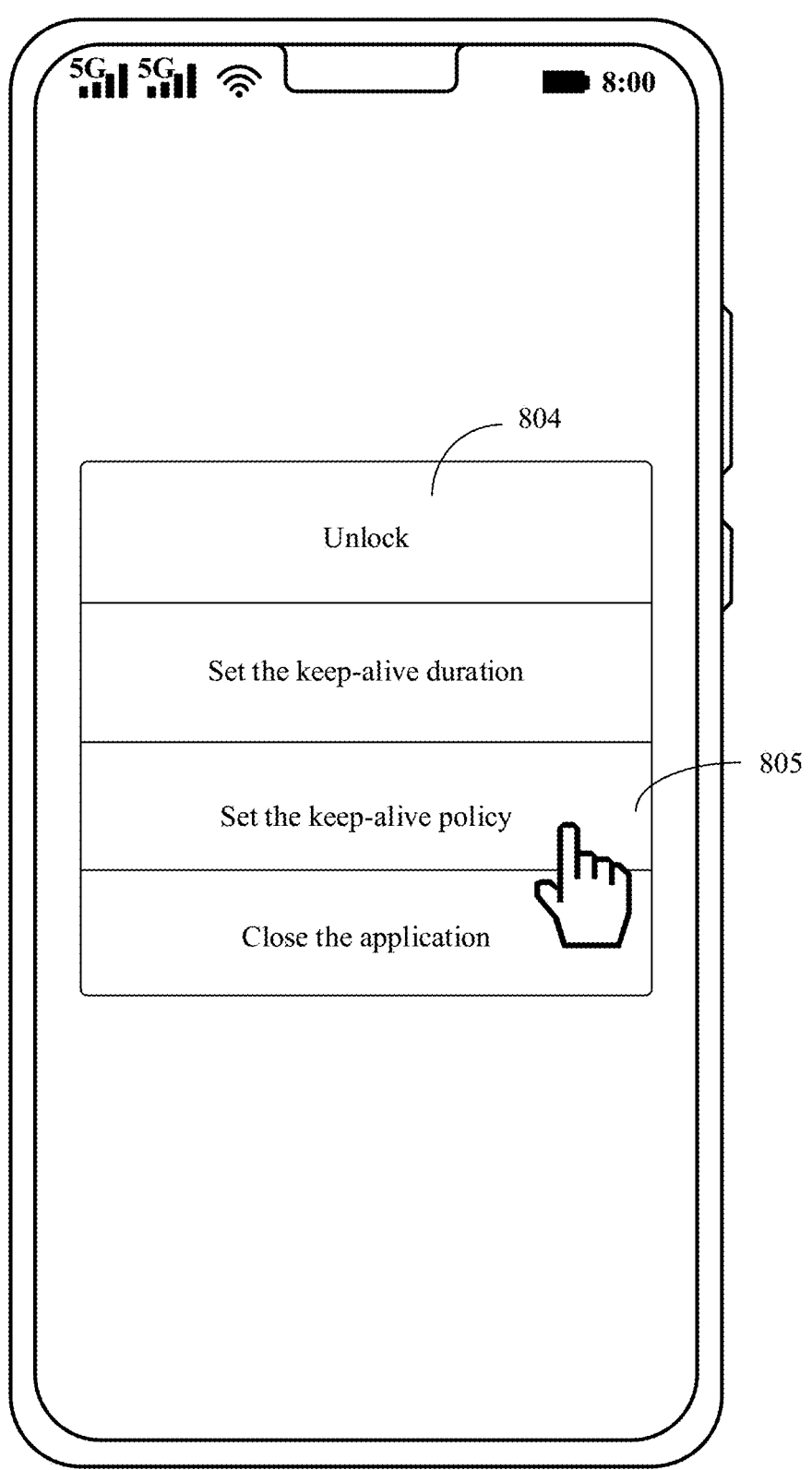
Figure 8A:
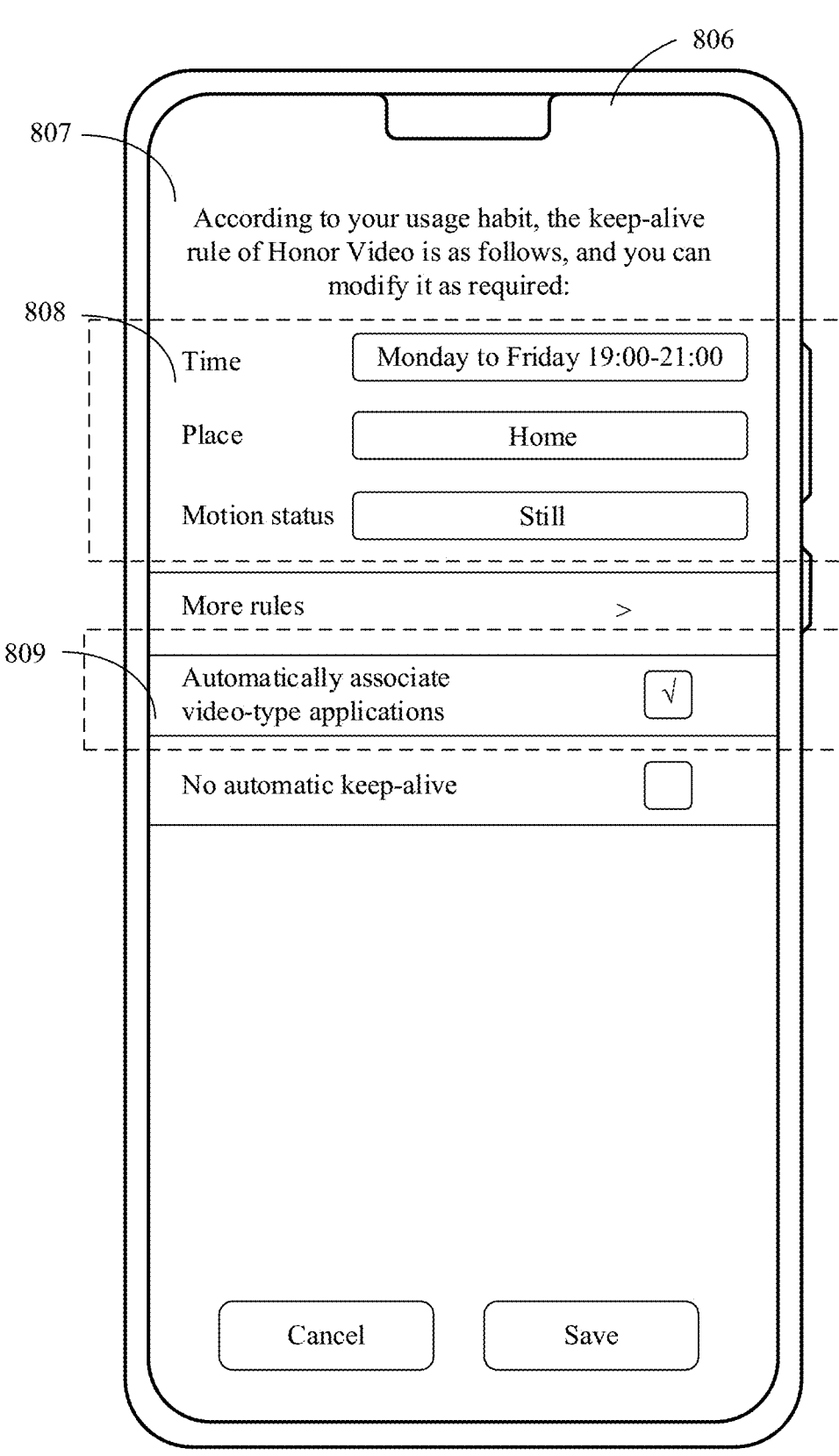

The recent task interface may further provide the user with a way of setting a keep-alive policy of an application. For example, as shown in FIG. 8A(a), the mobile phone may display a recent task interface 801. The recent task interface 801 may include a preview interface 802 of Honor Video. A first lock icon 803 is displayed on the preview interface 802, and the first lock icon 803 is used to indicate that an intelligent lock is added to Honor Video. The mobile phone may receive an operation that the user touches and holds the first lock icon 803. In response to the operation, the mobile phone displays a setting box 804 shown in FIG. 8A(b). The setting box 804 may include an "Unlock" option, a "Set the keep-alive duration" option, a "Set the keep-alive policy" option 805, a "Close the application" option, and the like. If the user wants to set or change a keep-alive policy of Honor Video, the user may tap the "Set the keep-alive policy"

option 805. In response to the operation, the mobile phone may display a keep-alive policy setting interface. In an optional design, a keep-alive policy setting interface may be shown in FIG. 8A(c), and the keep-alive policy setting interface 806 may include prompt information 807, a setting area 808, an association option 809, a "Cancel" option, a "Save" option, a "No automatic keep-alive", and the like. The prompt information 807 may indicate that the keep-alive policy of the application is set according to a user's usage habit, for example, "According to your usage habit, the keep-alive rule of Honor Video is as follows, and you can modify it as required". The setting area 808 may be used by the user to set parameters such as a time, a place, and a motion status. The association option 809 may provide the user with a way of applying the keep-alive policy of Honor Video to all video-type applications. When the user sets the parameters in the setting area 808 and selects the association option 809, the mobile phone may receive an operation that the user taps the "Save" option. In response to the operation, the mobile phone applies the keep-alive policy of Honor Video to all the video-type applications. In this way, the keep-alive policy of all the video-type applications including Honor Video is: A habit use time is "Monday to Friday 20:00-21:00", a habit use place is "Home", and a habit use status is "Still". If the user wants to stop automatically keeping Honor Video alive, the user may select "No automatic keep-alive" on the keep-alive policy setting interface 806.

Figure 8B:
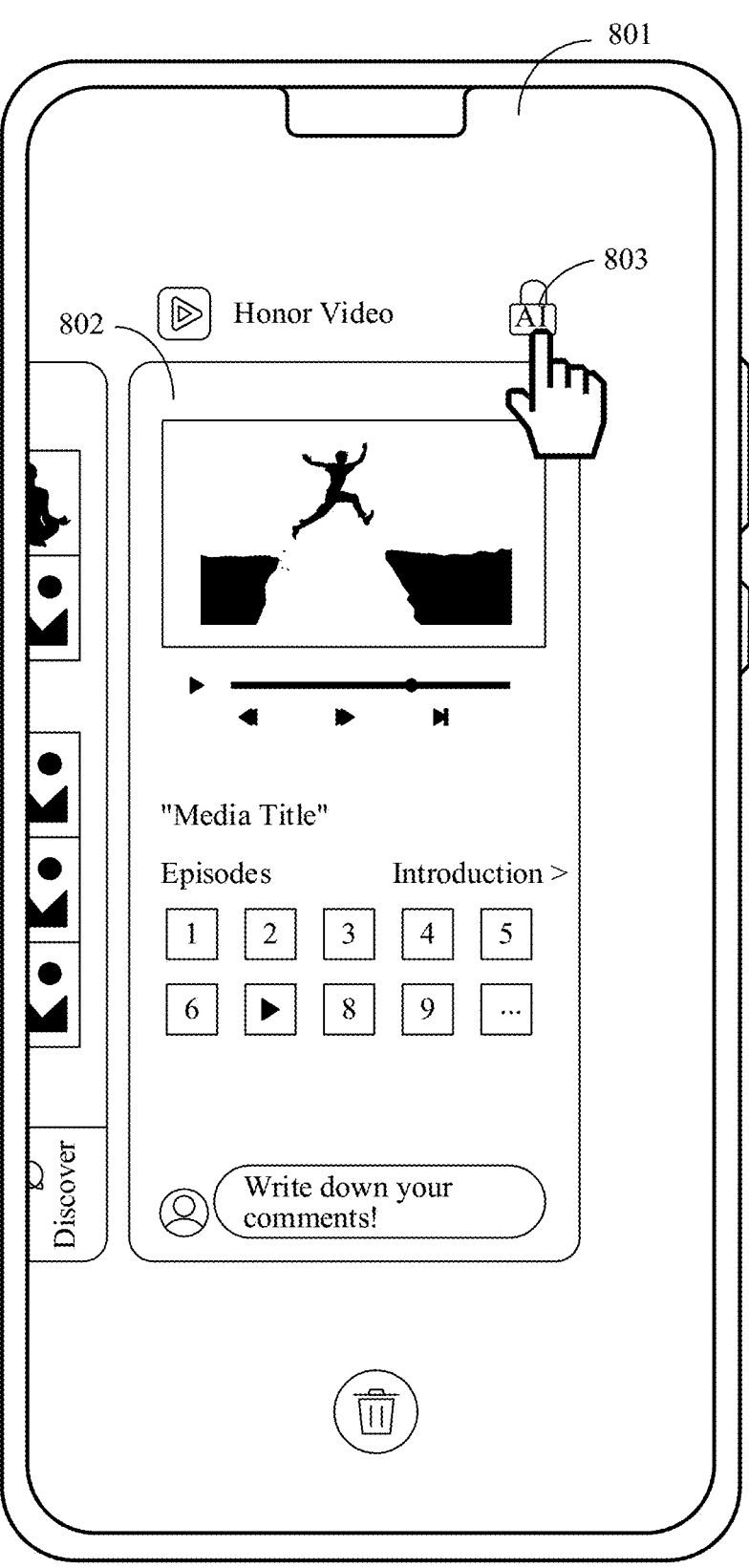
FIG. 8B(a) to FIG. 8B(c) are an interface switching diagram according to this application.
Figure 8B:
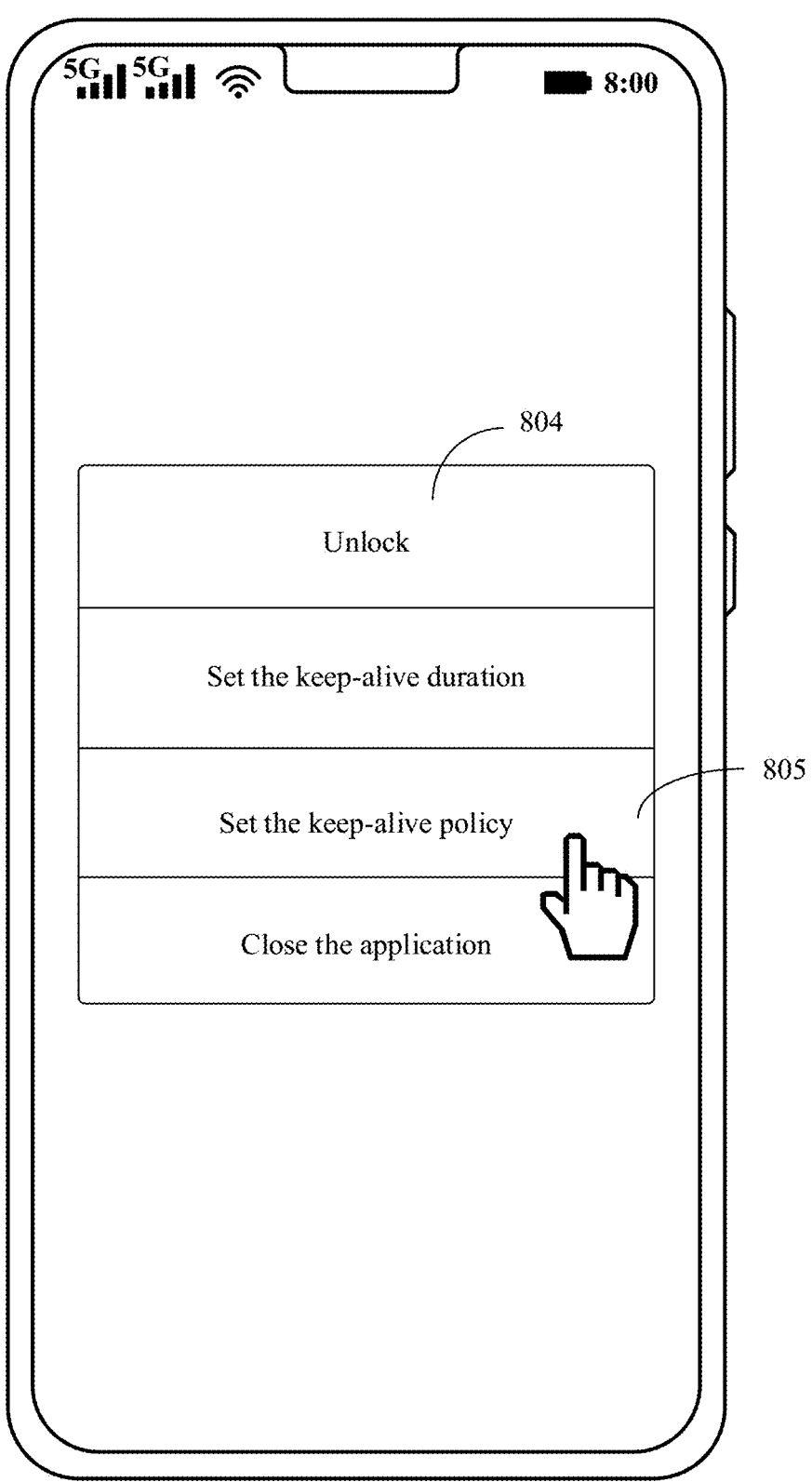

In an optional design, as shown in FIG. 8B(a) and FIG. 8B(b), the mobile phone may receive an operation that the user taps the "Set the keep-alive policy" option 805. In response to the operation, the mobile phone displays a keep-alive policy setting interface 810 shown in FIG. 8B(c). The keep-alive policy setting interface 810 may include prompt information 811, a setting area 812, a selection area 813, a "Cancel" option, a "Save" option, and the like. The prompt information 811 may indicate a type of the application, and indicate that the keep-alive policy of the application is a keep-alive policy of the type of the application, for example, "Honor video is a video-type application. Currently, the system selects the video-type application keep-alive policy for the application (determined according to your habit of using the video-type application)." The setting area 808 may be used by the user to freely set parameters such as a time, a place, and a motion status, and may provide an "Apply to all video-type applications" option. The selection area 813 provides keep-alive policies of a plurality of types of applications (such as a video-type application, a game-type application, and an information-type application) for user selection. If the user does not want to use a keep-alive policy provided in the selection area 813, the user may set the parameters in the setting area 812 as required, and may select the "Apply to all video-type applications" option. In response to the operation, the mobile phone applies the parameters to the keep-alive policy of Honor Video, and applies the keep-alive policy of Honor Video to all video-type applications. If the user wants to use a keep-alive policy in the selection area 813 (for example, a game-type application keep-alive policy), the user may select "Game-type application keep-alive policy" and tap the "Save" option. In response to the operation, the mobile phone applies the game-type application keep-alive policy to Honor Video. Similarly, if the user wants to stop automatically keeping Honor Video alive, the user may select "No automatic keep-alive" on the keep-alive policy setting interface 810.

It can be learned that the mobile phone may manage a keep-alive policy of an application on the setting page, or may set a most applicable keep-alive policy on the multi-task interface. A plurality of entrances facilitate user management, achieve relatively strong practicality, and effectively improve user experience.

The recent task interface may further provide the user with a way of cleaning an application. For an application that has been killed, cleaning the application may be understood as deleting a recent use record of the application. For an application that is still running, cleaning the application may be understood as killing the application and deleting a recent use record of the application. The mobile phone may clean an application in a plurality of manners: A first manner is cleaning an unlocked application, an application to which an intelligent lock is added, and an application to which a manual lock is added in batches. A second manner is cleaning an unlocked application and locked applications (including an application to which an intelligent lock is added and an application to which a manual lock is added) in batches. A third manner is cleaning applications corresponding to preview interfaces that are currently visible to the user on the multi-task interface in batches. A fourth manner is cleaning only an application that the user wants to clean.

The following scenario is used as an example below to separately describe various methods in which the mobile phone cleans applications in batches. The scenario is specifically as follows: The plurality of recently used applications include Gallery, Train Travel, Honor Video, and Calculator that are arranged in order of use. Gallery is an application that is first used by the user, Calculator is an application that is last used by the user, an intelligent lock is added to Gallery, a manual lock is added to each of Train Travel and Calculator, and no lock is added to Honor Video.

Figure 9A:
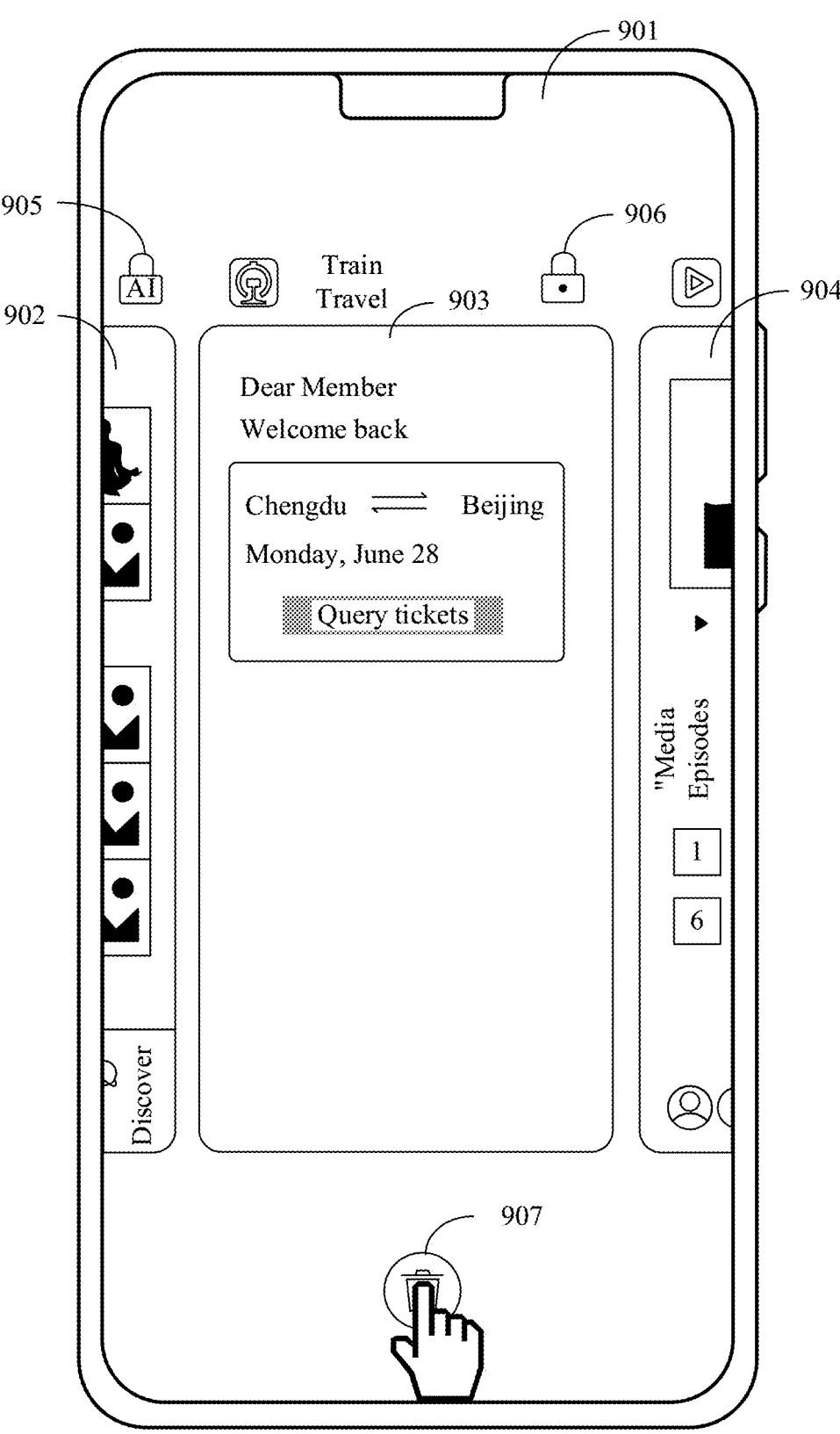
FIG. 9A(a) to FIG. 9A(d) are an interface switching diagram according to this application.
Figure 9A:
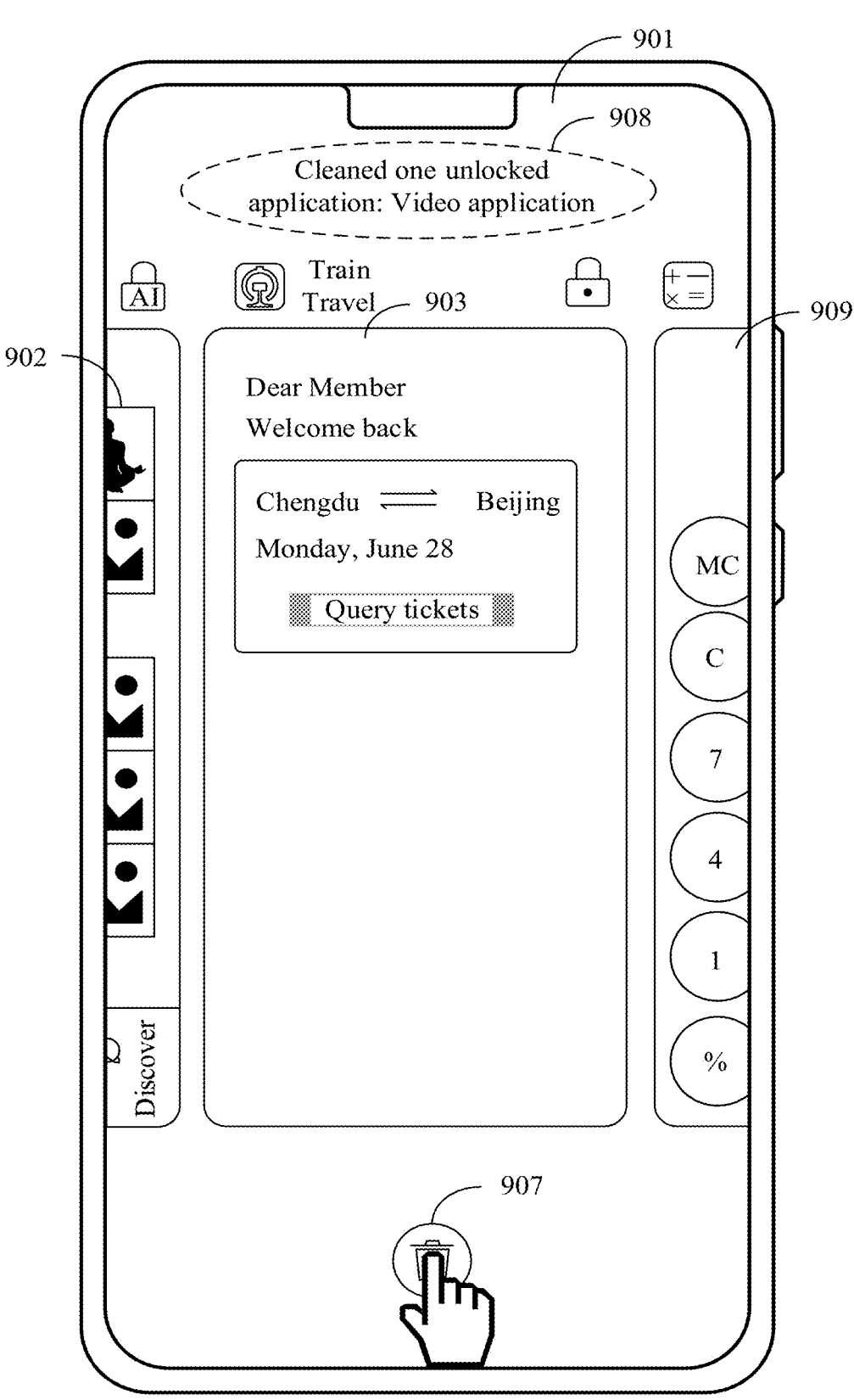
Figure 9A:
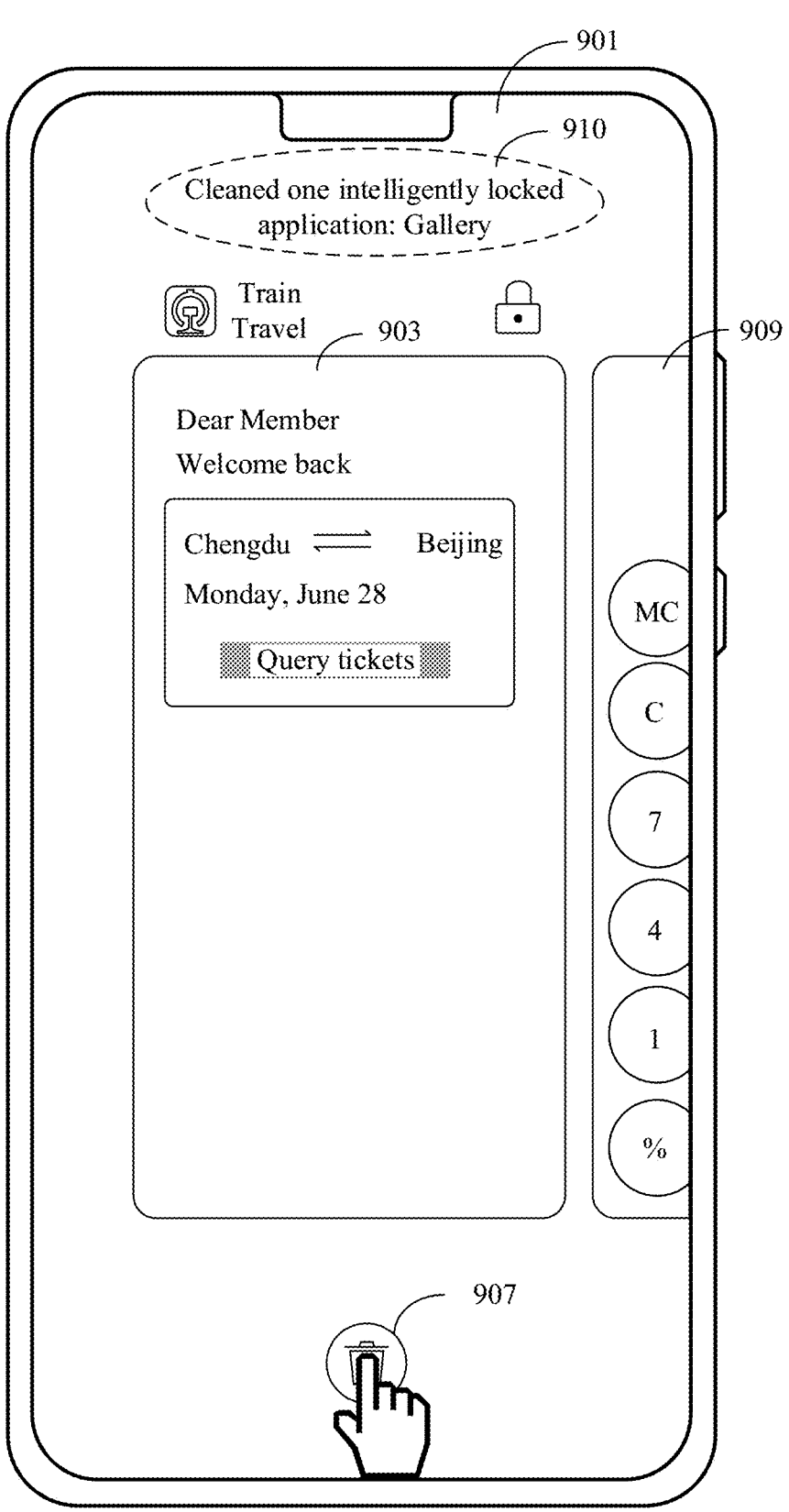
Figure 9A:
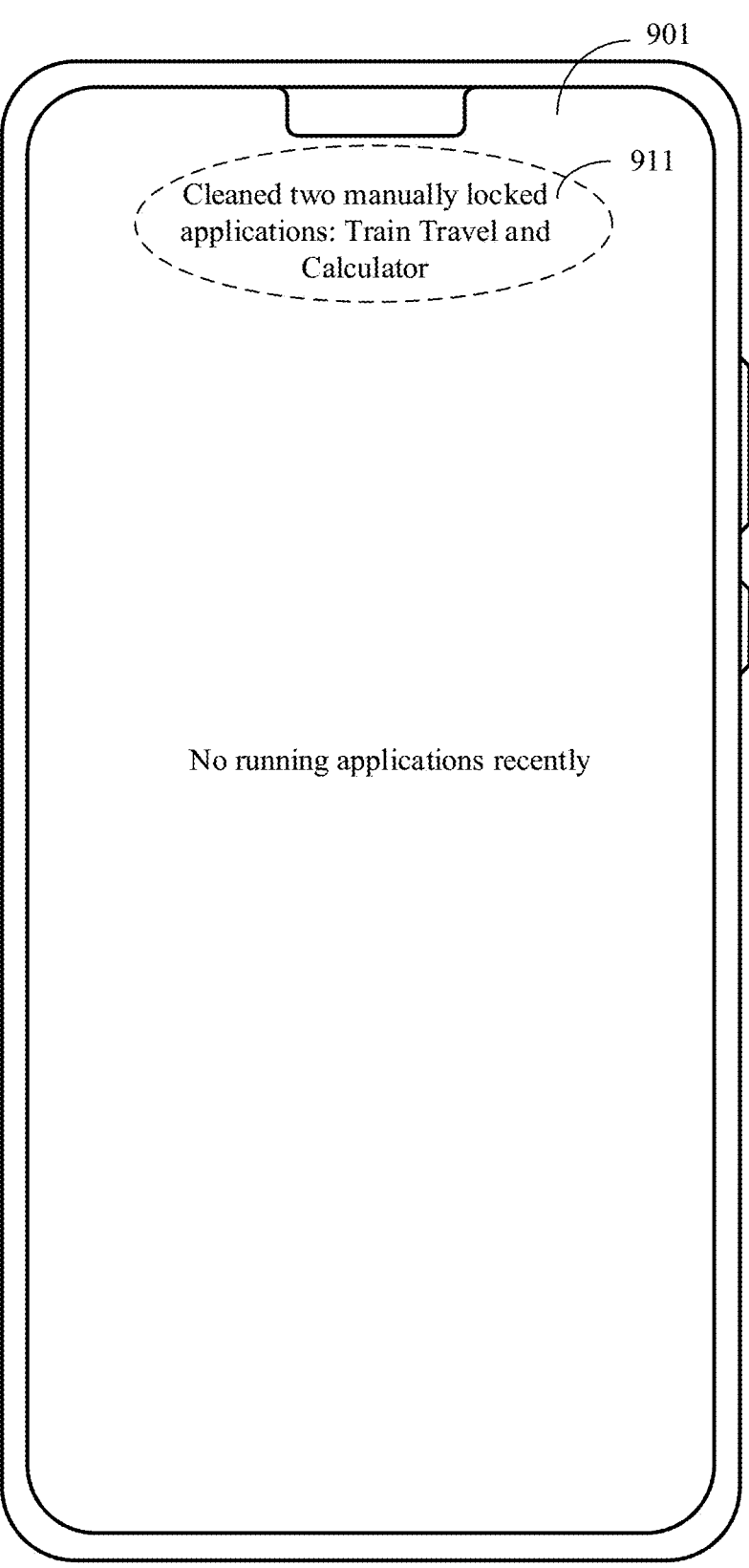

In the first manner, the mobile phone cleans an unlocked application, an application to which an intelligent lock is added, and an application to which a manual lock is added in batches. Specifically, when receiving a cleaning instruction for the first time, the mobile phone may first clean the unlocked application; when receiving a cleaning instruction for the second time, the mobile phone may clean the application to which the intelligent lock is added; and when receiving a cleaning instruction for the third time, the mobile phone may clean the application to which the manual lock is added. For example, as shown in FIG. 9A(a), the mobile phone may display a recent task interface 901. The recent task interface 901 may include a preview interface 902 of Gallery, a preview interface 903 of Train Travel, and a preview interface 904 of the video application. A first lock icon 905 is displayed on the preview interface 902 of Gallery, and a second lock icon 906 is displayed on the preview interface 903 of Train Travel. The first lock icon 905 is used to indicate that an intelligent lock is added to Gallery, the second lock icon 906 is used to indicate that a manual lock is added to Train Travel, and no lock is added to the video application (therefore, the first lock icon or the second lock icon is not displayed on the preview interface 904 of the video application). The recent task interface 901 further includes a cleaning icon 907. The mobile phone may receive an operation that the user taps the cleaning icon 907. In response to the operation, the mobile phone may clean (kill or close) an unlocked application (that is, the video application) in the plurality of recently running applications. After the mobile phone cleans the video application, as shown in FIG. 9A(b), the mobile phone may close (or not display) the preview interface 904 of the video application and display first cleaning information 908 and a preview interface 909 of Calculator on the recent task interface 901. The first cleaning information 908 is used to prompt the user with the fact that the mobile phone has cleaned an unlocked application, a quantity of cleaned applications, names of the cleaned applications, and the like. For example, the first cleaning information 908 may be "Cleaned one unlocked application: Video application". The mobile phone may receive an operation that the user taps the cleaning icon 907 again. In response to the operation, the mobile phone may clean each application to which an intelligent lock is added (that is, Gallery). As shown in FIG. 9A(c), the mobile phone closes the preview interface 902 of Gallery and displays second cleaning information 910 on the recent task interface 901. The second cleaning information 910 is used to prompt the user with the fact that the mobile phone has cleaned an application to which an intelligent lock is added, a quantity of cleaned applications, names of the cleaned applications, and the like. For example, the second cleaning information 908 may be "Cleaned one intelligently locked application: Gallery". The mobile phone may receive an operation that the user taps the cleaning icon 907 again. In response to the operation, the mobile phone may clean all manually locked applications (that is, Train Travel and Calculator). As shown in FIG. 9A(d), the mobile phone displays third cleaning information 911. The third cleaning information 911 is used to prompt the user with the fact that the mobile phone has cleaned an application to which a manual lock is added, a quantity of cleaned applications, names of the cleaned applications, and the like. For example, the third cleaning information 911 may be "Cleaned two manually locked applications: Train Travel and Calculator". In this embodiment of this application, the first cleaning information 908, the second cleaning information 910, and the third cleaning information 911 may disappear after a preset time. Alternatively, the mobile phone may not display the first cleaning information 908, the second cleaning information 910, and the third cleaning information 911. It should be noted that, for the following first cleaning information, second cleaning information, and third cleaning information, refer to settings of the first cleaning information 908, the second cleaning information 910, and the third cleaning information 911. In other words, the first cleaning information, the second cleaning information, and the third cleaning information may disappear after a preset time or may not be directly displayed.

Figure 9B:
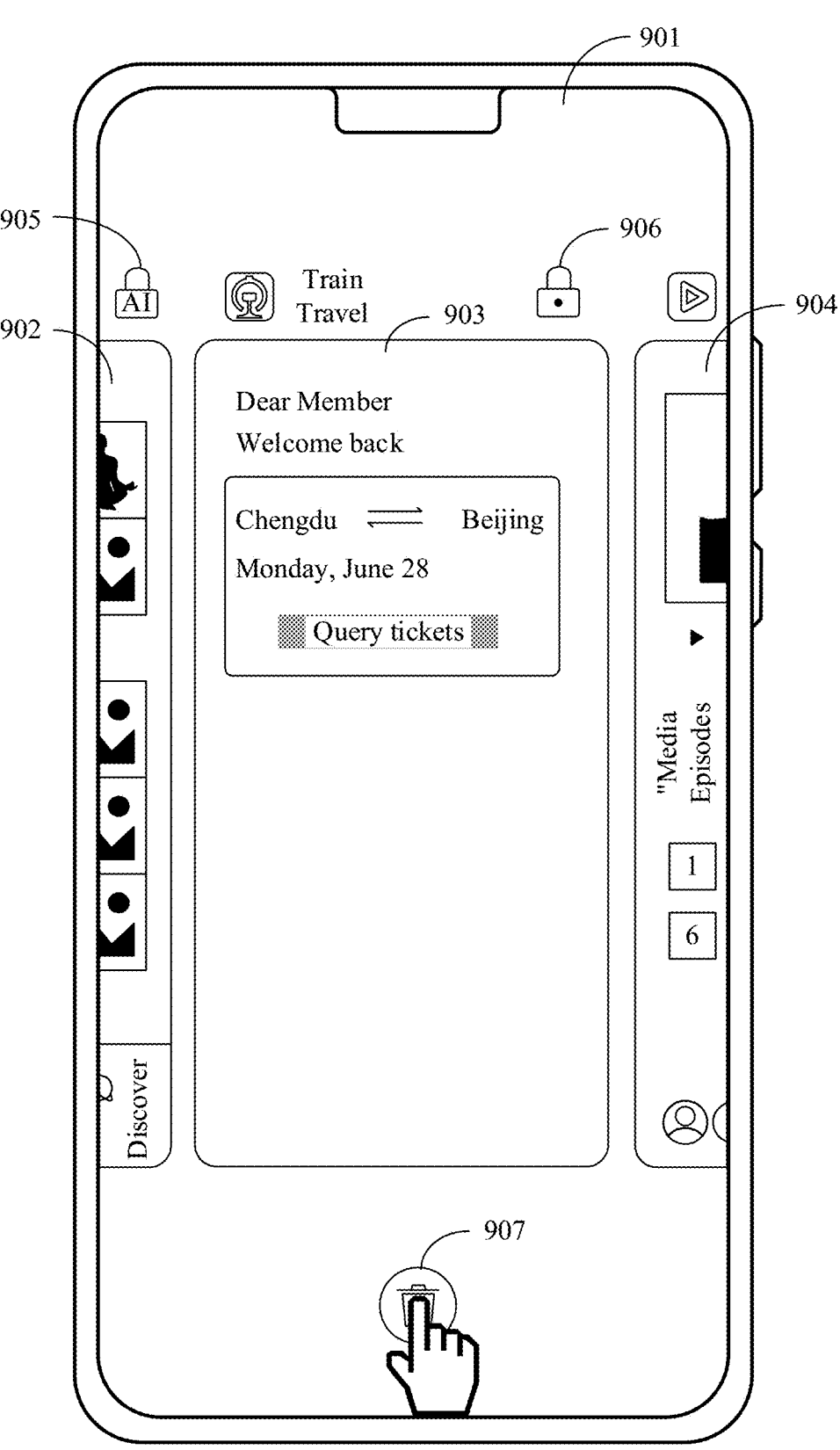
FIG. 9B(a) to FIG. 9B(c) are an interface switching diagram according to this application.
Figure 9B:
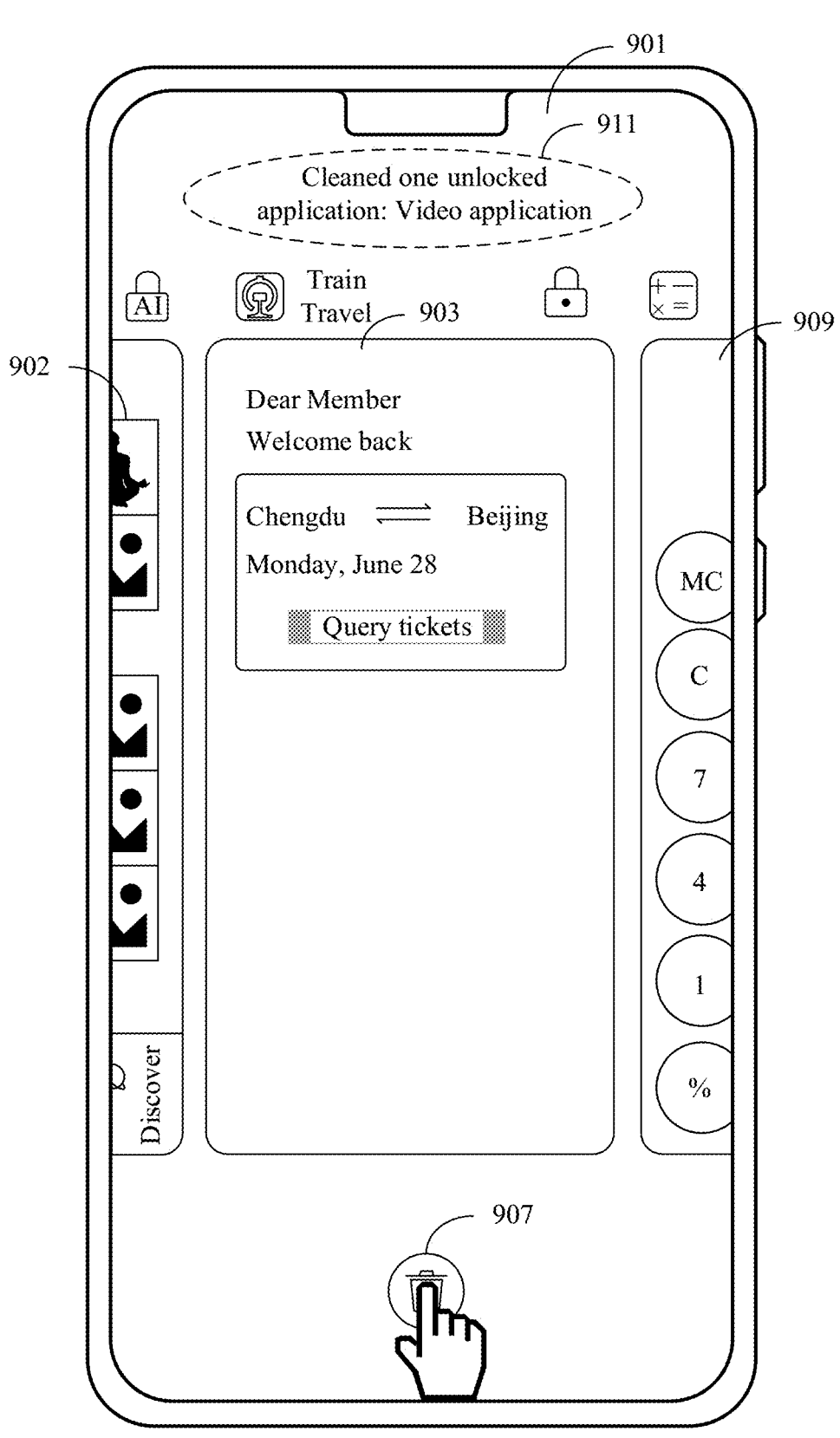
Figure 9B:

In the second manner, the mobile phone cleans an unlocked application and locked applications (including an application to which an intelligent lock is added and an application to which a manual lock is added) in batches. Specifically, when receiving a cleaning instruction for the first time, the mobile phone may first clean the unlocked application; and when receiving a cleaning instruction for the second time, the mobile phone may clean all the locked application (the application to which the intelligent lock is added and the application to which the manual lock is added). For example, as shown in FIG. 9B(a) (for related descriptions of the recent task interface 901, refer to the text part of FIG. 9A(a) to FIG. 9A(d), and details are not described herein again), the mobile phone may receive an operation that the user taps the cleaning icon 907. In response to the operation, the mobile phone may clean an unlocked application (that is, the video application) in the plurality of recently running applications, and close the preview interface 904 of the video application and display cleaning information 912 (as shown in FIG. 9B(b)) and the preview interface 909 of Calculator on the recent task interface 901. The cleaning information 912 is used to prompt the user with the fact that the mobile phone has cleaned an unlocked application, a quantity of cleaned applications, names of the cleaned applications, and the like. For example, the cleaning information 912 may be "Cleaned one unlocked application: Video application". The mobile phone may receive an operation that the user taps the cleaning icon 907 again. In response to the operation, the mobile phone may clean all locked applications (that is, Gallery, Train Travel, and Calculator), and display cleaning information 913 shown in FIG. 9B(c). The cleaning information 913 is used to prompt the user with the fact that the mobile phone has cleaned an application to which a manual lock is added, an application to which an intelligent lock is added, a quantity of cleaned applications, names of the cleaned applications, and the like. For example, the cleaning information 913 may be "Cleaned three manually locked applications: Gallery, Train Travel, and Calculator".

It may be understood that both the first cleaning manner and the second cleaning manner are first cleaning an unlocked application and then cleaning a locked application. This can prevent the mobile phone from directly cleaning an application that the user needs to continue to use.

Figure 10A:
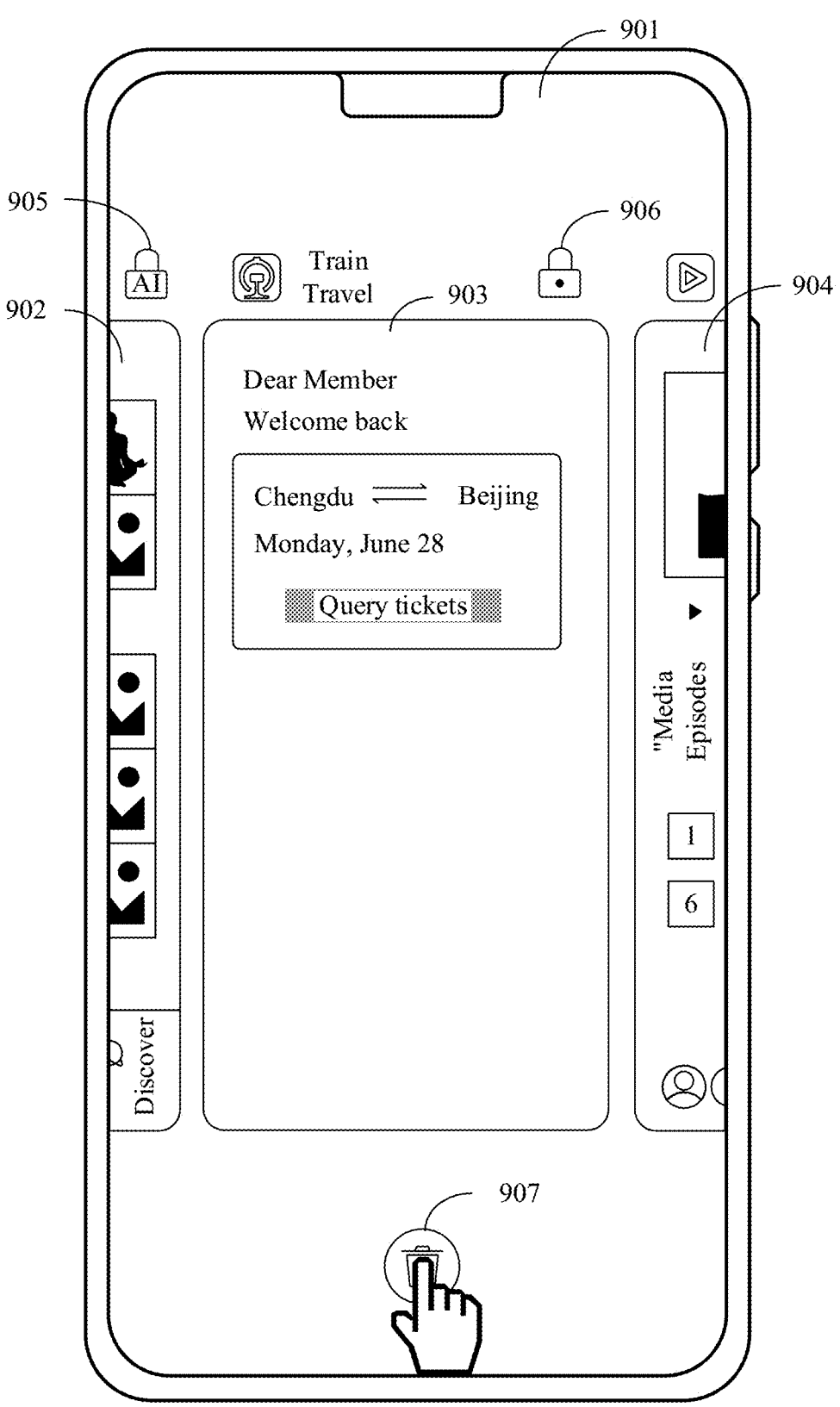
FIG. 10A(a) to FIG. 10A(c) are an interface switching diagram according to this application.
Figure 10A:
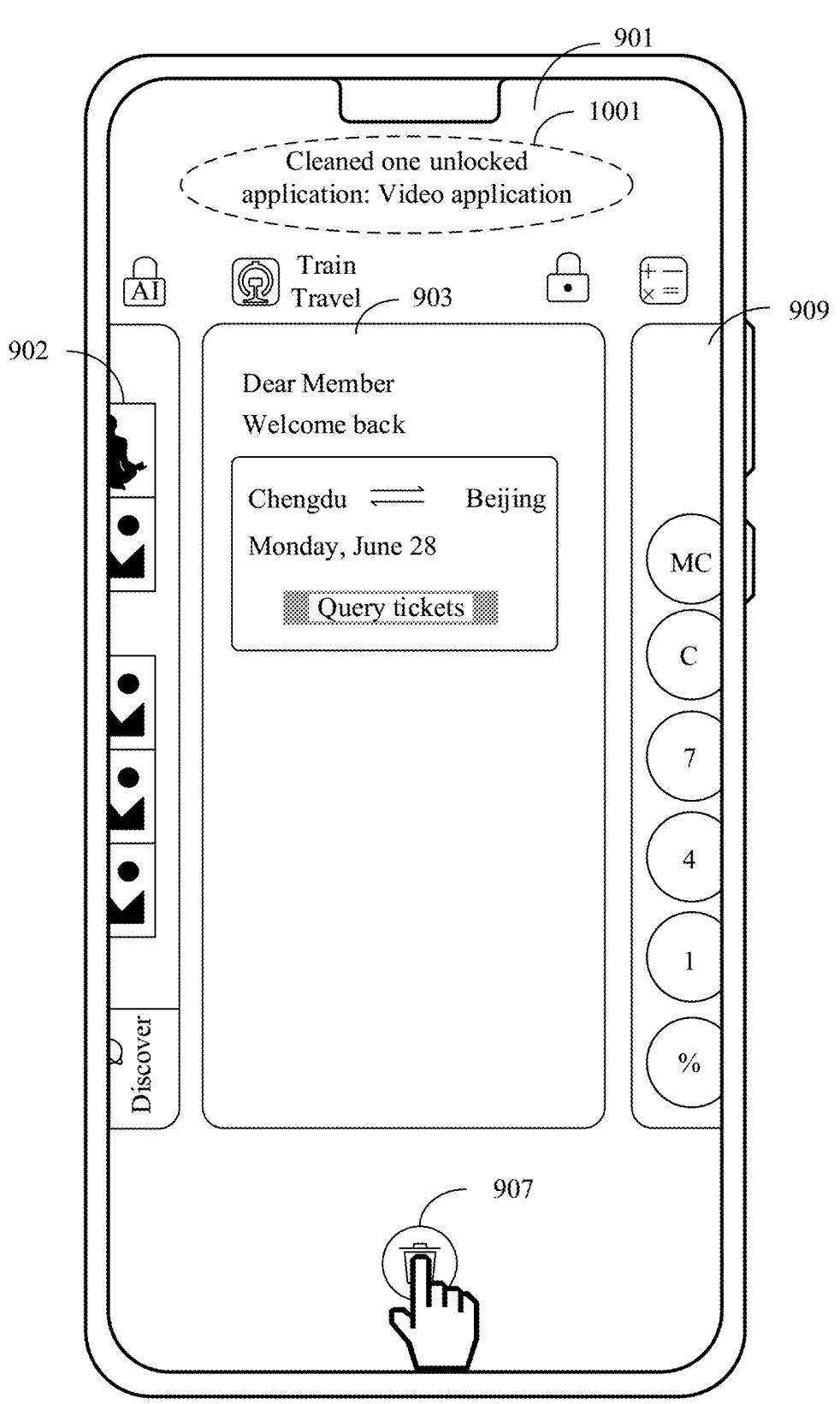
Figure 10A:
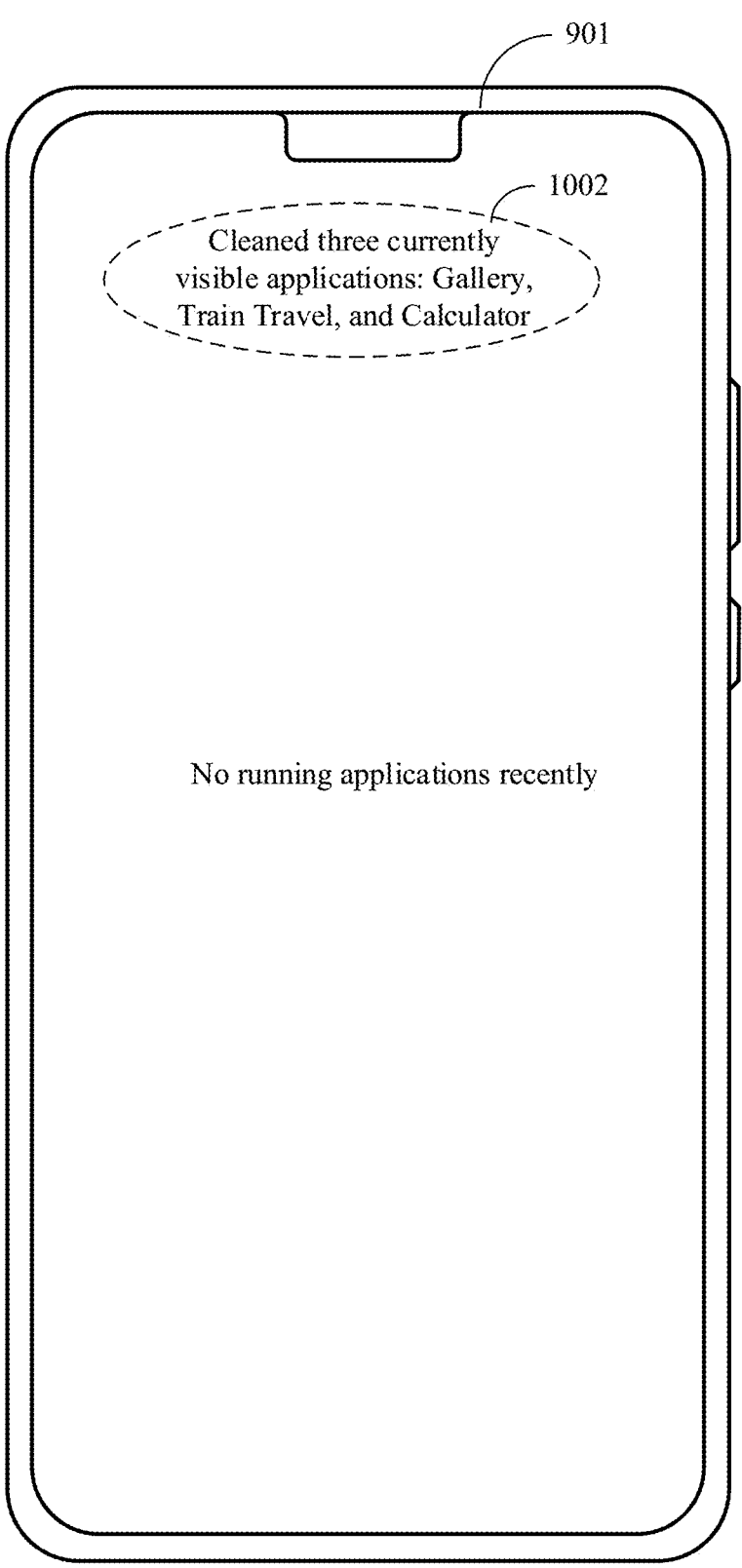

In the third manner, the mobile phone cleans applications corresponding to preview interfaces that are currently visible to the user on the recent task interface in batches. Specifically, the mobile phone may receive a cleaning operation that is initiated by the user for the first time. In response to the operation, the mobile phone may clean an unlocked application. The mobile phone may further receive a cleaning operation that is initiated by the user for the second time. In response to the operation, the mobile phone may clean a preview interface that is currently visible to the user on the recent task interface and a corresponding application. The preview interface that is currently visible to the user may be all preview interfaces displayed on the recent task interface (for example, the preview interface 902, the preview interface 903, and the preview interface 904 in FIG. 9A(a)). For example, as shown in FIG. 10A(a) (for related descriptions of the recent task interface 901, refer to the text part of FIG. 9A(a) to FIG. 9A(d), and details are not described herein again), the mobile phone may receive an operation that the user taps the cleaning icon 907. In response to the operation, as shown in FIG. 10A(b), the mobile phone closes the preview interface 904 of the video application on the recent task interface 901, and displays cleaning information 1001 and the preview interface 909 of Calculator on the recent task interface 901. The mobile phone may receive an operation that the user taps the cleaning icon 907 again. In response to the operation, as shown in FIG. 10A(c), the mobile phone closes preview interfaces that are currently visible to the user (that is, the preview interface 902 of Gallery, the preview interface 903 of Train Travel, and the preview interface 909 of Calculator) on the recent task interface 901, and closes Gallery, Train Travel, and Calculator. The mobile phone may further display cleaning information 1002 on the recent task interface 901. The cleaning information 1002 is used to prompt the user with the fact that the mobile phone has cleaned a currently visible application, a quantity of cleaned applications, names of the cleaned applications, and the like. For example, the cleaning information 1002 may be "Cleaned three visible applications: Gallery, Train Travel, and Calculator". In an optional design, when receiving an operation that the user taps the cleaning icon 907 again, the mobile phone may alternatively clean only a preview interface with a largest display area (that is, the preview interface 903 of Train Travel) in preview interfaces that are currently visible to the user.

It may be understood that the preview interfaces of the plurality of recently used applications may be displayed on the recent task interface in different forms. In the foregoing recent task interface, the plurality of preview interfaces are horizontally arranged in a column, and there is no overlapping area between any two adjacent preview interfaces. In another implementation, the plurality of preview interfaces may be horizontally arranged in a column, and there is an overlapping area between any two adjacent preview interfaces, for example, a recent task interface shown in FIG. 10B. For another example, the plurality of preview interfaces may be divided into a plurality of columns, and each column includes a plurality of preview interfaces that do not mutually overlap, for example, a recent task interface shown in FIG. 10C or FIG. 10D (where the electronic device is a tablet). It should be noted that the plurality of preview interfaces are arranged on the recent task interface in different manners, without affecting specific implementation of this application.

Figure 10B:
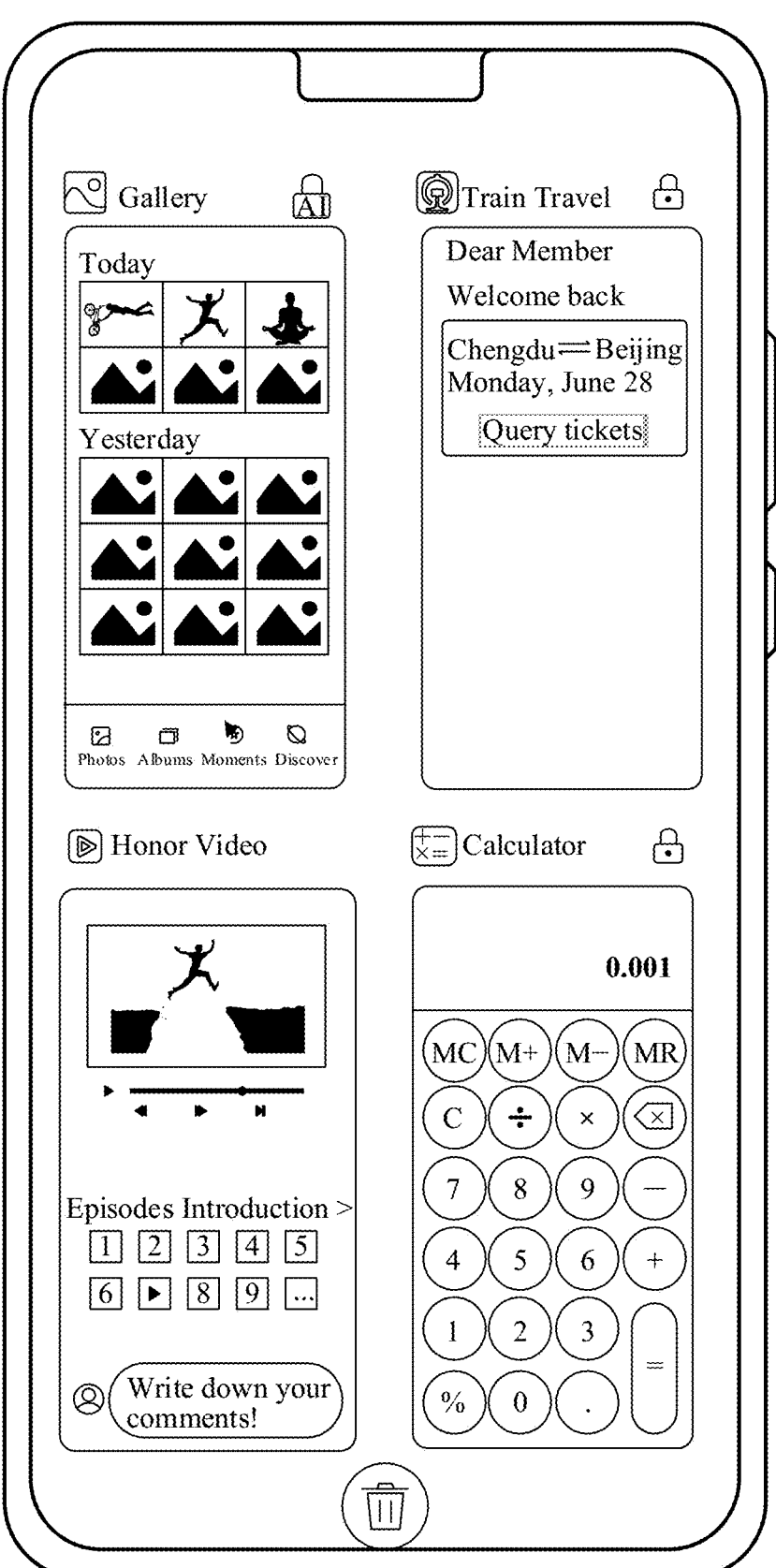
FIG. 10B is an interface diagram according to this application.
Figure 10C:
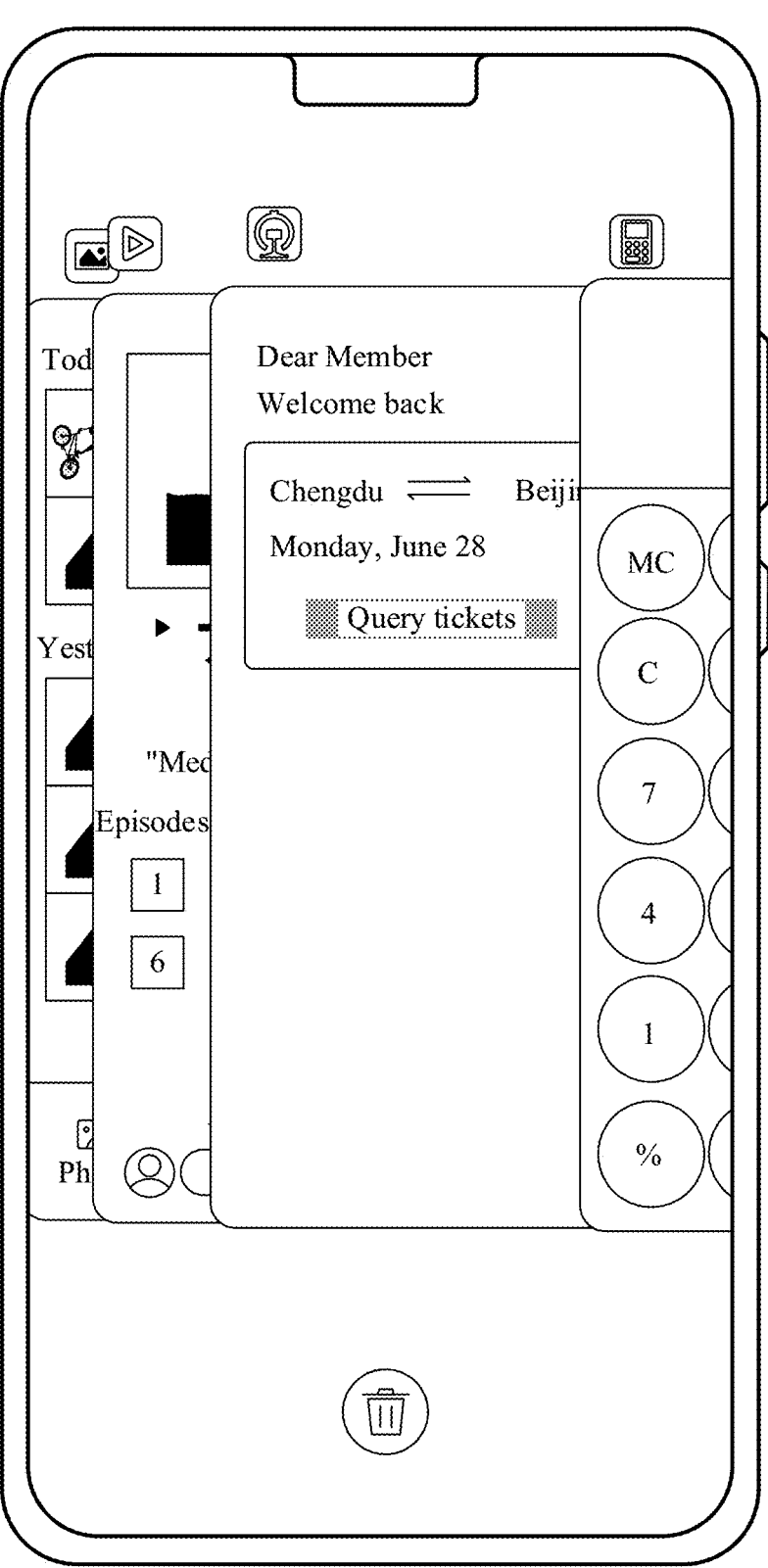
FIG. 10D is an interface diagram according to this application.
FIG. 10E(a) to FIG. 10E(c) are an interface switching diagram according to this application.
Figure 10D:
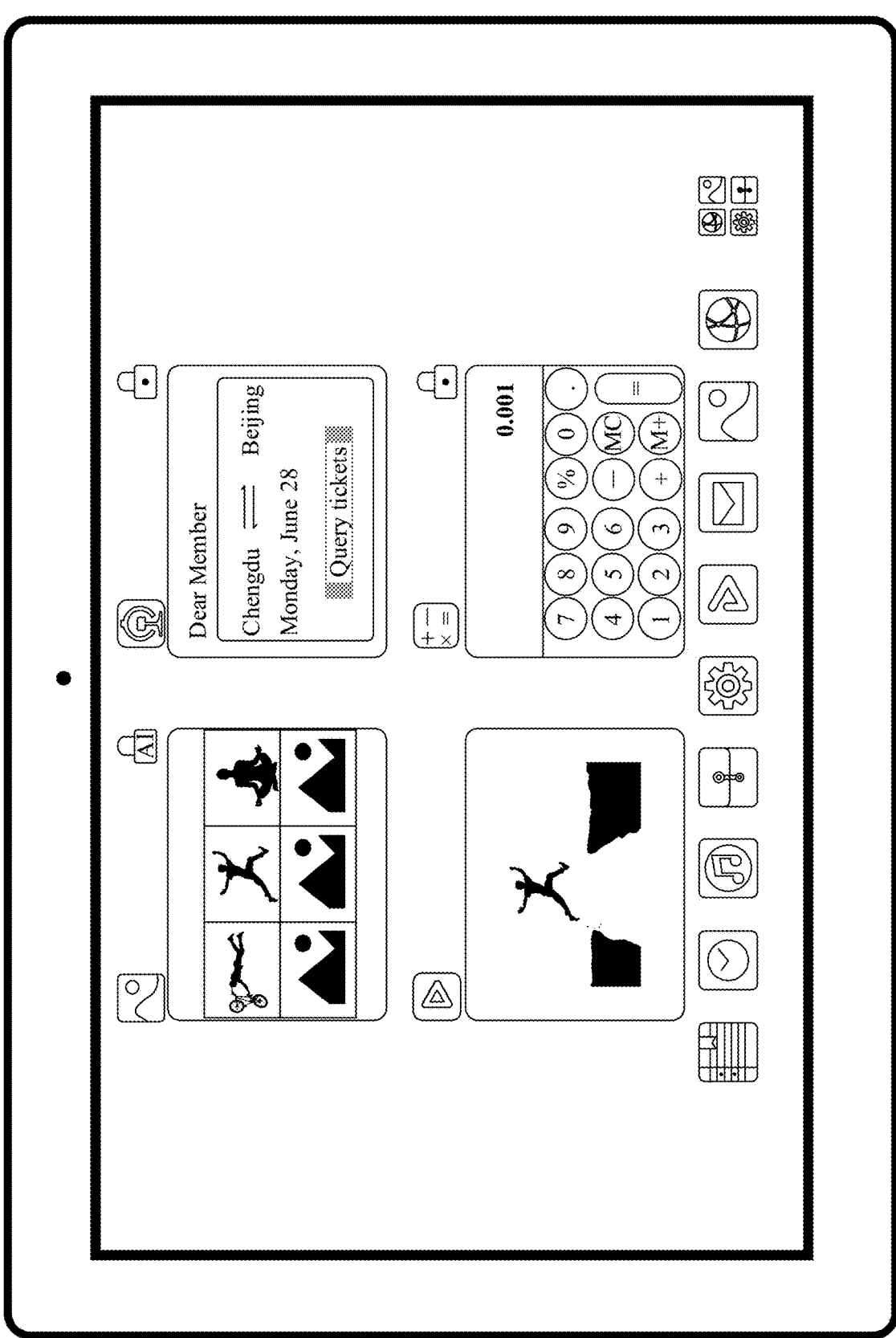
Figure 10E:
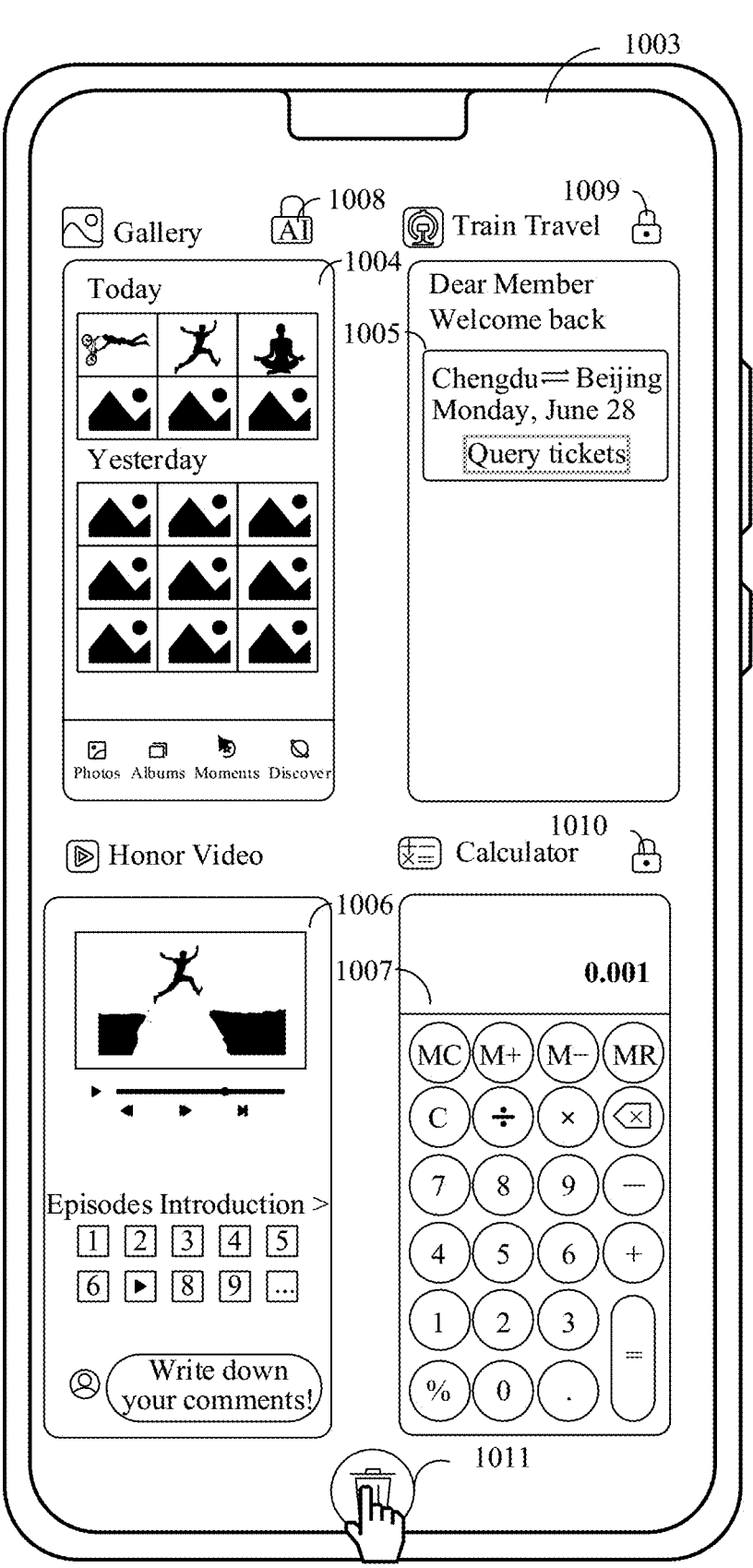
Figure 10E:
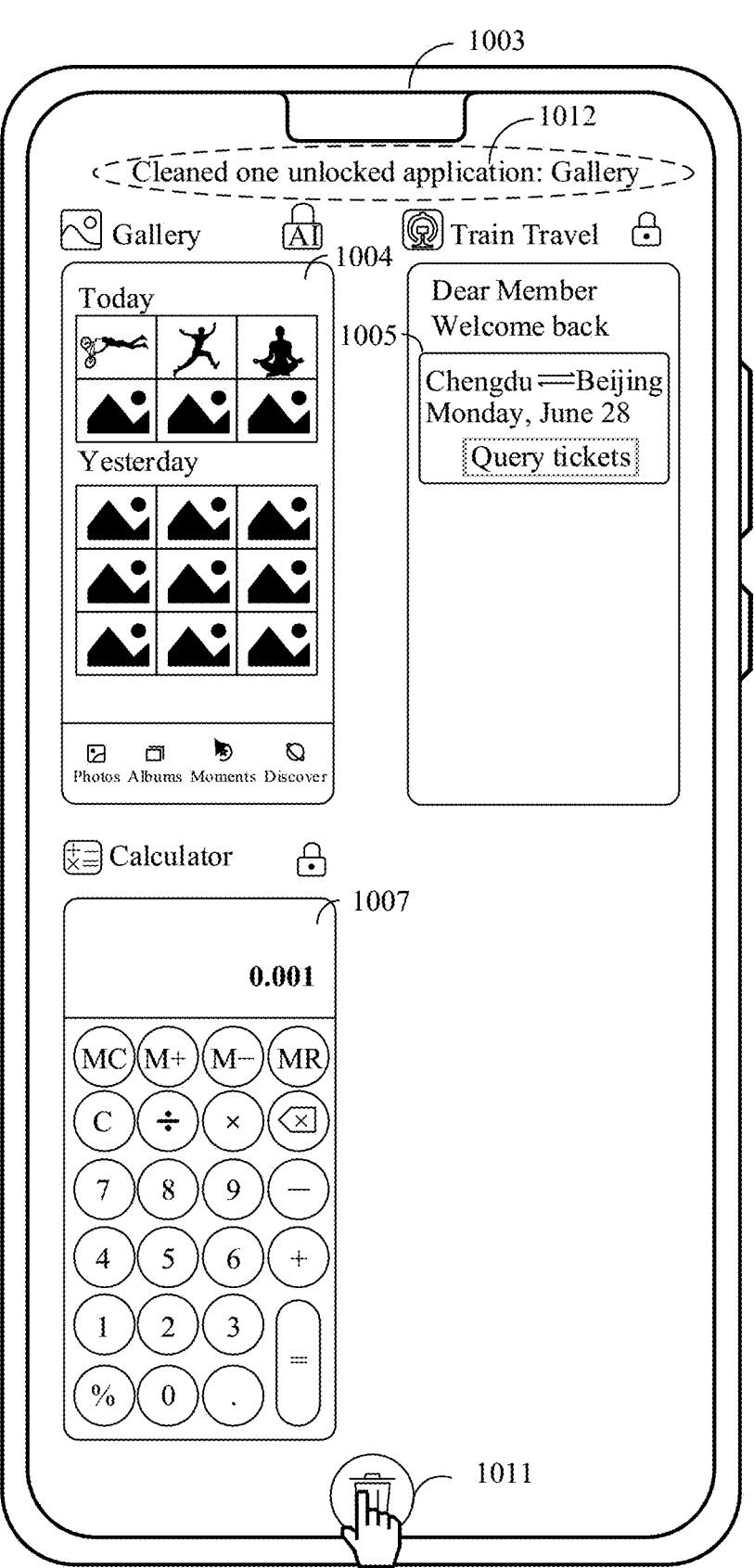
Figure 10E:
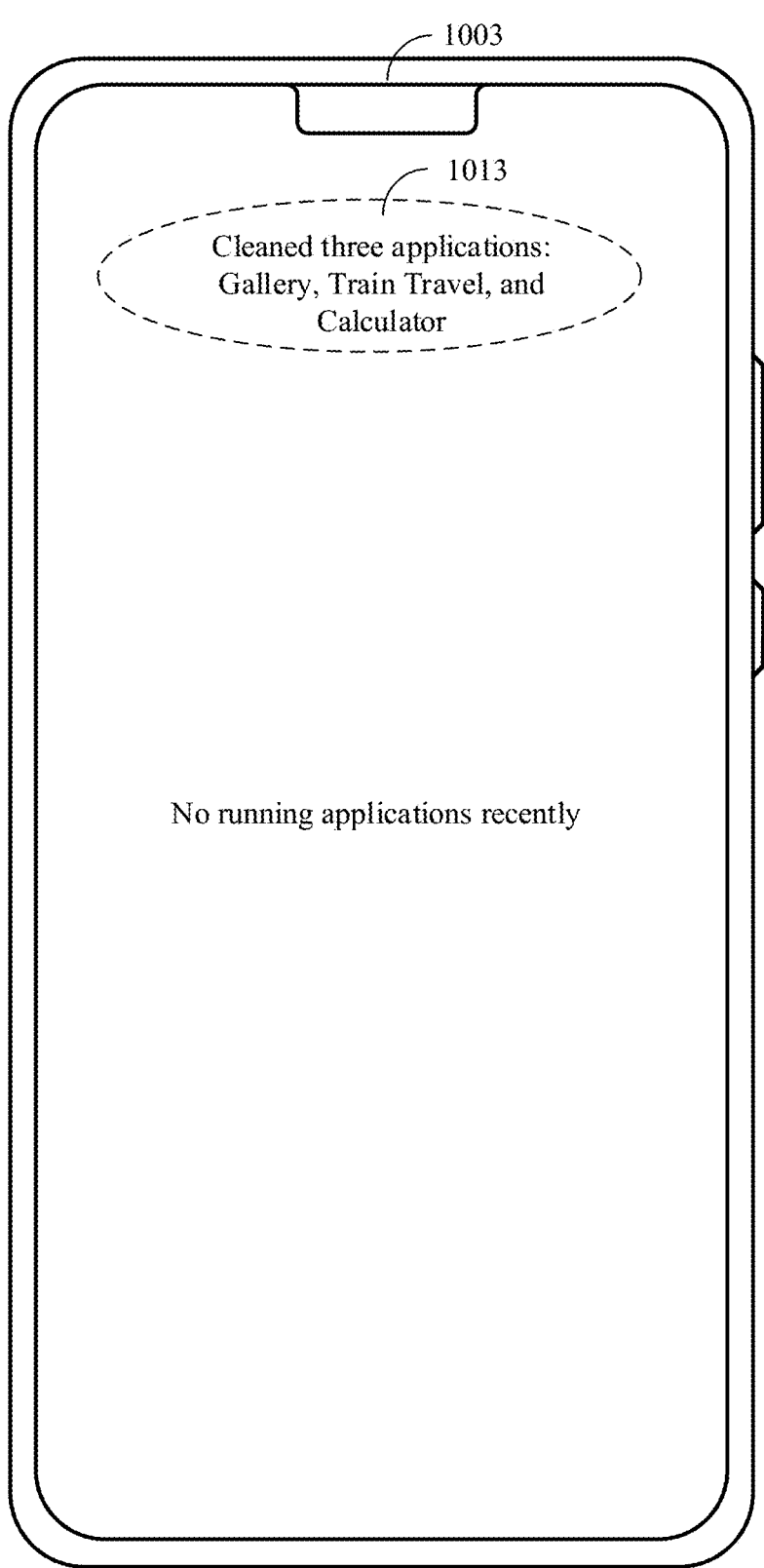

For example, when the preview interfaces are displayed on the recent task interface in a manner shown in FIG. 10B, the mobile phone may display a recent task interface 1003 shown in FIG. 10E(a). The recent task interface 1003 may include a preview interface 1004 of Gallery, a preview interface 1005 of Train Travel, a preview interface 1006 of the video application, and a preview interface 1007 of Calculator. The mobile phone displays a second cleaning icon 1008 on the preview interface 1004 of Gallery, displays a first cleaning icon 1009 on the preview interface 1005 of Train Travel, and displays a first cleaning icon 1010 on the preview interface 1007 of Calculator. The second cleaning icon 1008 is used to indicate that an intelligent lock is added to Gallery, the first cleaning icon 1009 is used to indicate that a manual lock is added to Train Travel, and the first cleaning icon 1010 is used to indicate that a manual lock is added to Calculator. The recent task interface 1003 may further include a cleaning icon 1011. The mobile phone may receive an operation that the user taps the cleaning icon 1011. In response to the operation, as shown in FIG. 10E(b), the mobile phone may close an unlocked application (that is, the video application) and display cleaning information 1012 on the recent task interface 1003. The mobile phone may further receive an operation that the user taps the cleaning icon 1011 again. In response to the operation, the mobile phone may close an application that is currently visible to the user (that is, Gallery, Train Travel, and Calculator) on the recent task interface 1003, or the mobile phone may close all locked applications (that is, Gallery, Train Travel, and Calculator) on the recent task interface 1005. Further, as shown in FIG. 10E(c), the mobile phone may further display cleaning information 1013, so as to indicate a quantity of cleaned applications, names of the cleaned applications, and the like.

Figure 11A:
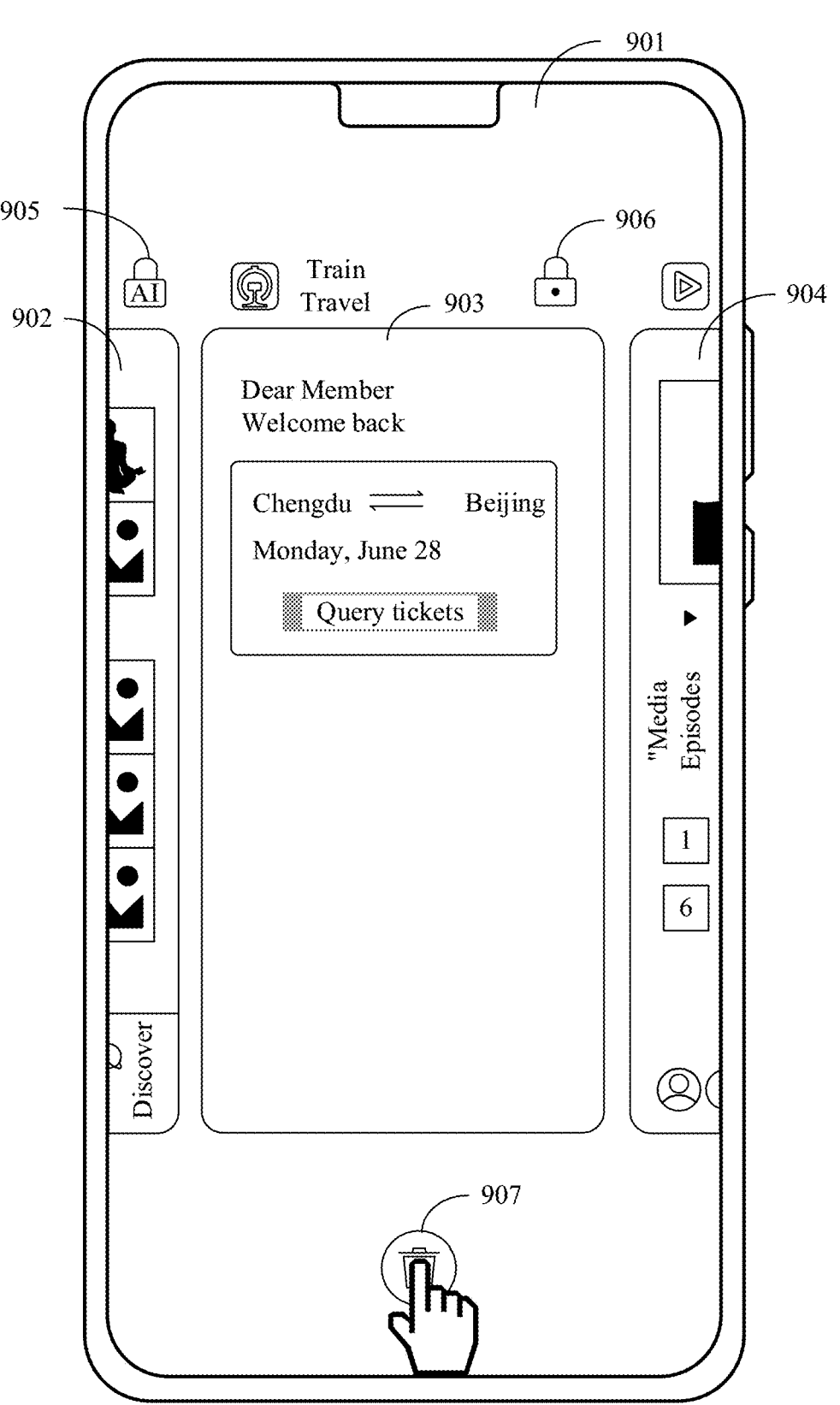
FIG. 11A(a) to FIG. 11A(c) are an interface switching diagram according to this application.
Figure 11A:
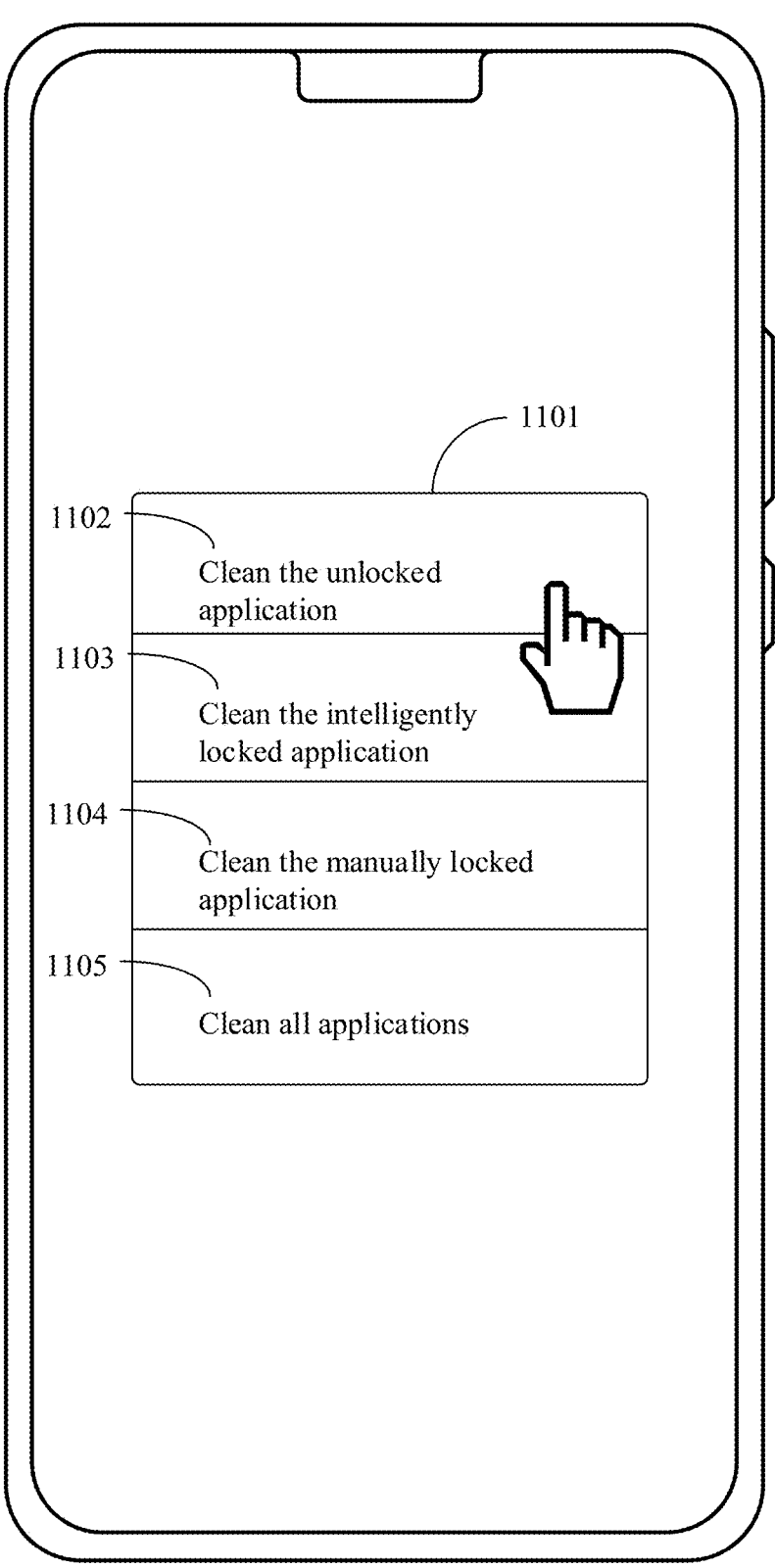
Figure 11A:
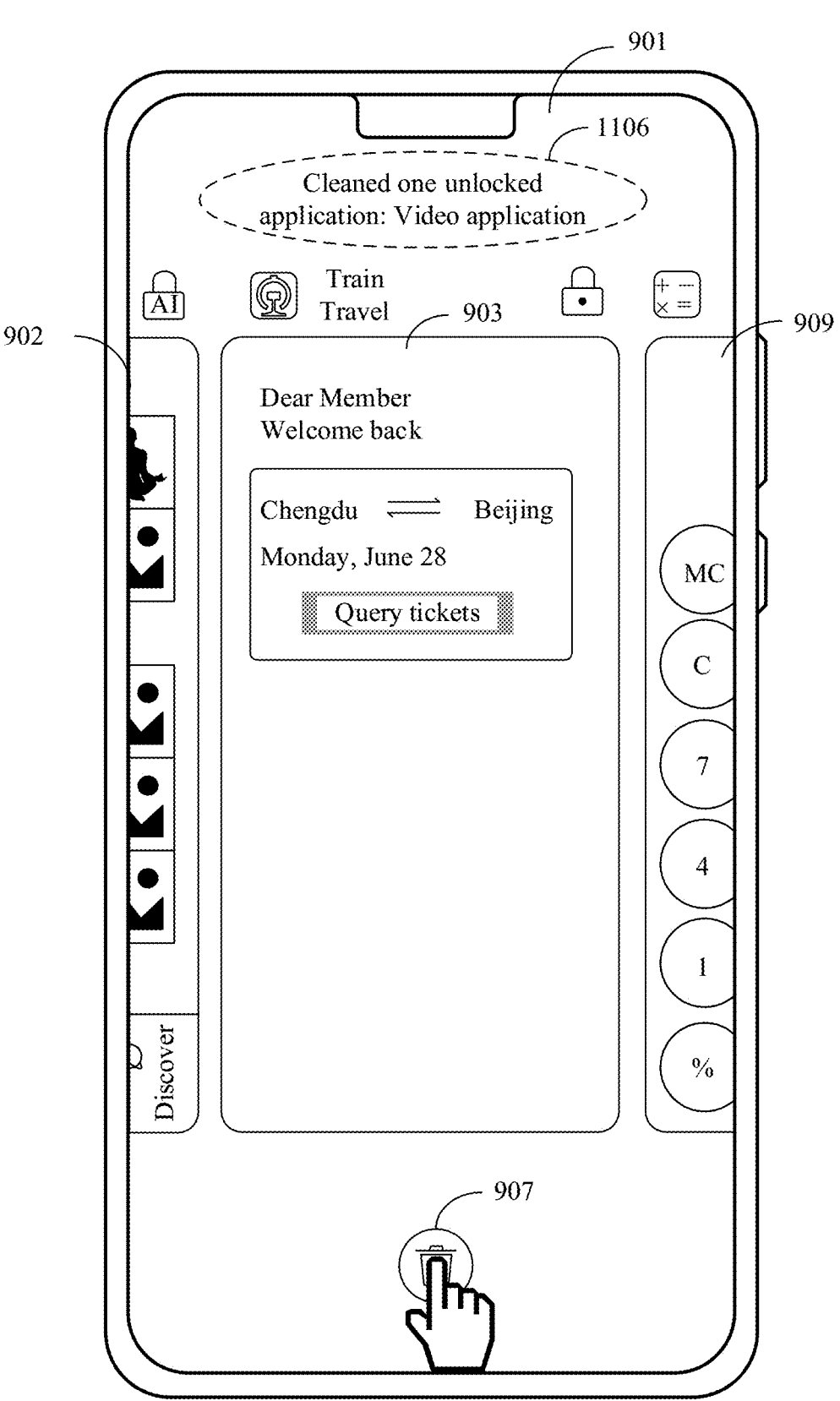
Figure 11B:
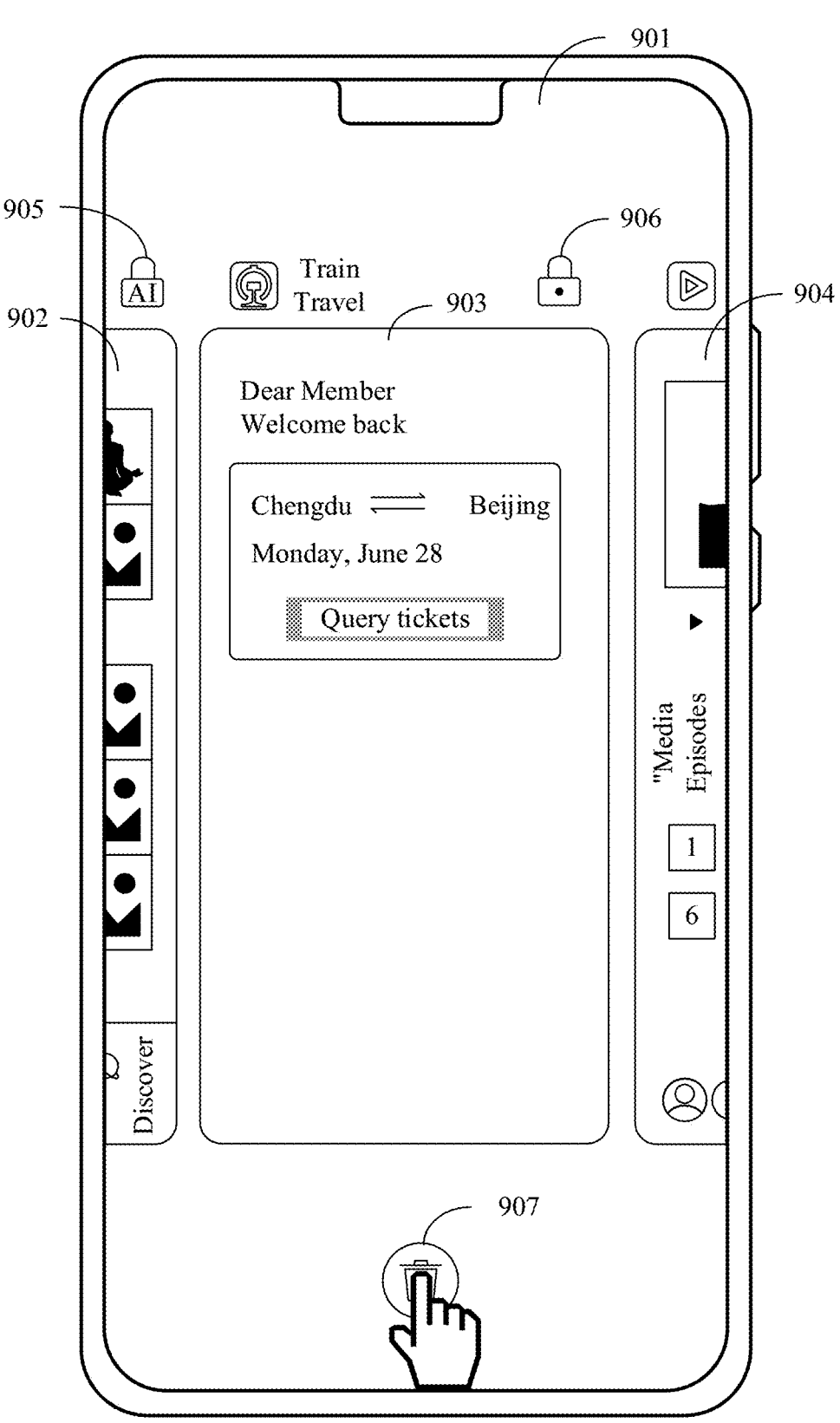
FIG. 11B(a) to FIG. 11B(c) are an interface switching diagram according to this application.
Figure 11B:
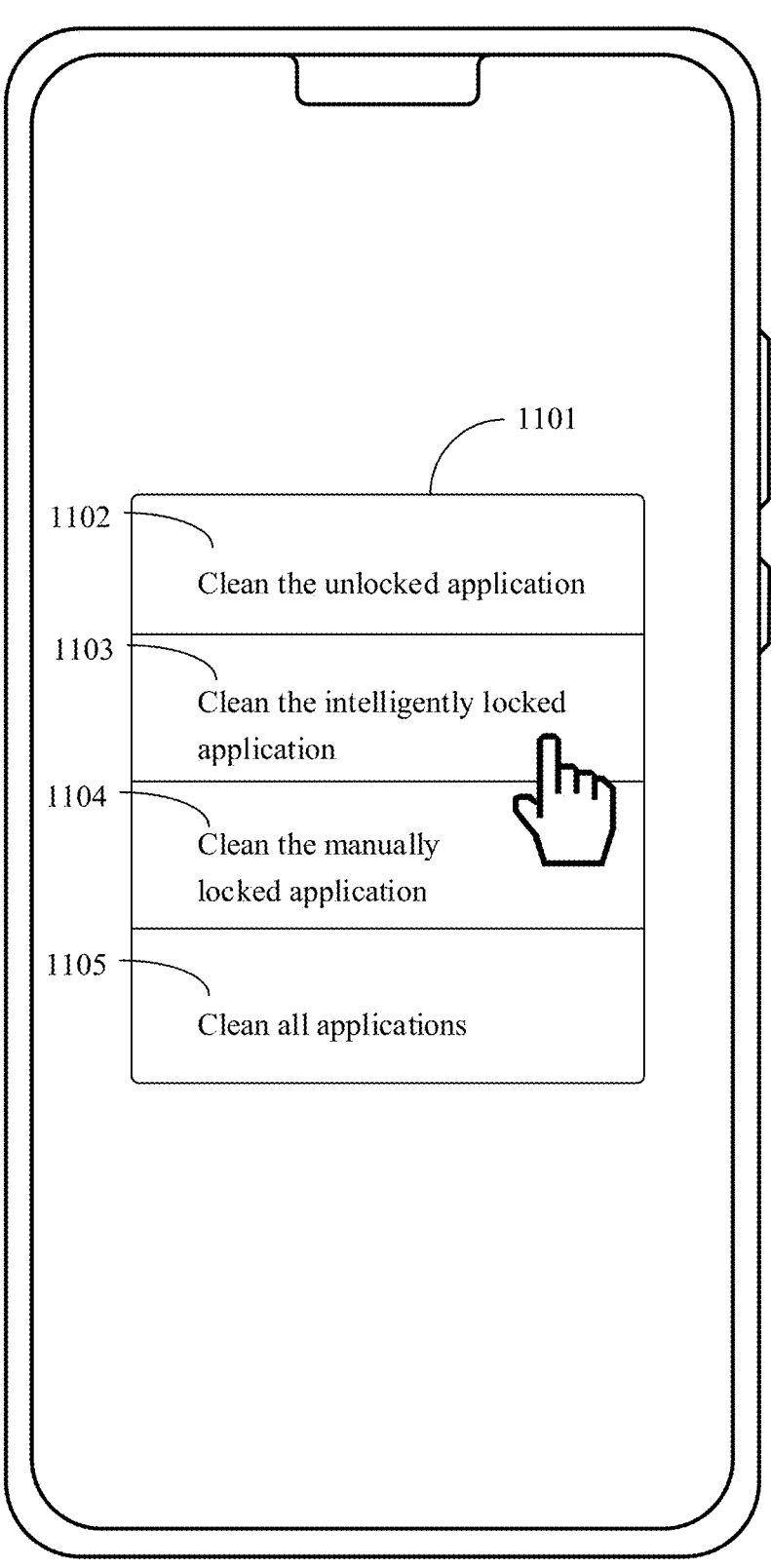
Figure 11B:
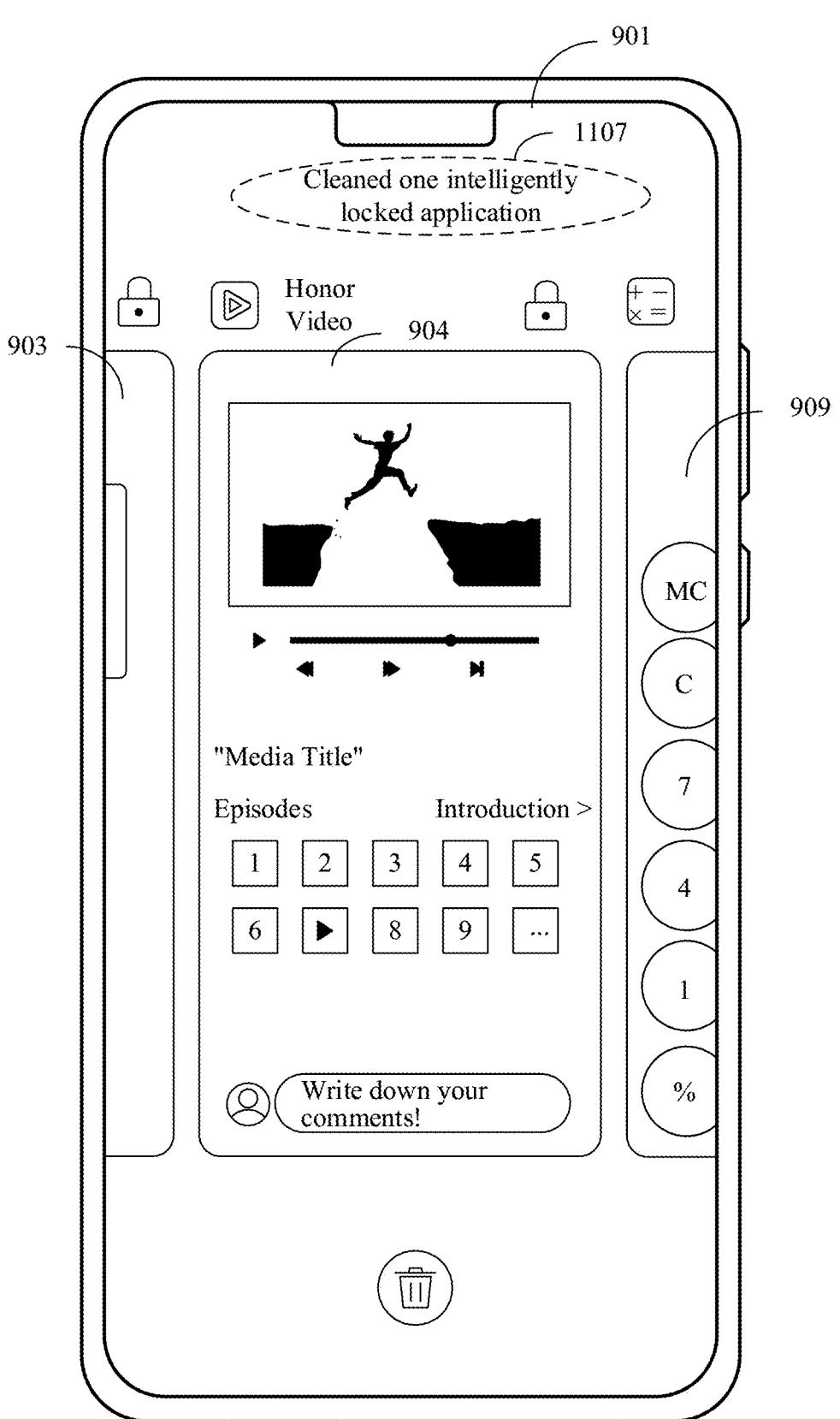
Figure 11C:
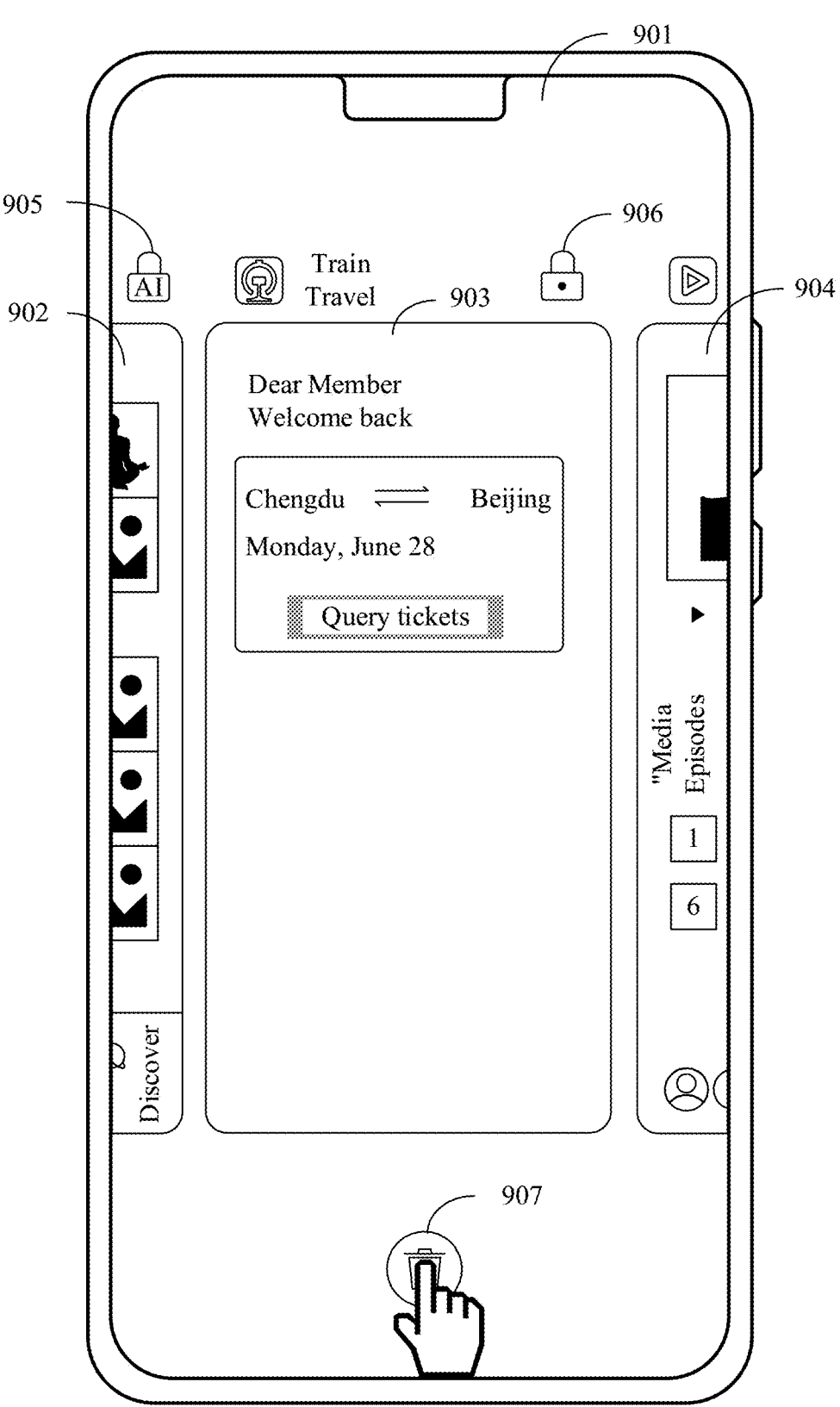
FIG. 11C(a) to FIG. 11C(c) are an interface switching diagram according to this application.
Figure 11C:
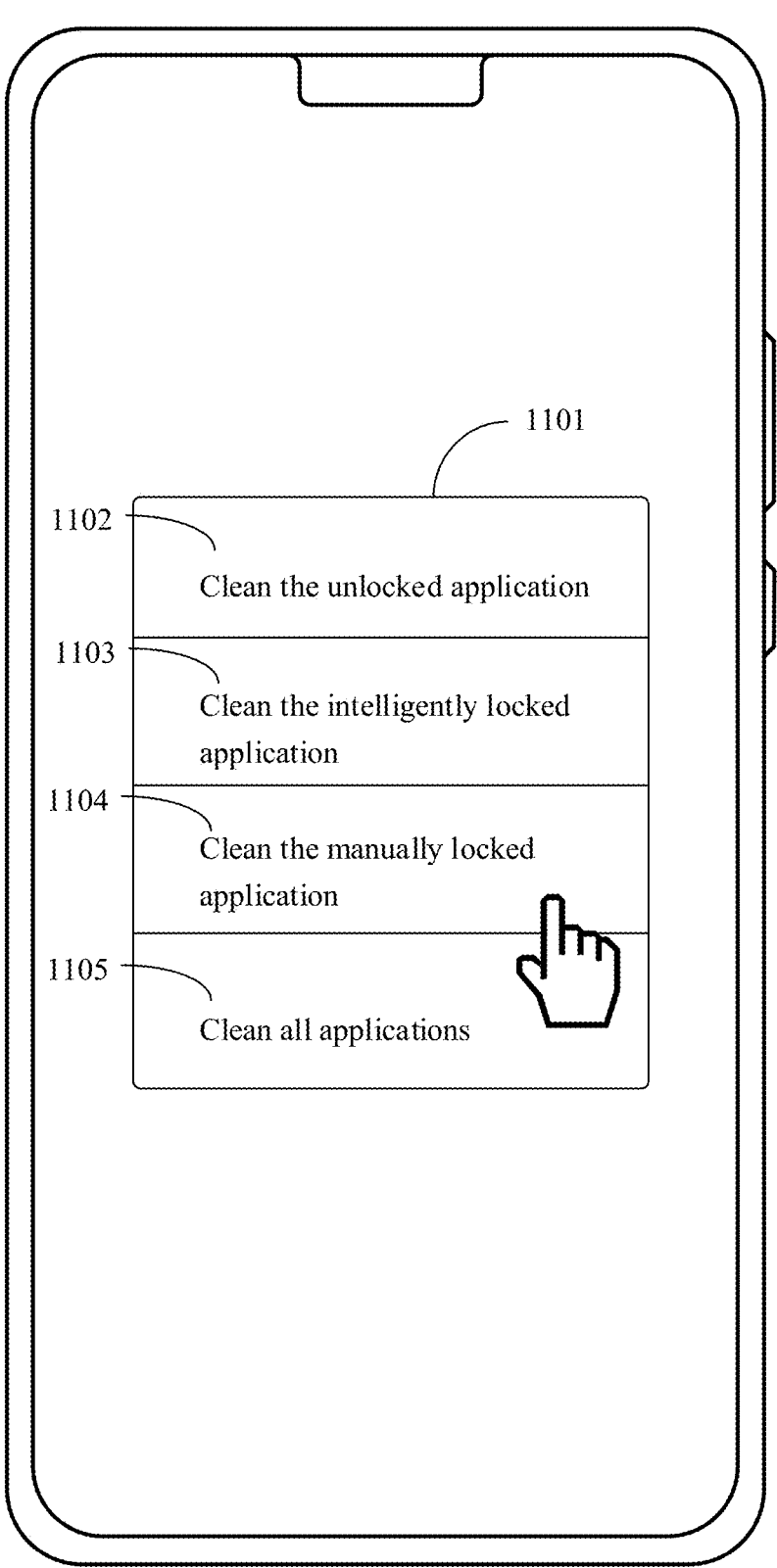
Figure 11C:
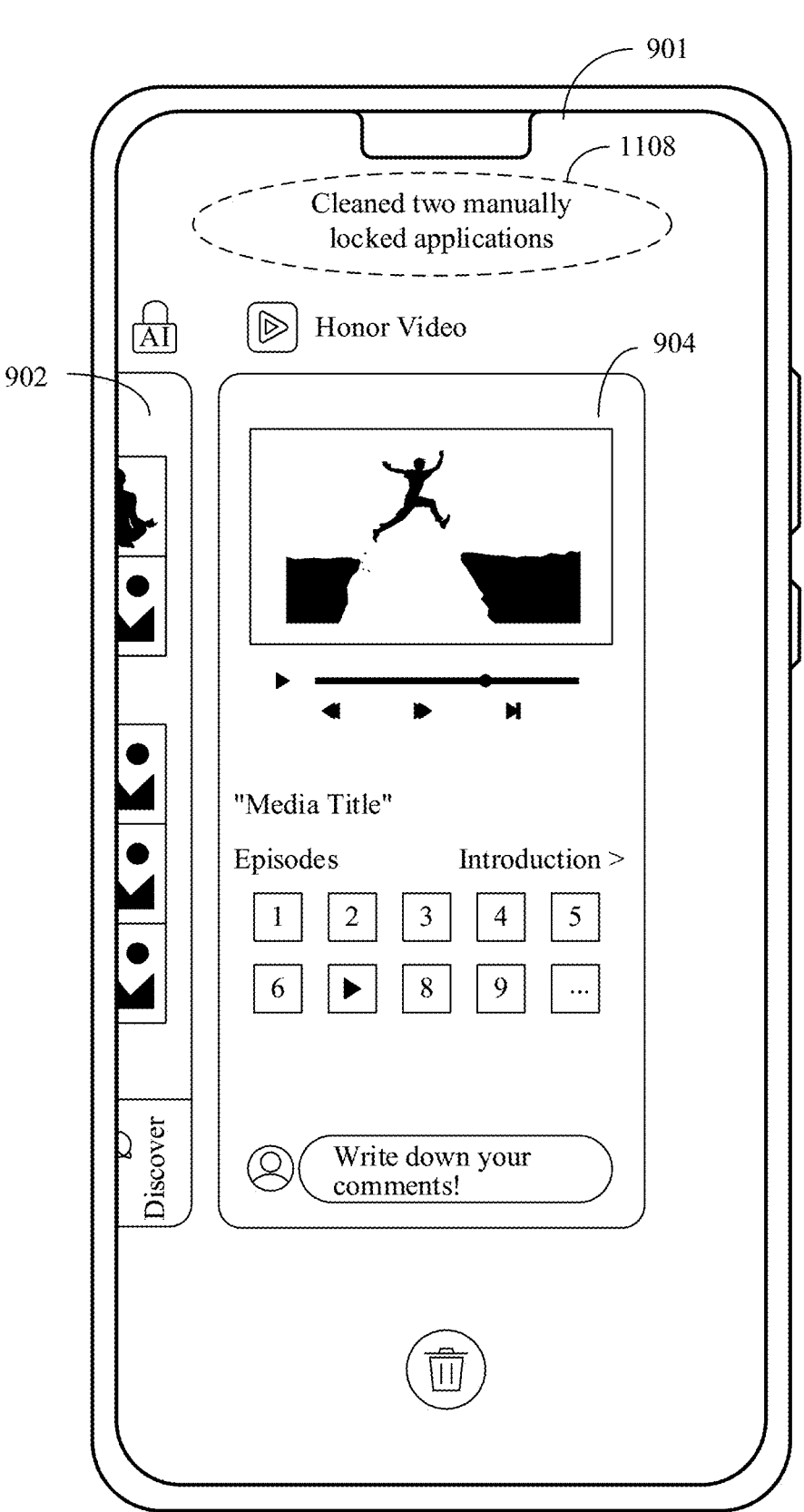
Figure 11D:
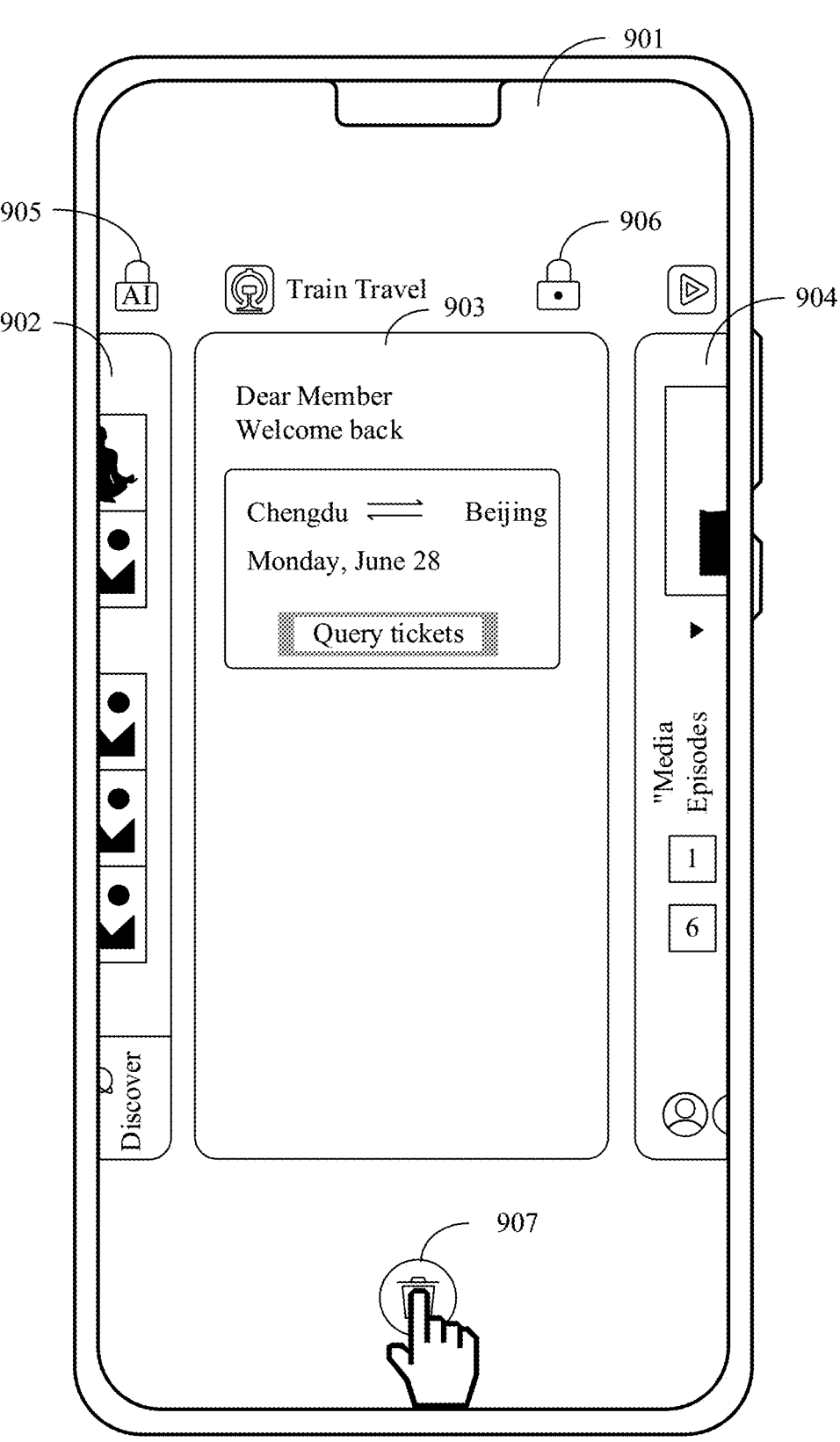
FIG. 11D(a) to FIG. 11D(c) are an interface switching diagram according to this application.
Figure 11D:
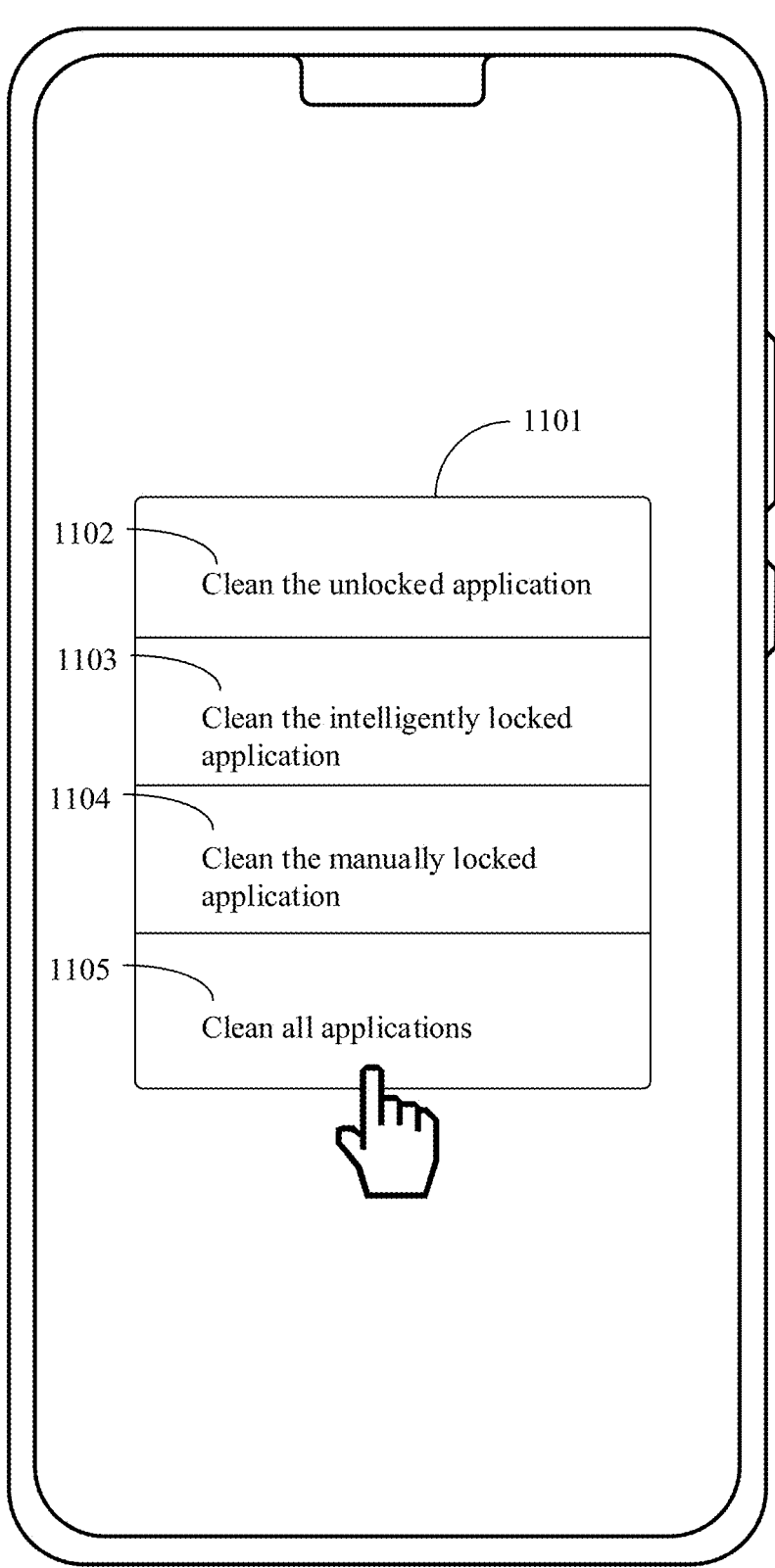
Figure 11D:
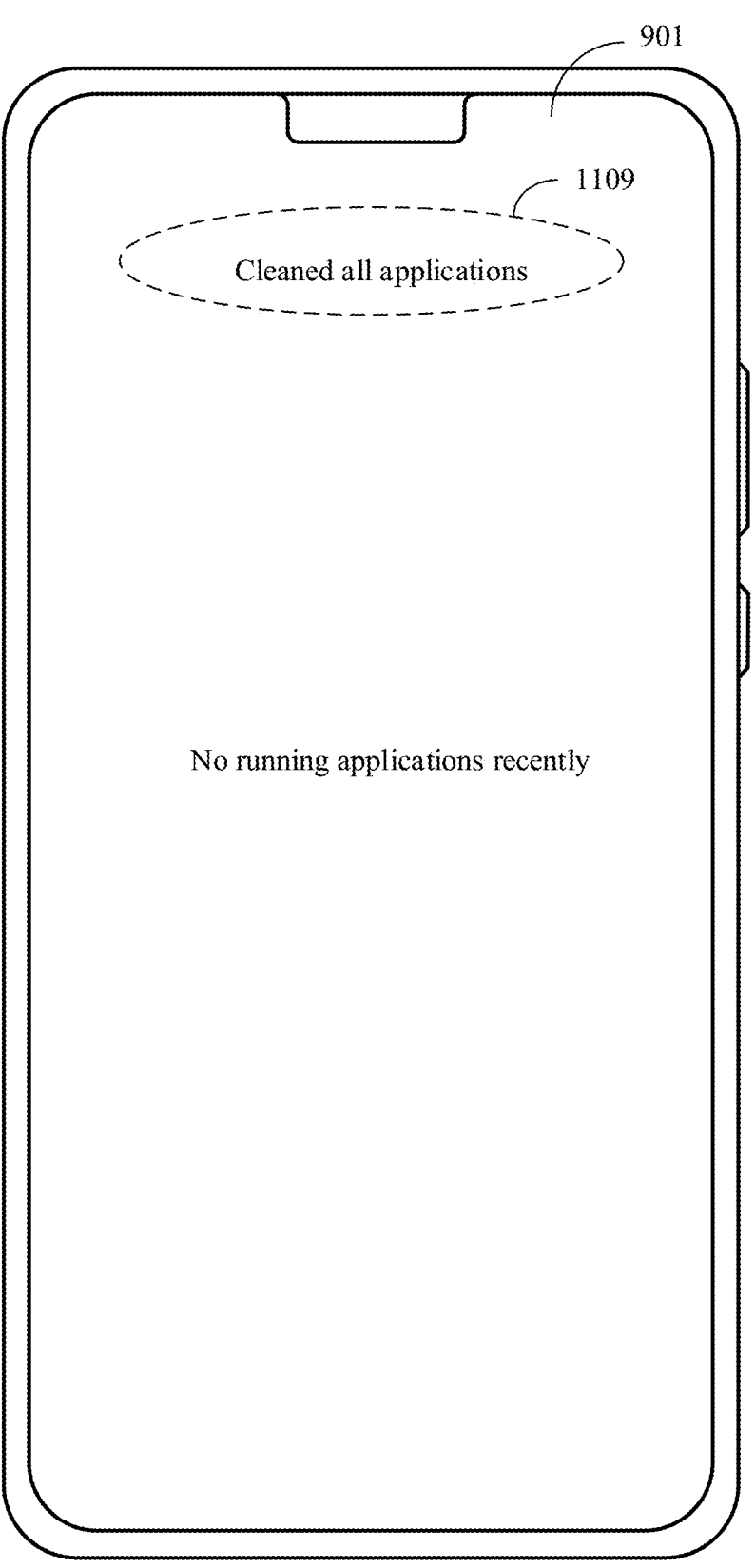

In the fourth manner, the mobile phone may clean some applications that the user wants to clean. In this case, the applications cleaned by the mobile phone are selected by the user according to actual requirements. For example, as shown in FIG. 11A(a) (for related descriptions of the recent task interface 901, refer to the text part of FIG. 9A(a) to FIG. 9A(d), and details are not described herein again), the mobile phone may receive an operation that the user touches and holds the cleaning icon 907. In response to the operation, the mobile phone displays a cleaning prompt box 1101. The cleaning prompt box 1101 is used to provide the user with a plurality of application cleaning options, for example, "Clean the unlocked application" 1102, "Clean the intelligently locked application" 1103, "Clean the manually locked application" 1104, and "Clean all applications" 1105. If the user wants to clean an unlocked application, the user may tap "Clean the unlocked application" 1102 shown in FIG. 11A(b). In response to the operation that the user taps "Clean the unlocked application" 1102, as shown in FIG. 11A(c), the mobile phone may clean the unlocked application (that is, the video application) and a corresponding preview interface, and display cleaning information 1106, the preview interface 902 of Gallery, the preview interface 903 of Train Travel, and the preview interface 909 of Calculator on the recent task interface 901. If the user wants to clean an application to which an intelligent lock is added, as shown in FIG. 11B(a) and FIG. 11B(b), the user may tap "Clean the intelligently locked application" 1103. In response to the operation that the user taps "Clean the intelligently locked application" 1103, as shown in FIG. 11B(c), the mobile phone may clean the application to which the intelligent lock is added (that is, Gallery) and a corresponding preview interface, and display the preview interface 903 of Train Travel, the preview interface 904 of the video application, the preview interface 909 of Calculator, and cleaning information 1107 on the recent task interface 901. If the user wants to clean an application to which a manual lock is added, as shown in FIG. 11C(a) and FIG. 11C(b), the user may tap "Clean the manually locked application" 1104. In response to the operation that the user taps "Clean the manually locked application" 1104, as shown in FIG. 11C(c), the mobile phone may clean the application to which the manual lock is added (that is, Train Travel and Calculator) and a corresponding preview interface, and may display the preview interface 902 of Gallery, the preview interface 904 of the video application, and cleaning information 1108 on the recent task interface 901. If the user wants to clean all applications, as shown in FIG. 11D(a) and FIG. 11D(b), the user may tap "Clean all applications" 1105. In response to the operation that the user taps "Clean all applications" 1105, as shown in FIG. 11D(c), the mobile phone may clean all recently running applications (that is, Gallery, Train Travel, the video application, and Calculator) and corresponding preview interfaces, and display cleaning information 1109 on the recent task interface 901.

In an optional design, the mobile phone may alternatively receive an operation that the user slides up a preview interface on the recent task interface. In response to the operation, the mobile phone cleans the preview interface and a corresponding application. For example, when the user wants to clean Train Travel, the user may slide up the preview interface of Train Travel (not shown in the figure).

Figure 12A:
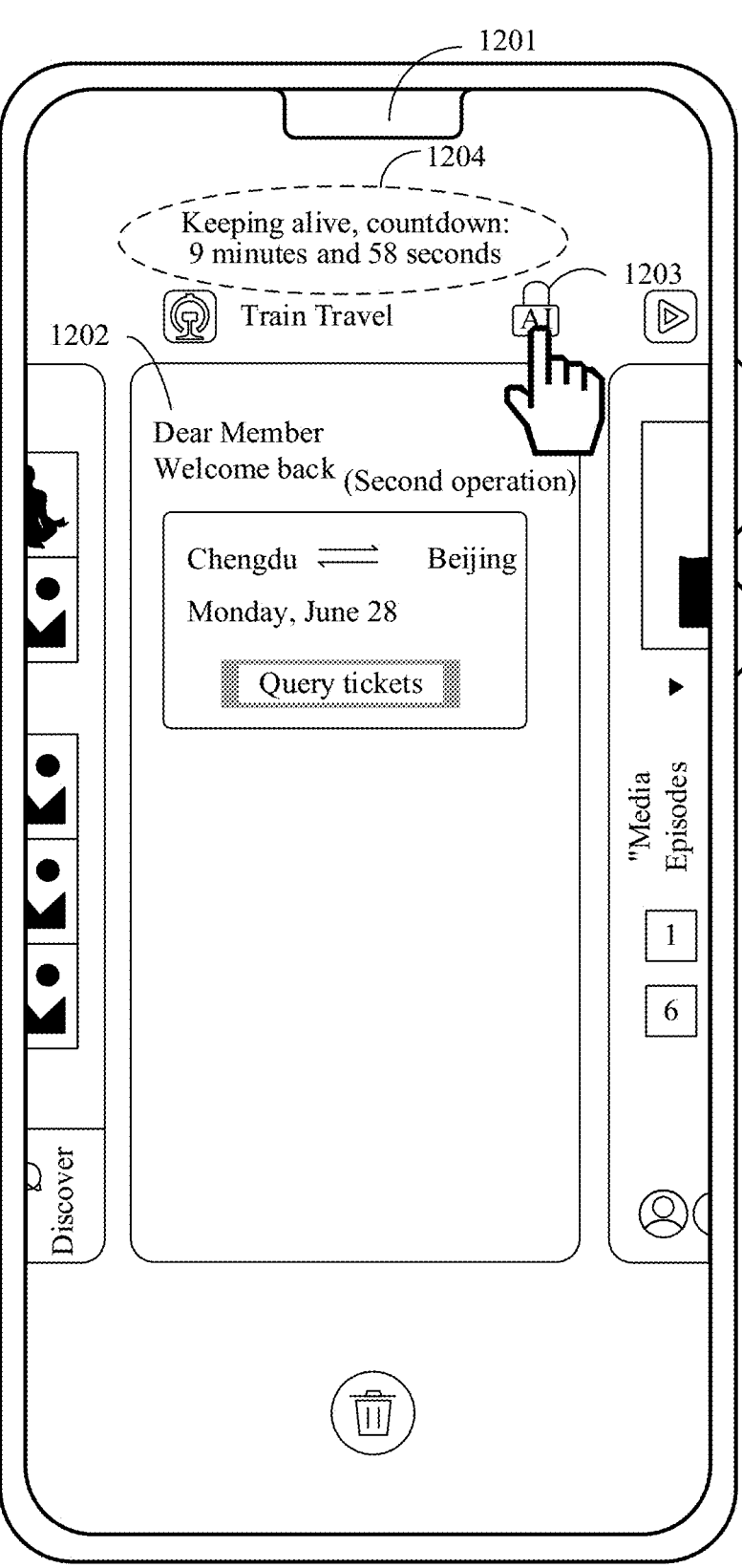
FIG. 12(A) and FIG. 12(B) are an interface switching diagram according to this application.
Figure 12B:
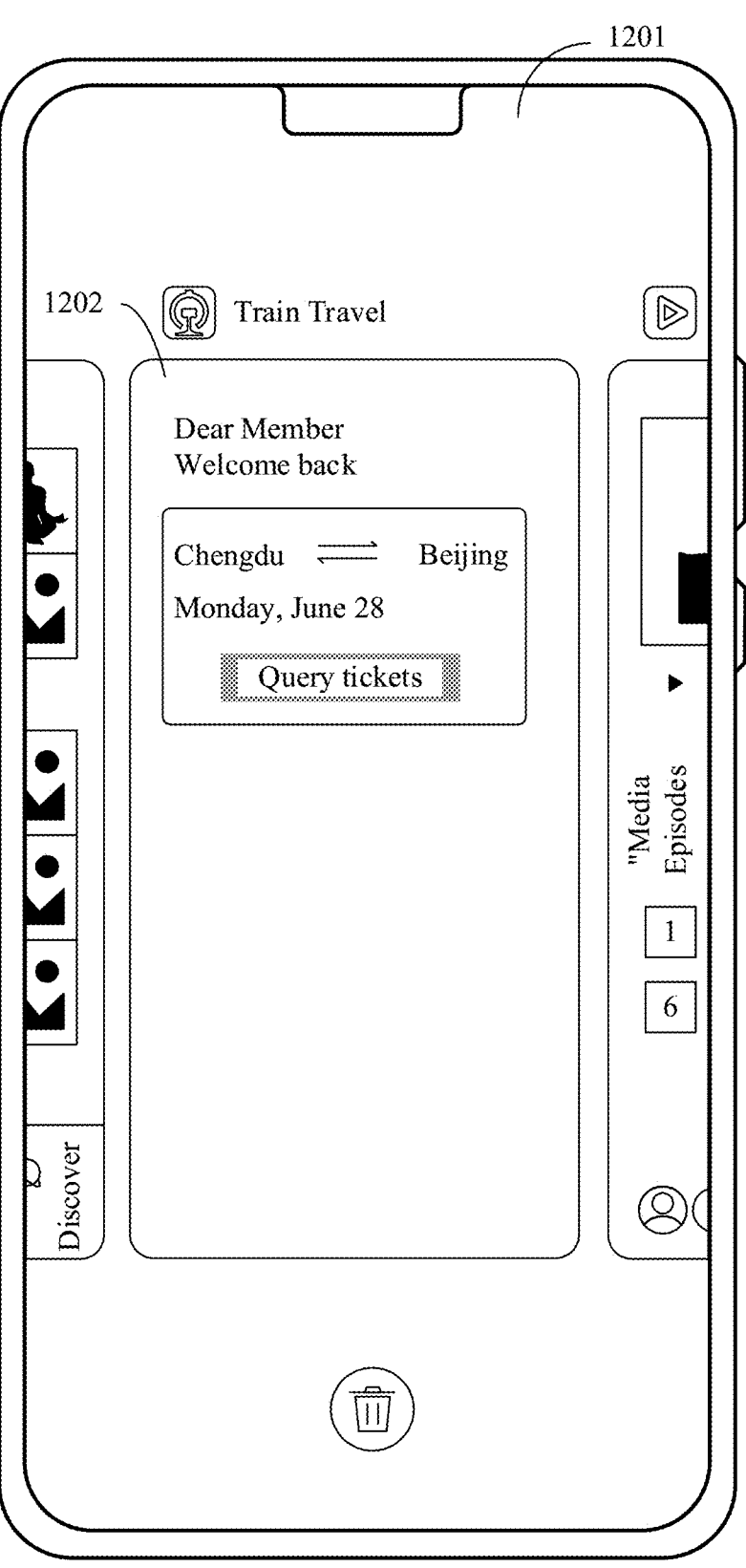

The application is locked (intelligently locked or manually locked), and the user may unlock the application. In a design, as shown in FIG. 12(A), the mobile phone may display a recent task interface 1201, where the recent task interface 1201 includes a preview interface 1202 of Train Travel. The mobile phone may further display a first lock icon 1203 and status information 1204 on the preview interface 1202 of Train Travel. The first lock icon 1203 is used to indicate that an intelligent lock is added to Train Travel, and the status information 1204 is used to indicate that Train Travel is in a keep-alive state and remaining keep-alive duration is 9 minutes 58 seconds. The mobile phone may receive a second operation of the user (for example, an operation of tapping the first lock icon 1203). In response to the operation, the mobile phone unlocks locked Train Travel. After the mobile phone unlocks Train Travel, as shown in FIG. 12(B), the mobile phone may hide the first lock icon 1203 and the status information 1204, so as to indicate that Train Travel is not in a keep-alive state.

Figure 13A:
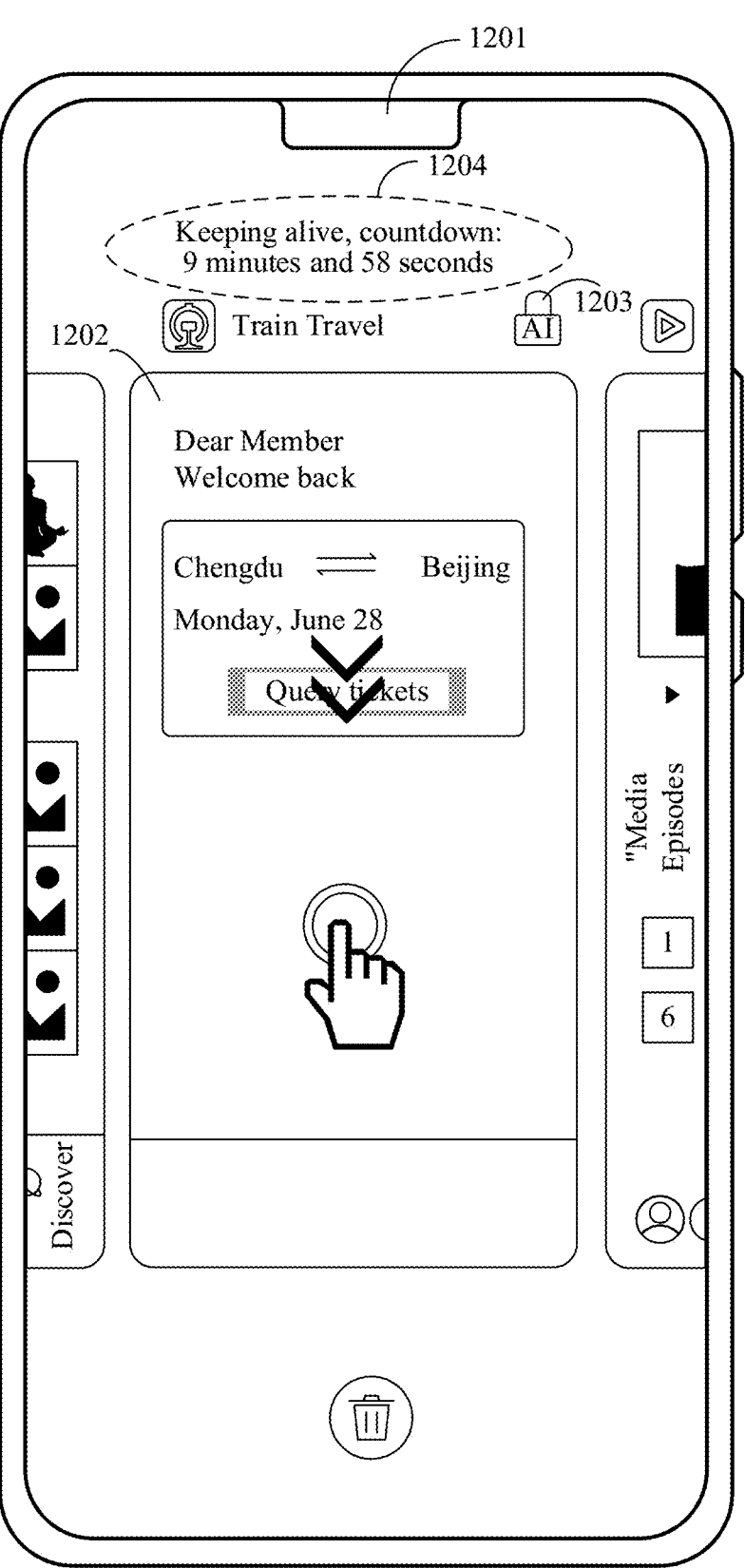
FIG. 13(A) and FIG. 13(B) are an interface switching diagram according to this application.
Figure 13B:
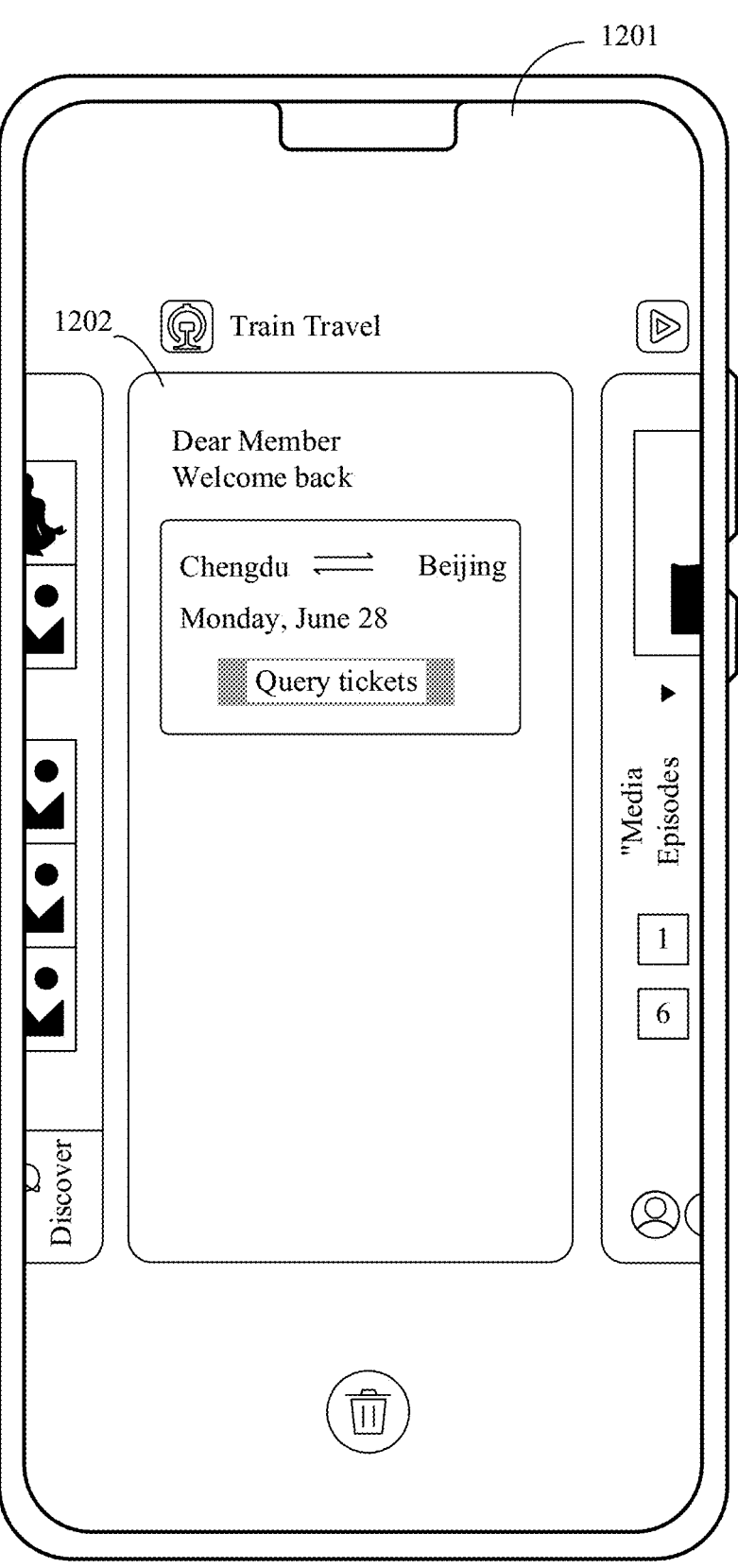

In another design, as shown in FIG. 13(A), the mobile phone may alternatively receive an operation that the user pulls down the preview interface 1202 (corresponding to Train Travel). In response to the operation, the mobile phone unlocks locked Train Travel, and hides the original first lock icon 1203 and status information 1204 on the recent task interface 1201 (as shown in FIG. 13(B)).

It should be noted that, in FIG. 12(A) and FIG. 12(B), and FIG. 13(A) and FIG. 13(B), only an example of unlocking an intelligent lock is used to describe a process in which the user unlocks an application to which an intelligent lock is added. Because the process in which the user unlocks an application to which an intelligent lock is added is the same as a process in which the user unlocks an application to which a manual lock is added, for the process in which the user unlocks an application to which a manual lock is added, refer to FIG. 12(A) and FIG. 12(B), FIG. 13(A) and FIG. 13(B), and related text. Details are not described herein again.

Figure 14A:
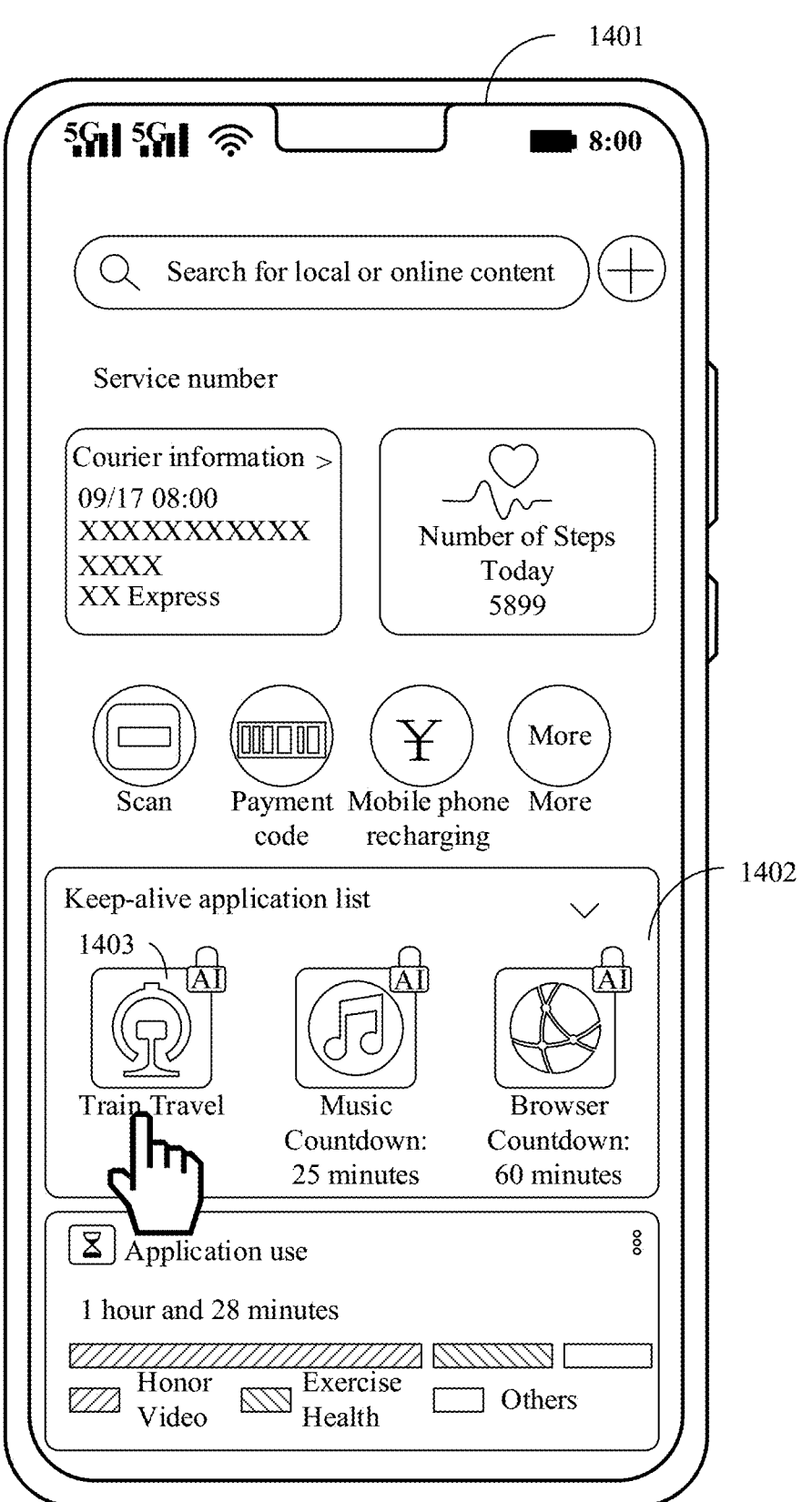
FIG. 14(A) to FIG. 14(D) are an interface switching diagram according to this application.

In this embodiment of this application, the mobile phone may further display a list of intelligently locked applications on a leftmost home screen. The list of intelligently locked applications includes a plurality of applications to which intelligent locks are added (that is, intelligently locked applications). For example, as shown in FIG. 14(A), the mobile phone may display a leftmost home screen 1401, where the leftmost home screen 1401 includes a keep-alive application list 1402. The keep-alive application list 1402 is used to display an application icon, keep-alive duration, and a lock identifier of an intelligently locked application. For example, the keep-alive application list 1402 may include an icon 1403 of Train Travel, an icon of Music, and an icon of Browser. Remaining keep-alive duration of Music is 25 minutes, and remaining keep-alive duration of Browser is 60 minutes.

Figure 14B:
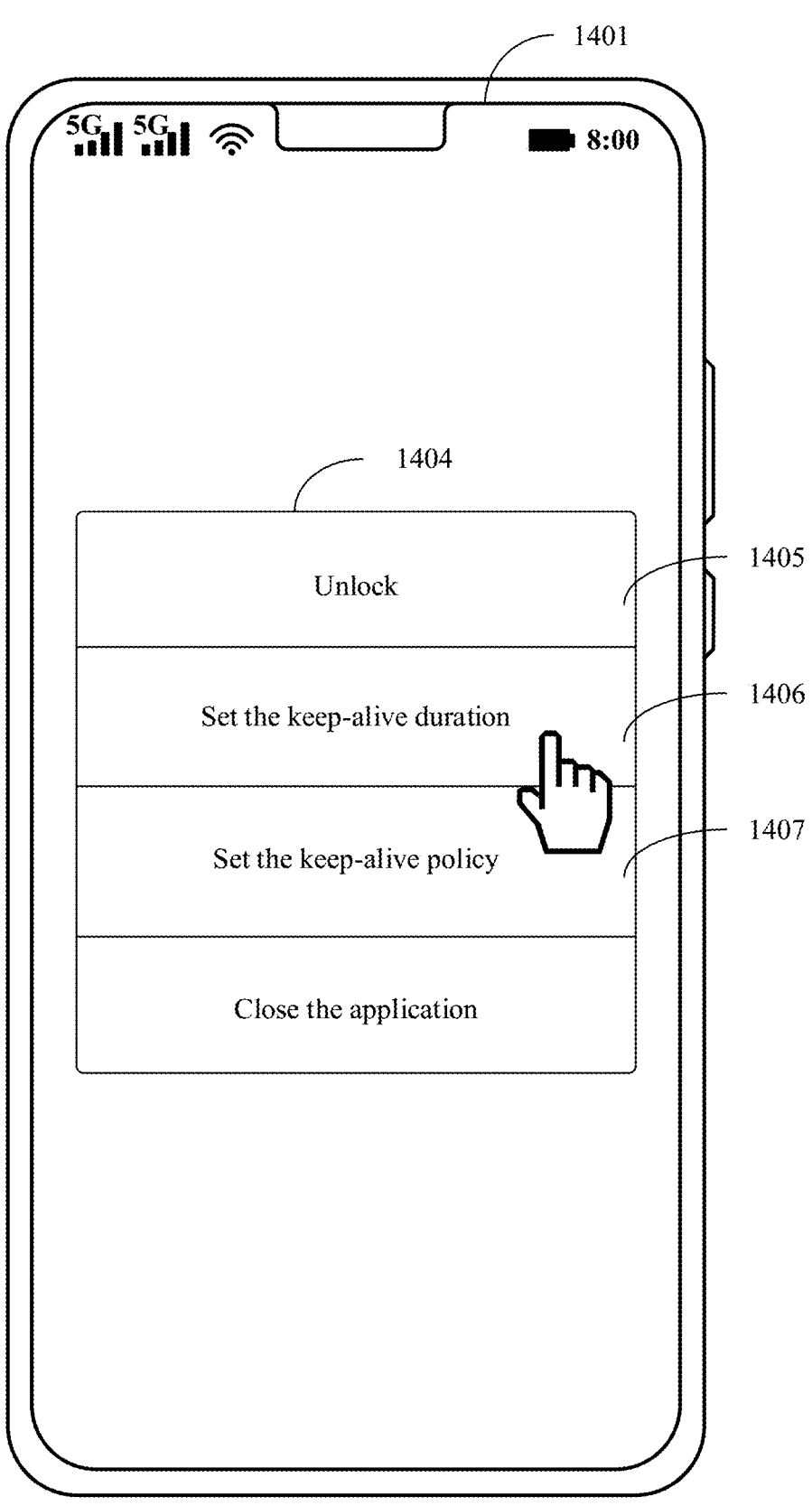
Figure 14C:
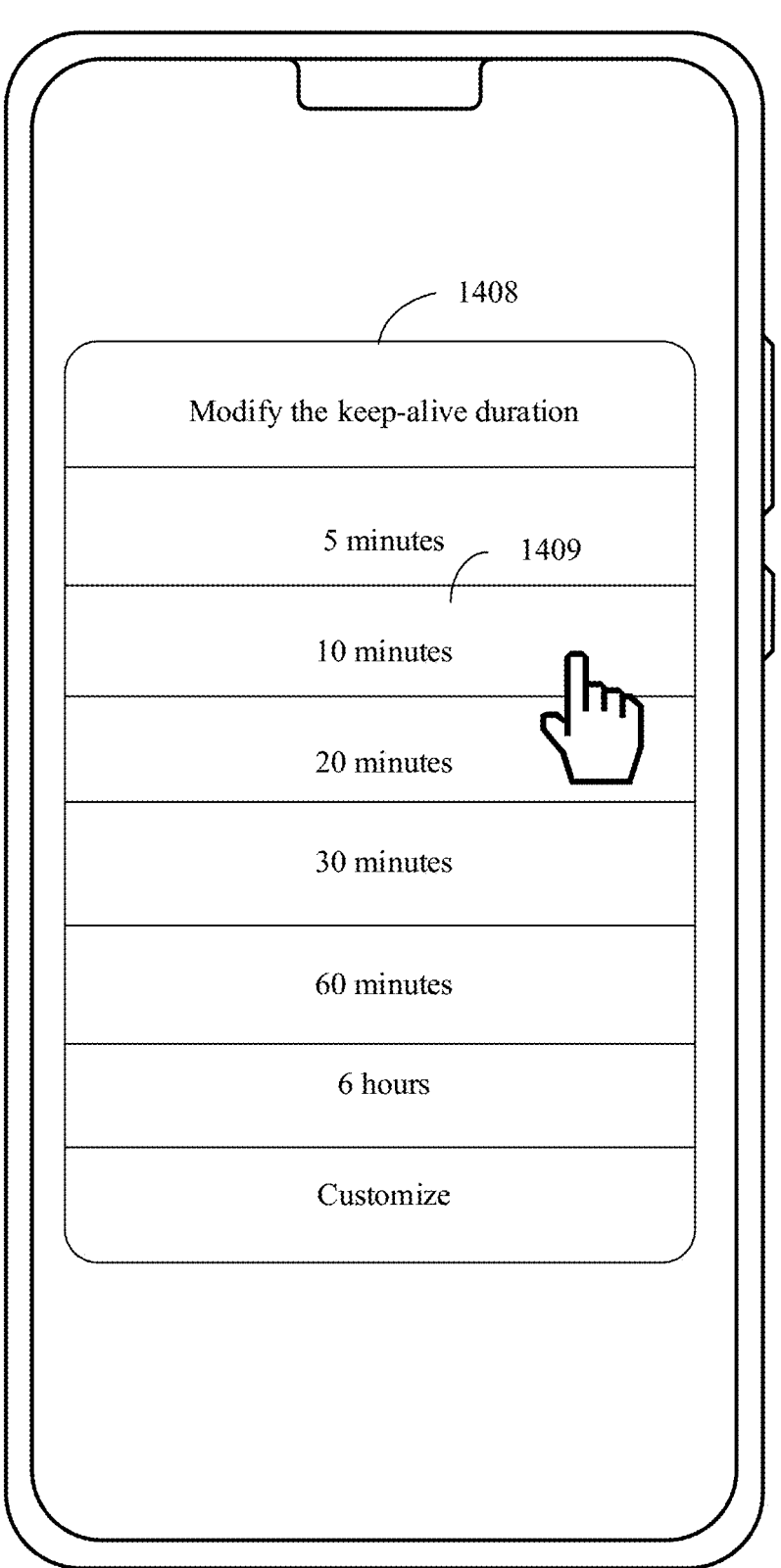
Figure 14D:
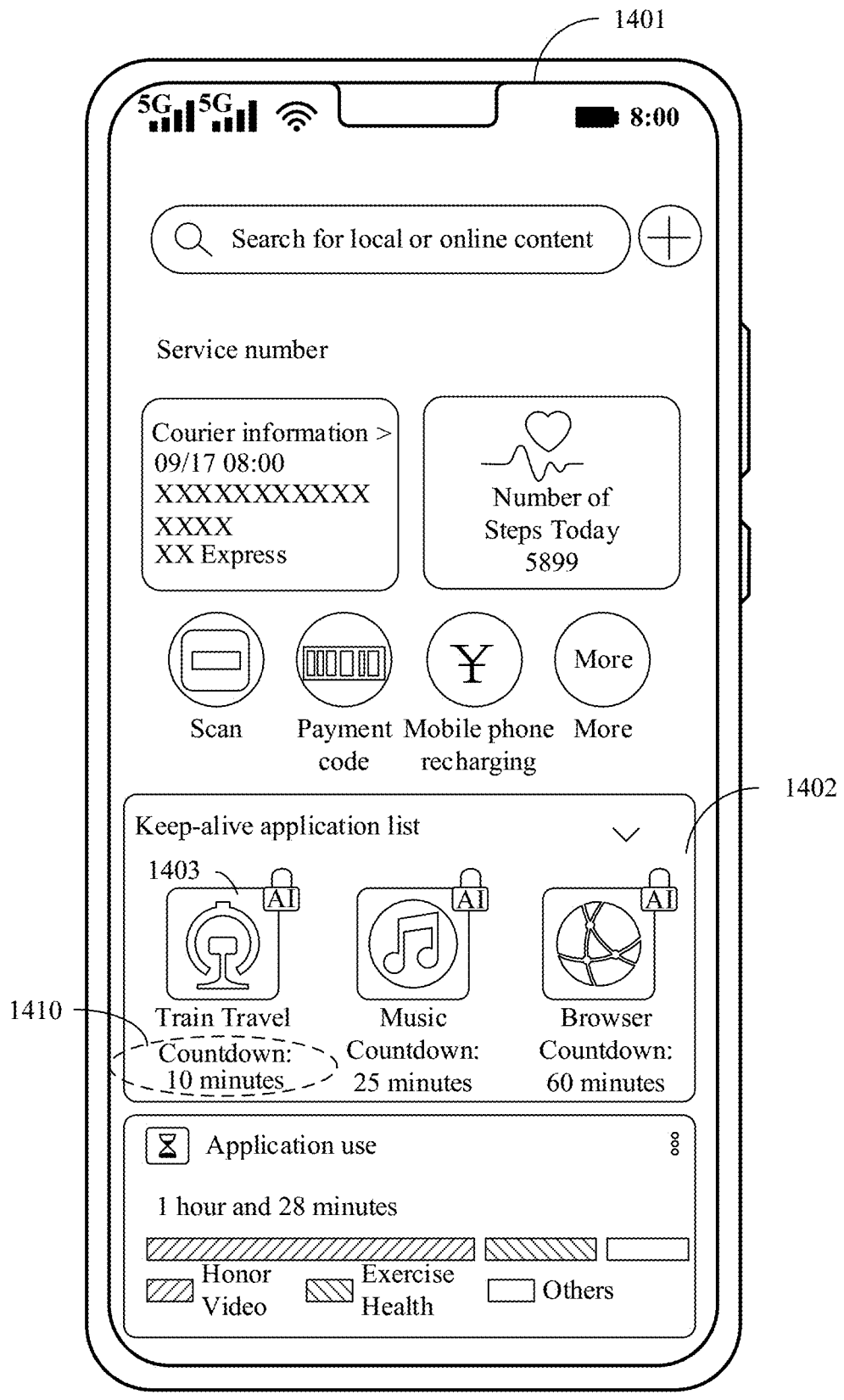
Figure 15A:
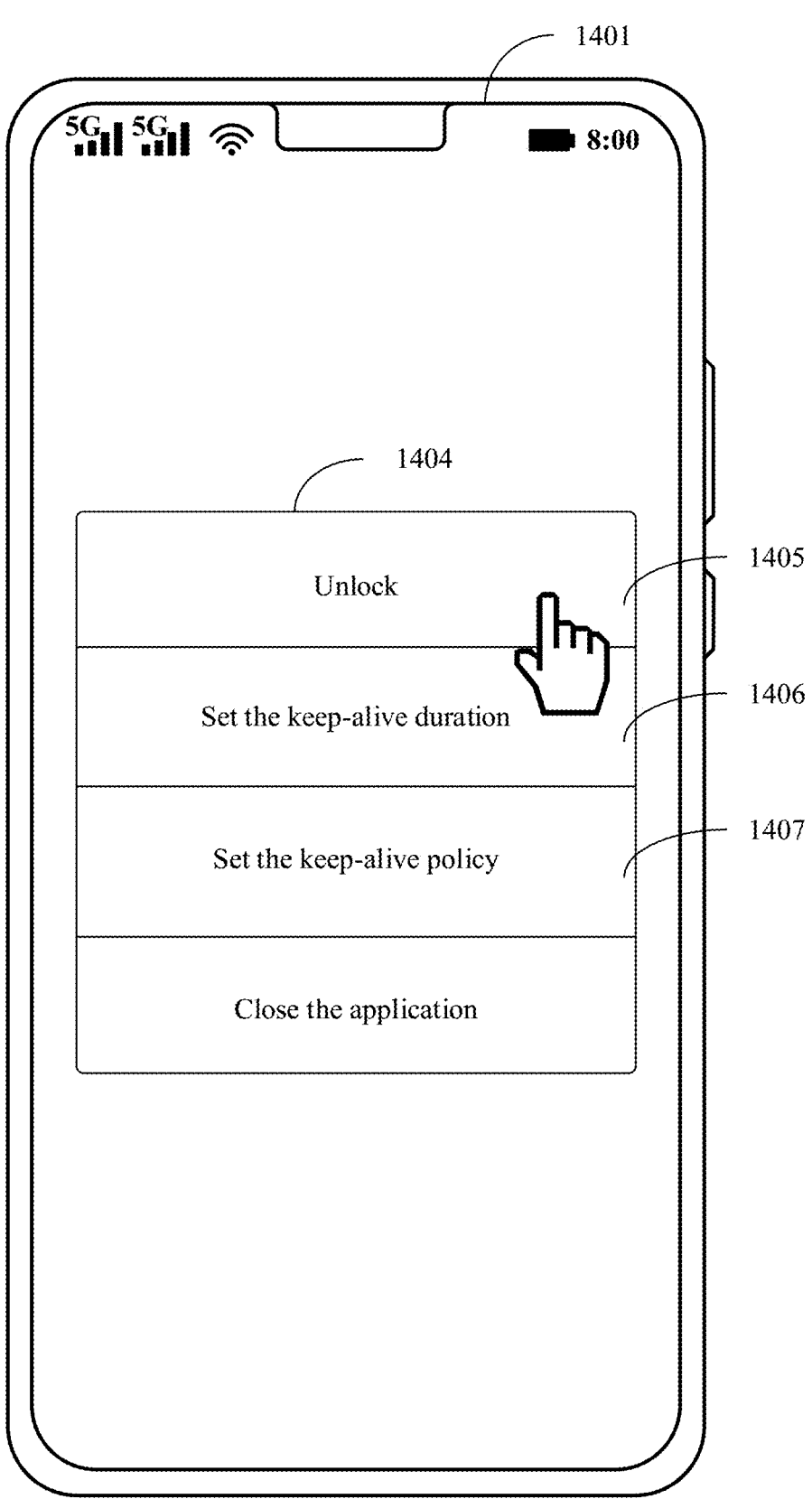
FIG. 15(A) and FIG. 15(B) are an interface switching diagram according to this application.
Figure 15B:
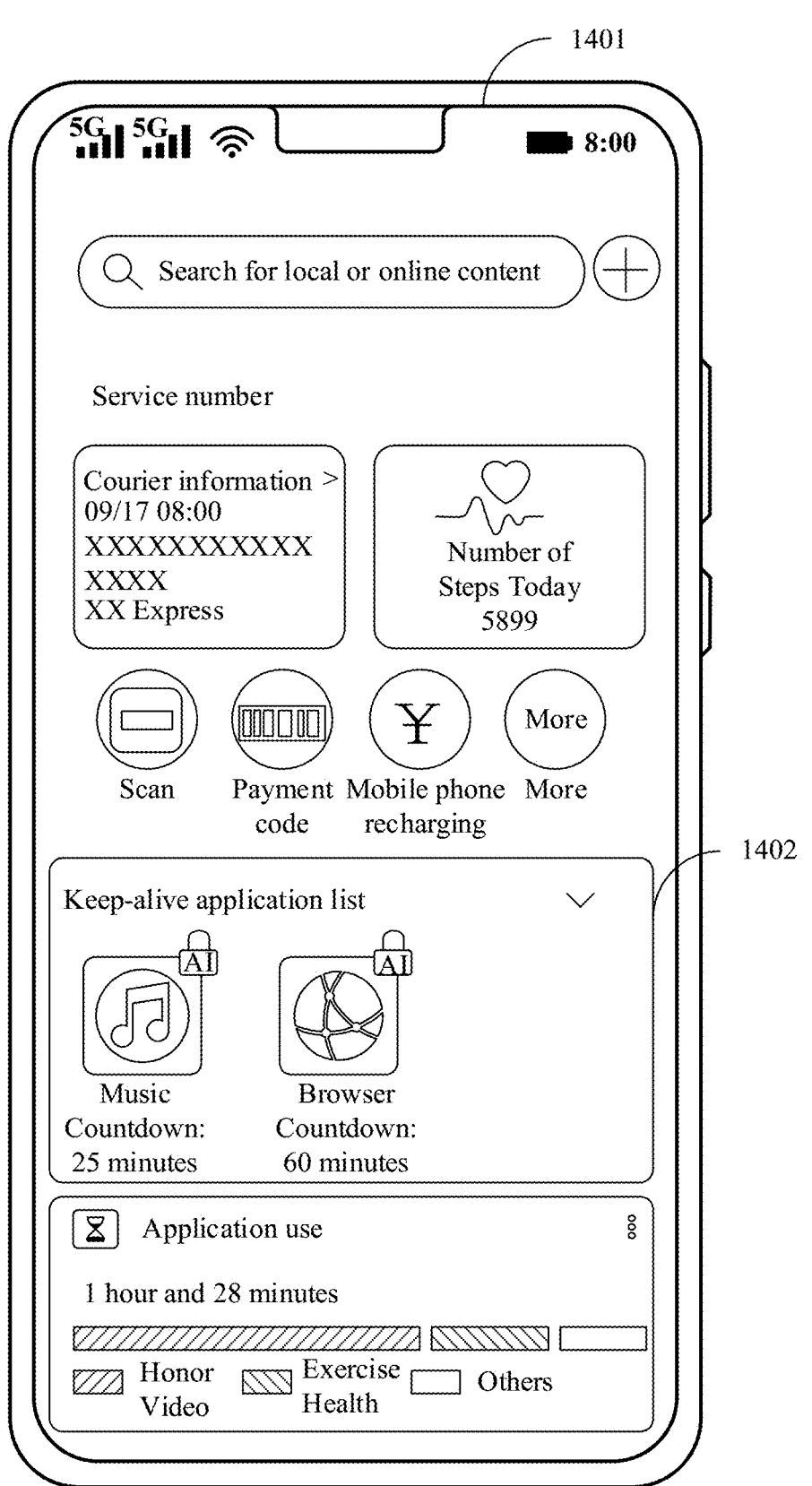

The user may manage an application in the keep-alive application list 1402, for example, unlock, change keep-alive duration, and set a keep-alive policy. For example, if the user wants to change keep-alive duration of Train Travel, the user may initiate a second operation on the icon 1403 of Train Travel (that is, an operation of touching and holding the icon 1403 of Train Travel). In response to the operation that the user touches and holds the icon 1403, the mobile phone may display a setting block 1404 shown in FIG. 14(B). The setting box 1404 may include an "Unlock" option 1405, a "Set the keep-alive duration" option 1406, a "Set the keep-alive policy" option 1407, a "Close the application" option, and the like. The mobile phone may receive an operation that the user taps the "Set the keep-alive duration" option 1406. In response to the operation, as shown in FIG. 14(C), the mobile phone may display a keep-alive duration setting interface 1408. The keep-alive duration setting interface 1408 is configured to provide the user with a plurality of keep-alive duration setting options, for example, "5 minutes", "10 minutes" 1409, "20 minutes", and "Customize". After receiving an operation that the user selects to set keep-alive duration, the mobile phone may set the keep-alive duration of Train Travel based on the time selected by the user. For example, if the user wants to set the keep-alive duration of Train Travel to 10 minutes, the user may tap "10 minutes" 1409. In response to the operation that the user taps "10 minutes" 1409, the mobile phone may set the keep-alive duration of Train Travel to 10 minutes. As shown in FIG. 14(D), the mobile phone may further display keep-alive duration 1410 (that is, countdown: 10 minutes) of Train Travel in the keep-alive application list 1402. If the user wants to unlock the intelligent lock of Train Travel, as shown in FIG. 15(A), the user may tap the "Unlock" option 1405. In response to the operation that the user taps the "Unlock" option 1405, the mobile phone may unlock Train Travel. In addition, as shown in FIG. 15(B), the mobile phone hides the icon of Train Travel in the keep-alive application list 1402. If the user wants to set a keep-alive policy of Train Travel, the user may tap the "Set the keep-alive policy" option 1407. In response to the operation, the mobile phone may display a keep-alive policy setting page (for example, the interface 212 shown in FIG. 2B(b)). A principle and an interface thereof are similar to the principle and the interface of the foregoing keep-alive policy setting, and details are not described herein again. If the user wants to directly close Train Travel, the user may tap the "Close the application". In response to the operation that the user taps the "Close the application", the mobile phone may directly close Train Travel, and the mobile phone hides the icon of Train Travel in the keep-alive application list 1402.

It should be noted that the mobile phone may further receive an operation that the user taps the icon of Train Travel, and the mobile phone may display an interface of Train Travel in response to the operation. In other words, the user may tap an application icon in the keep-alive application list, to open an application interface corresponding to the application icon.

Figure 16A:
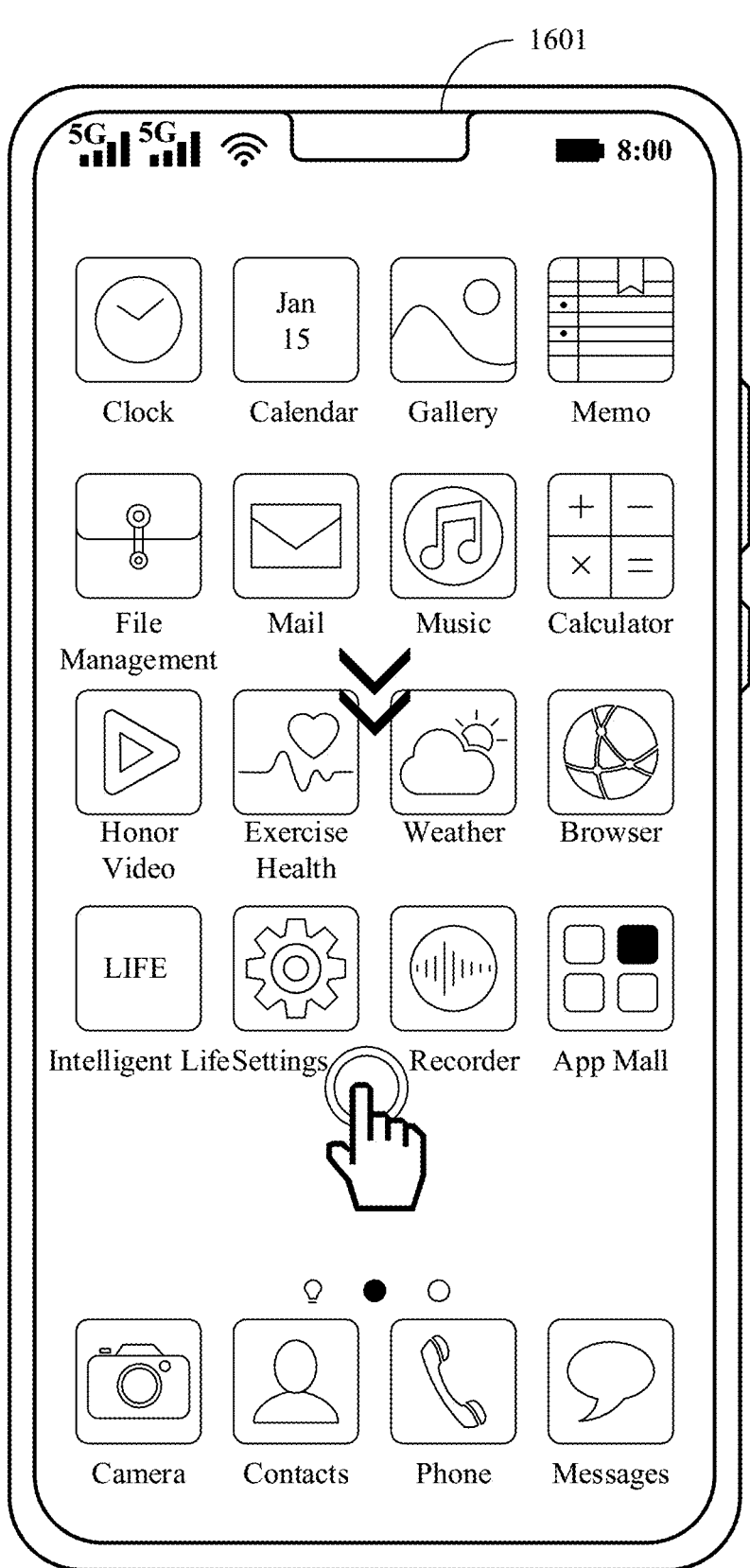
FIG. 16(A) and FIG. 16(B) are an interface switching diagram according to this application.
Figure 16B:
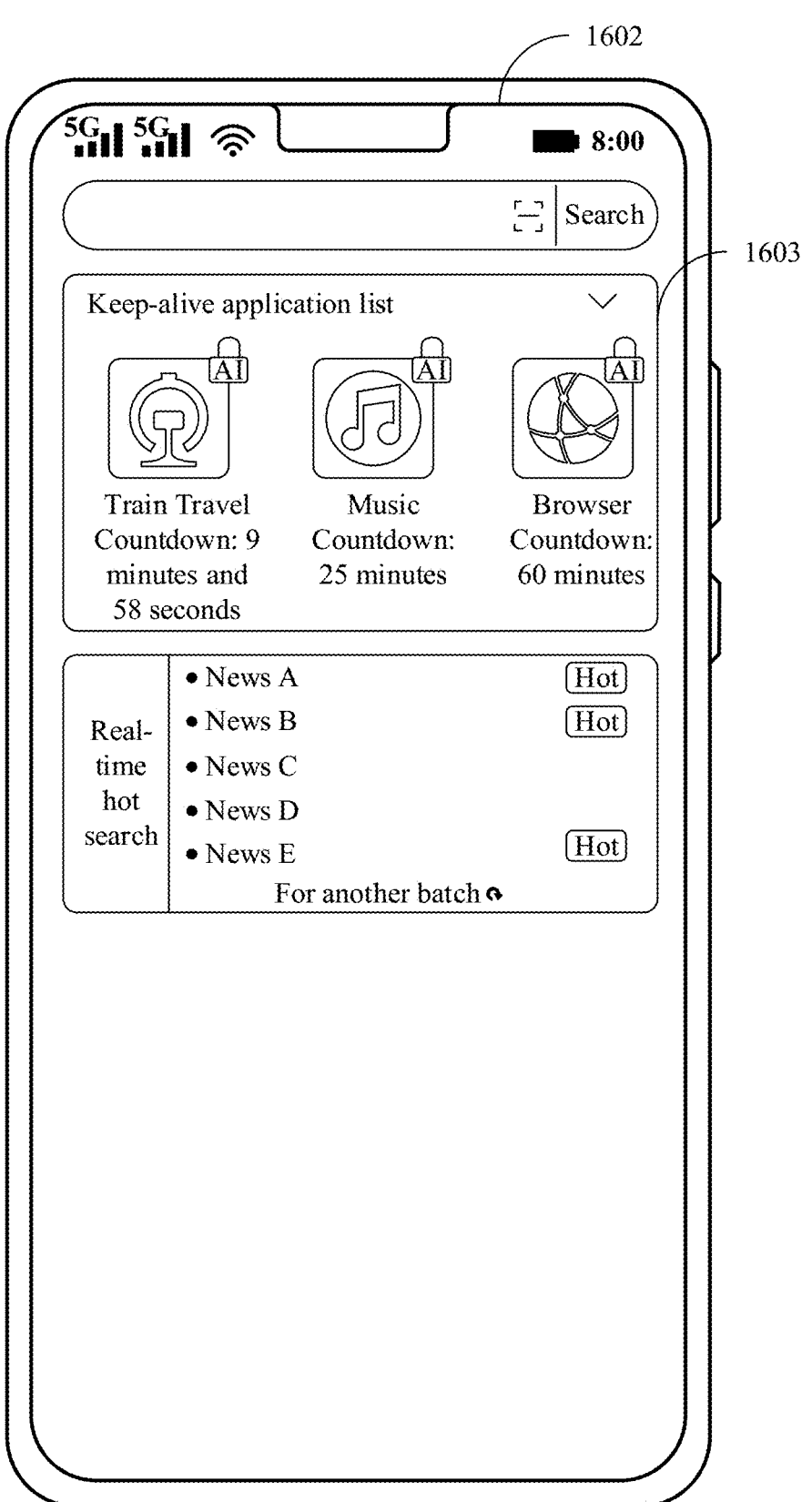

In this embodiment of this application, the mobile phone may further display a list of intelligently locked applications on a global search interface. For example, as shown in FIG. 16(A), the mobile phone may display a home screen 1601. The mobile phone may receive an operation that the user pulls down the home screen 1601. In response to the operation, as shown in FIG. 16(B), the mobile phone may display a global search interface 1602. The global search interface 1602 includes a keep-alive application list 1603. The keep-alive application list 1603 is used to display an application icon and keep-alive duration of an intelligently locked application. For example, the keep-alive application list 1603 may include an icon of Train Travel, an icon of Music, and an icon of Browser. Remaining keep-alive duration of Music is 25 minutes, and remaining keep-alive duration of Browser is 60 minutes.

Figure 17A:
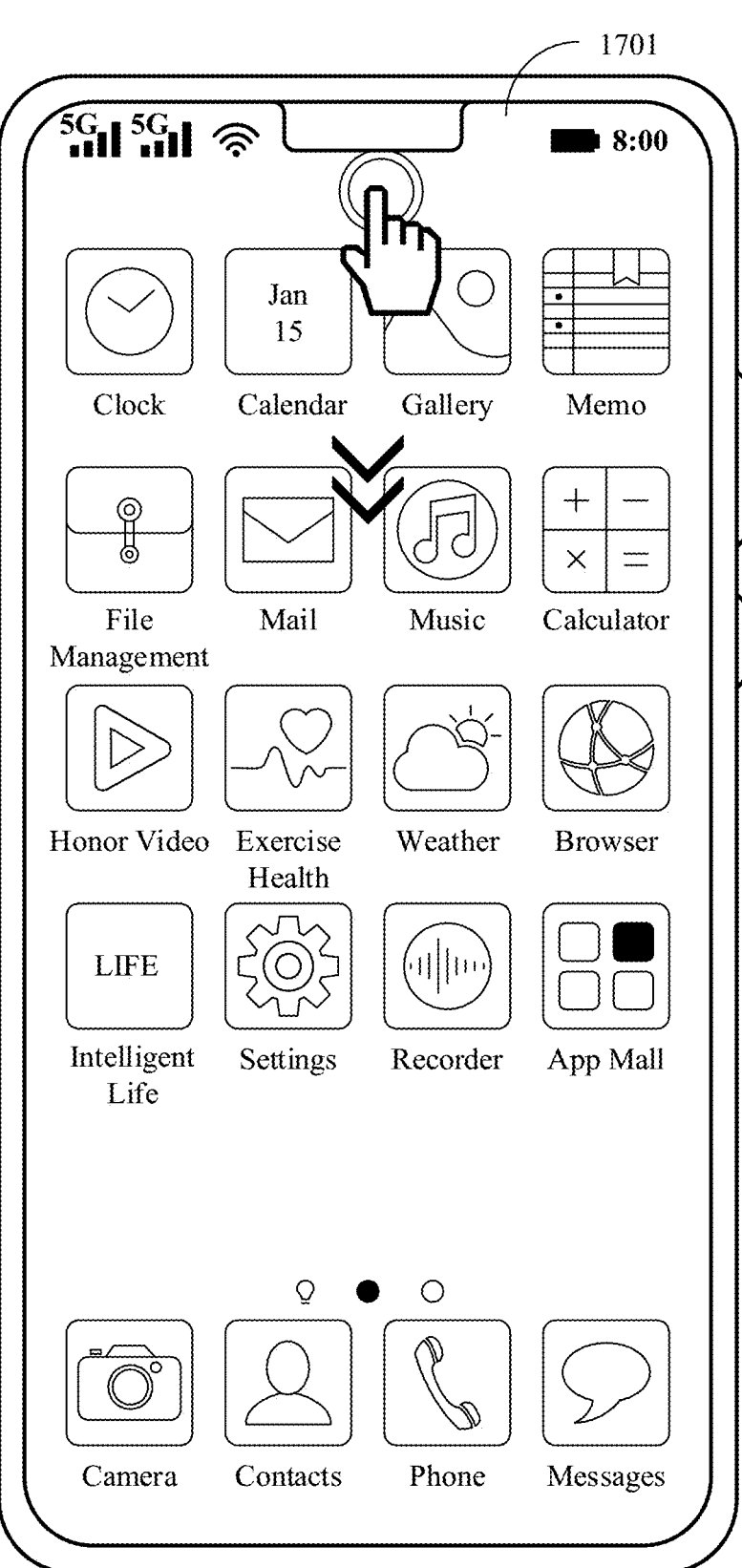
FIG. 17(A) and FIG. 17(B) are an interface switching diagram according to this application.
Figure 17B:
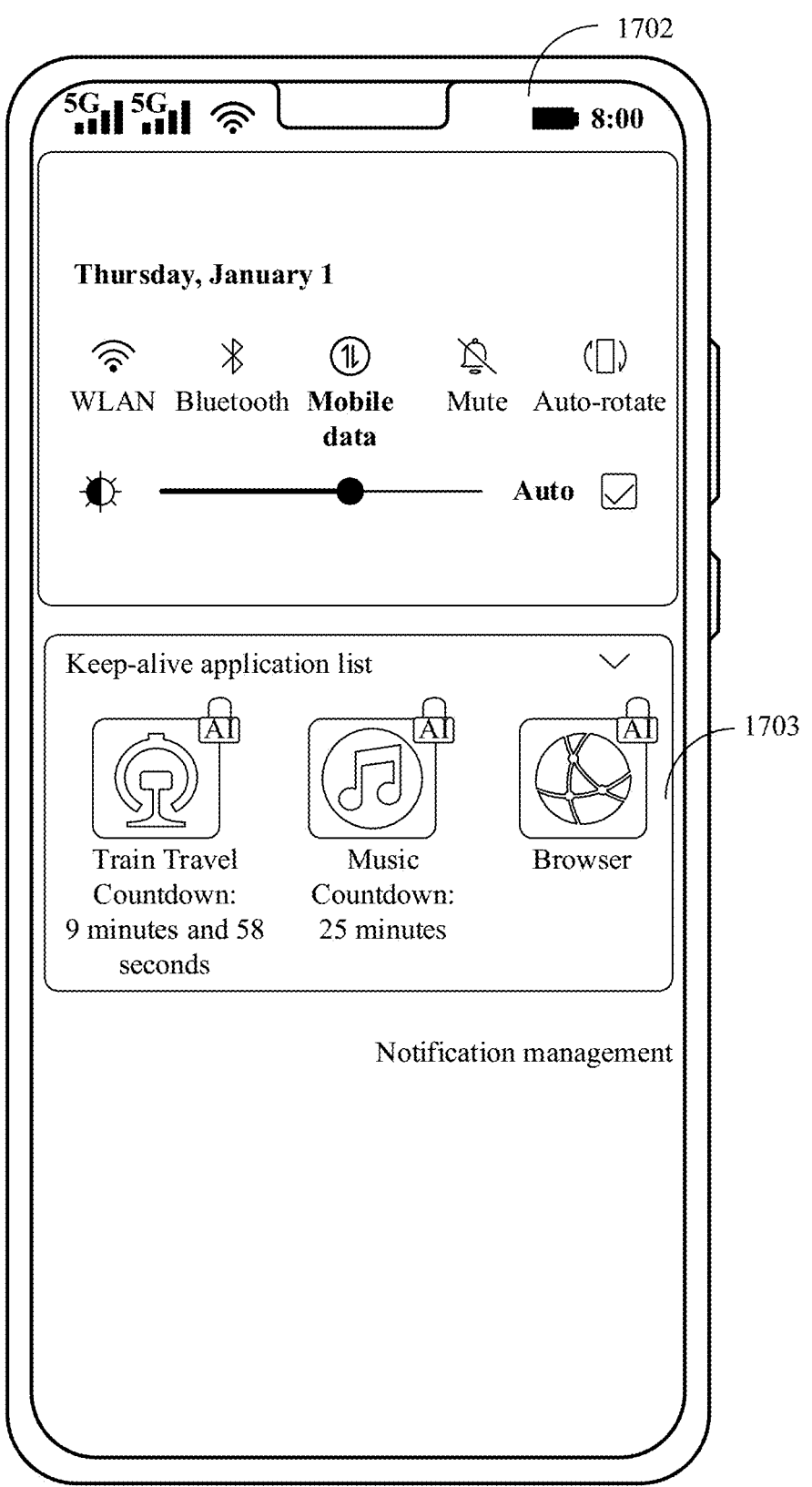

In this embodiment of this application, the mobile phone may alternatively display a list of intelligently locked applications in a pull-down menu bar. For example, as shown in FIG. 17(A), the mobile phone may display a home screen 1701. The mobile phone may receive an operation that the user pulls down the top of the screen. In response to the operation, the mobile phone may display a pull-down menu bar 1702 shown in FIG. 17(B). The pull-down menu bar 1702 includes a keep-alive application list 1703. The keep-alive application list 1703 is used to display an application icon and keep-alive duration of an intelligently locked application.

It should be noted that, on the global search interface and the pull-down menu bar, the user may also manage an application in the keep-alive application list. A management method and a specific interface thereof may be similar to the process of managing an application in the keep-alive application list 1402. Therefore, for specific content, refer to the foregoing content, FIG. 14(A)-FIG. 15(B). Details are not described herein again.

In an optional implementation, when the mobile phone displays related information of an intelligently locked application in a keep-alive application list (the keep-alive application list 1402 or the keep-alive application list 1603), the mobile phone may not add a first lock icon (for example, the first lock icon 205 or the first lock icon 603) to the intelligently locked application on the recent task interface.

In an optional implementation, when the mobile phone displays related information of an intelligently locked application in a keep-alive application list (the keep-alive application list 1402 or the keep-alive application list 1603), the mobile phone may simultaneously add a first lock icon (for example, the first lock icon 205 or the first lock icon 603) to the intelligently locked application on the recent task interface.

Figure 18:
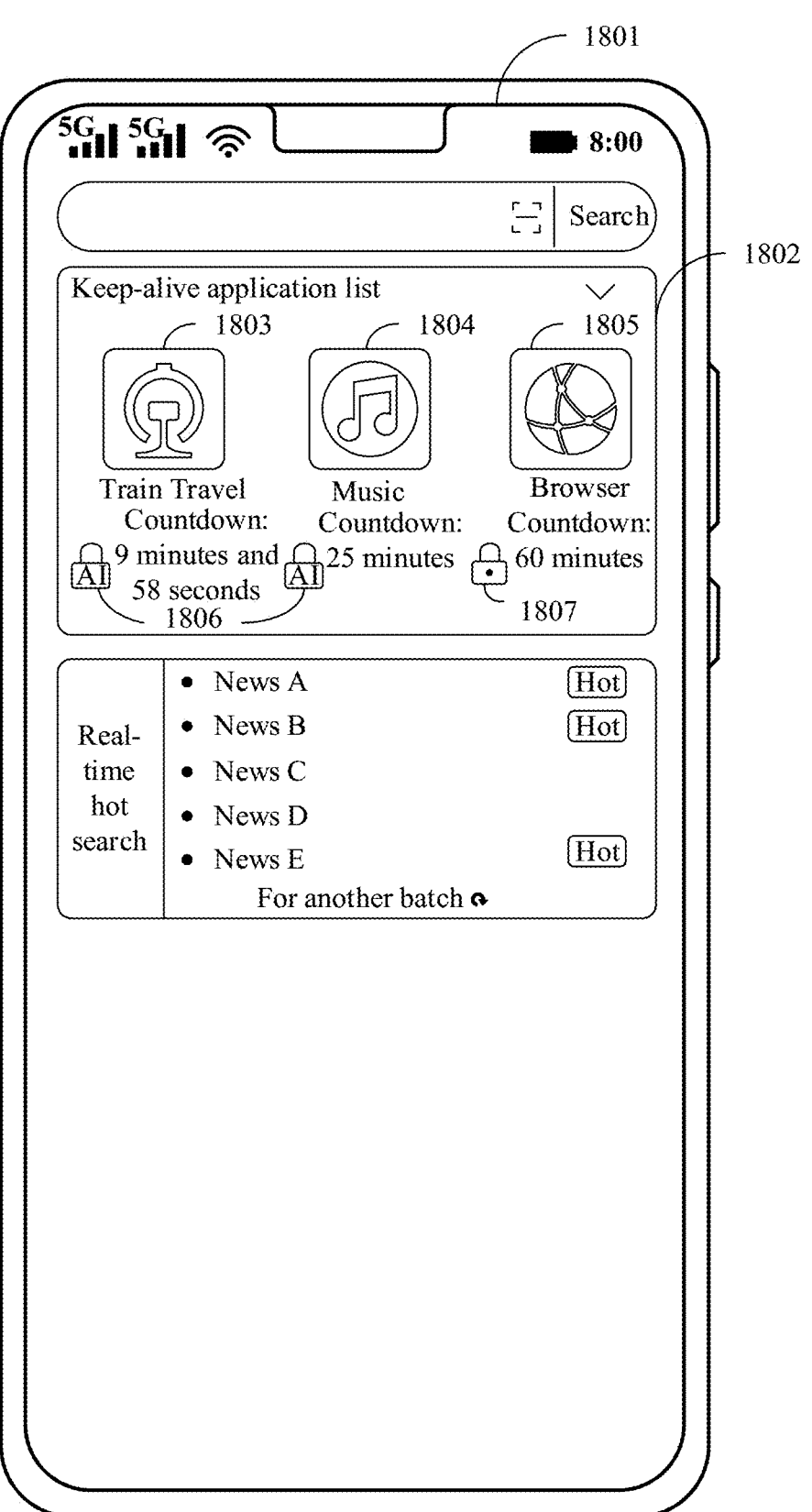
FIG. 18 is an interface diagram according to this application.

In an optional implementation, the mobile phone may display related information of an intelligently locked application and related information of a manually locked application in a keep-alive application list (the keep-alive application list 1402 or the keep-alive application list 1603). For example, as shown in FIG. 18, the mobile phone may display a global search interface 1801. The global search interface 1801 includes a keep-alive application list 1802. The keep-alive application list 1802 includes an icon 1803 of Train Travel, an icon 1804 of Music, an icon 1805 of Browser, two first lock icons 1806 respectively used to identify Train Travel and Music, and a second lock icon 1807 used to identify Browser. The two first lock icons 1806 are respectively used to identify that intelligent locks are added by the mobile phone to Train Travel and Music, and the second lock icon 1807 is used to identify that a manual lock is added by the mobile phone to Browser. It should be noted that locations of the first lock icon 1806 and the second lock icon 1807 may be not limited to those shown in FIG. 18, but may be any other locations for ease of application identification (for example, an upper-right corner or an upper-left corner of an application icon).

This application provides an application keep-alive method and an electronic device. The electronic device may automatically lock a first application in a plurality of recently used applications, and then the first application is in a keep-alive state, so that the first application is prevented from being automatically closed by the electronic device, and therefore continues to serve the user.

Figure 19:
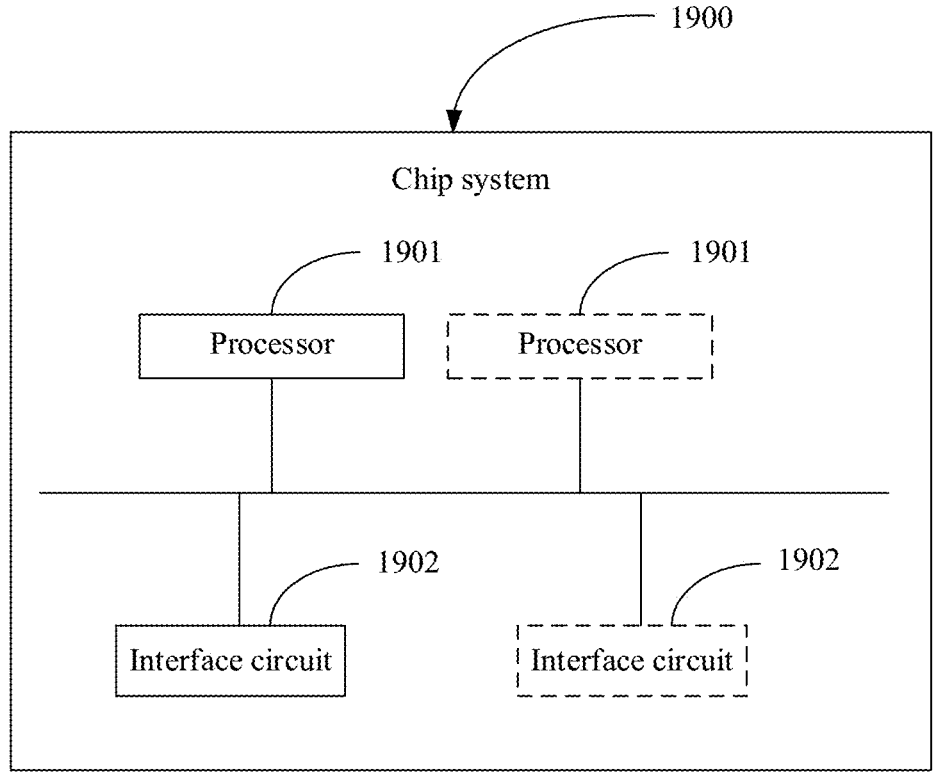
FIG. 19 is a schematic diagram of a structure of a chip system according to an embodiment of this application.

This application further provides a chip system 1900. As shown in FIG. 19, the chip system 1900 includes at least one processor 1901 and at least one interface circuit 1902. The processor 1901 and the interface circuit 1902 may be connected through a line. For example, the interface circuit 1902 may be configured to receive a signal from another apparatus (for example, a memory of an electronic device). For another example, the interface circuit 1902 may be configured to send a signal to another apparatus (for example, the processor 1901).

For example, the interface circuit 1902 may read instructions stored in the memory of the electronic device, and send the instructions to the processor 1901. When the instructions are executed by the processor 1901, the electronic device may be enabled to perform steps in the foregoing embodiment.

According to the foregoing descriptions of the implementations, a person skilled in the art may clearly understand that, for convenient and brief descriptions, only division into the foregoing function modules is used as an example for description. During actual application, the foregoing functions may be allocated to different function modules according to a requirement, that is, an internal structure of the apparatus is divided into different function modules, to complete all or some of the foregoing functions. For a specific working process of the foregoing system, apparatus, and unit, refer to a corresponding process in the foregoing method embodiment. Details are not described herein again.

Function units in embodiments of this application may be integrated into one processing unit, or each unit may exist alone physically, or two or more units may be integrated into one unit. The foregoing integrated unit may be implemented in a form of hardware, or may be implemented in a form of a software function unit.

When an integrated unit is implemented in a form of a software function unit and sold or used as an independent product, the integrated unit may be stored in a computer-readable storage medium. Based on such an understanding, the technical solutions of embodiments of this application essentially, or the part contributing to the conventional technology, or all or some of the technical solutions may be implemented in a form of a software product. The computer software product is stored in a storage medium, and includes several instructions for instructing a computer device (which may be a personal computer, a server, a network device, or the like) or a processor to perform all or some of the steps of the methods in embodiments of this application. The foregoing storage medium includes any medium that can store program code, such as a USB flash drive, a removable hard disk, a read-only memory, a random access memory, a magnetic disk, or an optical disc.

The foregoing descriptions are merely specific implementations of embodiments of this application. However, the protection scope of embodiments of this application is not limited thereto. Any change or replacement within the technical scope disclosed in embodiments of this application shall fall within the protection scope of embodiments of this application. Therefore, the protection scope of embodiments of this application shall be subject to the protection scope of the claims.

What is claimed is:

1. An application keep-alive method, the method comprising:

automatically performing, by an electronic device, a first locking operation on a first application running in a background, to add an application lock of a first type to the first application, wherein the application lock of the first type is an application lock actively added by the electronic device, the first application is an application that the electronic device predicts that a user will continue to use, and the first locking operation enables the first application to be in a keep-alive state;

in response to a first operation of the user, displaying, by the electronic device, a multi-task interface, wherein the multi-task interface comprises preview interfaces of a plurality of recently used applications, the plurality of recently used applications comprises the first application and a second application, the preview interfaces of the plurality of applications comprise a first preview interface and a second preview interface, the first preview interface is a preview interface of the first application, and the second preview interface is a preview interface of the second application;

displaying a first identifier on the first preview interface of the multi-task interface, wherein the first identifier indicates that the application lock of the first type is added to the first application; and in response to a second operation performed by the user on the second preview interface, performing, by the electronic device, a second locking operation on the second application to add an application lock of a second type to the second application, and displaying a second identifier on the second preview interface, wherein the second identifier indicates that the application lock of the second type is added to the second application, the second locking operation enables the second application to be in a keep-alive state, and the application lock of the second type is an application lock added by the electronic device in response to a user operation.

2. The method according to claim 1, wherein an appearance of the first identifier is different from that of the second identifier.

3. The method according to claim 1, wherein a default application keep-alive duration corresponding to the application lock of the first type is shorter than a default application keep-alive duration corresponding to the application lock of the second type.

4. The method according to claim 1, wherein a first keep-alive duration related to the first identifier is further displayed on the first preview interface, and the first keep-alive duration is a remaining keep-alive duration of the first application.

5. The method according to claim 4, wherein a maximum value of the first keep-alive duration is a first value or a second value, the first value is a preset value, the second value is a value determined based on a habitual running time of the first application and a current time, and the habitual running time of the first application is a time period in which the user habitually uses the first application.

6. The method according to claim 5, wherein in response to a pull-down operation performed by the user on the first preview interface, the electronic device restores the remaining keep-alive duration of the first application to the first value.

7. The method according to claim 1, further comprising:
in response to a first operation performed by the user on the first identifier on the first preview interface, displaying, by the electronic device, a setting box, wherein the setting box comprises a plurality of setting options, the plurality of setting options are usable by the user to set a first keep-alive duration or a keep-alive policy of the first application, and the first keep-alive duration is the remaining keep-alive duration of the first application; and
performing the following:
in response to an operation of the user selecting a first setting option from the plurality of setting options, updating, by the electronic device, the first keep-alive duration to a preset value corresponding to the first option; or
in response to an operation of the user selecting a second setting option from the plurality of setting options, displaying, by the electronic device, an input box, and in response to an operation of the user entering a third value into the input box, updating, by the electronic device, the first keep-alive duration to the third value; or
in response to an operation of the user selecting a third setting option from the plurality of setting options, displaying, by the electronic device, a setting page of the keep-alive policy corresponding to the first application.

8. The method according to claim 7, further comprising:
in response to the operation of the user selecting the first setting option or the second setting option from the plurality of setting options, updating, by the electronic device, the first identifier to the second identifier.

9. The method according to claim 1, further comprising:
in response to a first operation performed by the user on the second identifier on the second preview interface, displaying, by the electronic device, a setting box, wherein the setting box comprises a plurality of setting options, the plurality of setting options are usable by the user to set a second keep-alive duration, and the second keep-alive duration is a remaining keep-alive duration of the second application;
in response to an operation of the user selecting a first setting option from the plurality of setting options, displaying, by the electronic device, the second keep-alive duration on the second preview interface, wherein the second keep-alive duration is a preset value corresponding to the first option; or
in response to an operation of the user selecting a second setting option from the plurality of setting options, displaying, by the electronic device, an input box; and
in response to an operation of the user entering a third value into the input box, displaying, by the electronic device, the second keep-alive duration on the second preview interface, wherein the second keep-alive duration is the third value.

10. The method according to claim 1, wherein the method further comprises at least one of the following steps:
in response to a second operation performed by the user on the first identifier on the first preview interface, unlocking, by the electronic device, the first application, and skipping displaying the first identifier on the first preview interface; or
in response to a second operation performed by the user on the second identifier on the second preview interface, unlocking, by the electronic device, the second application, and skipping displaying the second identifier on the second preview interface.

11. The method according to claim 1, wherein the automatically performing, by an electronic device, a first locking operation on a first application running in the background comprises:
in response to an operation of determining that the first application is executing a preset task in the background, performing, by the electronic device, the first locking operation on the first application, wherein the preset task is a task executed in response to a user requirement.

12. The method according to claim 11, further comprising:
in response to an operation of determining that the first application completes execution of the preset task, unlocking, by the electronic device, the first application, and skipping displaying the first identifier on the first preview interface.

13. The method according to claim 11, wherein the preset task is a download task.

14. The method according to claim 1, wherein the automatically performing, by an electronic device, a first locking operation on a first application running in the background comprises:
in response to an operation of determining that a current time is within a habitual running time of the first application, performing, by the electronic device, the first locking operation on the first application, wherein the habitual running time of the first application is a time period in which the user habitually uses the first application.

15. The method according to claim 1, wherein the automatically performing, by an electronic device, a first locking operation on a first application running in the background comprises:

in response to an operation of determining that a current time is within a habitual running time of the first application and the fact that a running environment requirement of the first application matches status information of the electronic device, performing, by the electronic device, the first locking operation on the first application, wherein the running environment requirement of the first application indicates a requirement of the first application for the status information of the electronic device, and the status information comprises at least one of a Bluetooth connection status, a network connection status, location information, or remaining power.

16. The method according to claim 1, wherein the multi-task interface further comprises a cleaning option, and the method further comprises:

in response to an operation performed by the user on the cleaning option for a first time, closing, by the electronic device, an unlocked application in the plurality of applications and a preview interface of the application;

in response to an operation performed by the user on the cleaning option for a second time, closing, by the electronic device, an application that comprises the first application and to which the application lock of the first type is added in the plurality of applications and a preview interface of the application; and in response to an operation performed by the user on the cleaning option for a third time, closing, by the electronic device, an application that comprises the second application and to which the application lock of the second type is added in the plurality of applications and a preview interface of the application.

17. The method according to claim 1, wherein the multi-task interface further comprises a cleaning option, and the method further comprises:

in response to an operation performed by the user on the cleaning option for a first time, closing, by the electronic device, an unlocked application in the plurality of applications and a preview interface of the application; and in response to an operation performed by the user on the cleaning option for a second time, closing, by the electronic device, at least a preview interface currently visible to the user on the multi-task interface and a corresponding application, or closing, by the electronic device, at least a preview interface with a largest display area in a preview interface currently visible to the user on the multi-task interface and a corresponding application.

18. The method according to claim 16, further comprising:

in response to an operation performed by the user on the cleaning option, displaying, by the electronic device, cleaning information, wherein the cleaning information indicates a quantity of applications cleaned by the electronic device, and types and names of the applications.

19. An electronic device, comprising a processor, wherein the processor is coupled to a memory, the memory stores program instructions, and when the program instructions stored in the memory are executed by the processor, the electronic device is enabled to:

automatically perform a first locking operation on a first application running in the background, to add an application lock of a first type to the first application, wherein the application lock of the first type is an application lock actively added by the electronic device, the first application is an application that the electronic device predicts that a user will continue to use, and the first locking operation enables the first application to be in a keep-alive state;

in response to a first operation of the user, display a multi-task interface, wherein the multi-task interface comprises preview interfaces of a plurality of recently used applications, the plurality of recently used applications comprises the first application and a second application, the preview interfaces of the plurality of applications comprise a first preview interface and a second preview interface, the first preview interface is a preview interface of the first application, and the second preview interface is a preview interface of the second application;

display a first identifier on the first preview interface of the multi-task interface, wherein the first identifier indicates that the application lock of the first type is added to the first application; and in response to a second operation performed by the user on the second preview interface, perform a second locking operation on the second application to add an application lock of a second type to the second application, and displaying a second identifier on the second preview interface, wherein the second identifier indicates that the application lock of the second type is added to the second application, the second locking operation enables the second application to be in a keep-alive state, and the application lock of the second type is an application lock added by the electronic device in response to a user operation.

20. A non-transitory computer-readable storage medium, comprising computer instructions, wherein when the computer instructions are run on an electronic device, the electronic device is enabled to:

automatically perform a first locking operation on a first application running in the background, to add an application lock of a first type to the first application, wherein the application lock of the first type is an application lock actively added by the electronic device, the first application is an application that the electronic device predicts that a user will continue to use, and the first locking operation enables the first application to be in a keep-alive state;

in response to a first operation of the user, display a multi-task interface, wherein the multi-task interface comprises preview interfaces of a plurality of recently used applications, the plurality of recently used applications comprises the first application and a second application, the preview interfaces of the plurality of applications comprise a first preview interface and a second preview interface, the first preview interface is a preview interface of the first application, and the second preview interface is a preview interface of the second application;

display a first identifier on the first preview interface of the multi-task interface, wherein the first identifier indicates that the application lock of the first type is added to the first application; and in response to a second operation performed by the user on the second preview interface, perform a second locking operation on the second application to add an application lock of a second type to the second application, and displaying a second identifier on the second preview interface, wherein the second identifier indicates that the application lock of the second type is added to the second application, the second locking operation enables the second application to be in a keep-alive state, and the application lock of the second type is an application lock added by the electronic device in response to a user operation.

\* \* \* \* \*